(12) United States Patent
Tripathi et al.

(10) Patent No.: US 8,336,521 B2
(45) Date of Patent: Dec. 25, 2012

(54) INTERNAL COMBUSTION ENGINE CONTROL FOR IMPROVED FUEL EFFICIENCY

(75) Inventors: Adya S. Tripathi, San Jose, CA (US); Chester J. Silvestri, Los Gatos, CA (US)

(73) Assignee: Tula Technology, Inc., Santa Clara, CA (US)

( * ) Notice: Subject to any disclaimer, the term of this patent is extended or adjusted under 35 U.S.C. 154(b) by 752 days.

(21) Appl. No.: 12/501,345

(22) Filed: Jul. 10, 2009

(65) Prior Publication Data

US 2010/0006065 A1    Jan. 14, 2010

Related U.S. Application Data

(63) Continuation-in-part of application No. 12/355,725, filed on Jan. 16, 2009, now Pat. No. 8,131,447.

(60) Provisional application No. 61/080,192, filed on Jul. 11, 2008, provisional application No. 61/104,222, filed on Oct. 9, 2008.

(51) Int. Cl.
  *F02D 41/00* (2006.01)
  *F02D 17/02* (2006.01)
  *G06F 19/00* (2011.01)

(52) U.S. Cl. ...... 123/350; 701/103; 123/305; 123/198 F

(58) Field of Classification Search .................. 123/350, 123/305, 352, 198 F, 478, 480, 481; 701/103–105, 701/101, 102, 115
See application file for complete search history.

(56) References Cited

U.S. PATENT DOCUMENTS

| | | | |
|---|---|---|---|
| 2,771,867 | A | 11/1956 | Péras |
| 2,875,742 | A | 3/1959 | Dolza |
| 3,756,205 | A | 9/1973 | Frost |
| 3,996,915 | A | 12/1976 | Demetrescu |

(Continued)

FOREIGN PATENT DOCUMENTS

JP    2001-159236    6/2001

(Continued)

OTHER PUBLICATIONS

U.S. Appl. No. 12/405,450, filed Mar. 17, 2009.

(Continued)

*Primary Examiner* — Hieu T Vo
(74) *Attorney, Agent, or Firm* — Beyer Law Group, LLP

(57) ABSTRACT

A variety of methods and arrangements for improving the fuel efficiency of internal combustion engines are described. Generally, an engine is controlled to operate in a skip fire variable displacement mode. Feedback control is used to dynamically determine the working cycles to be skipped to provide a desired engine output. In some embodiments a substantially optimized amount of air and fuel is delivered to the working chambers during active working cycles so that the fired working chambers can operate at efficiencies close to their optimal efficiency. In some embodiments, the appropriate firing pattern is determined at least in part using predictive adaptive control. By way of example, sigma delta controllers work well for this purpose. In some implementations, the feedback includes feedback indicative of at least one of actual and requested working cycle firings. In some embodiments, the appropriate firings are determined on a firing opportunity by firing opportunity basis. Additionally, in some embodiments, an indicia of the current rotational speed of the engine is used as a clock input for a controller used to selectively cause the skipped working cycles to be skipped.

23 Claims, 17 Drawing Sheets

U.S. PATENT DOCUMENTS

| | | |
|---|---|---|
| 4,040,395 A | 8/1977 | Demetrescu |
| 4,064,844 A | 12/1977 | Matsumoto et al. |
| 4,100,891 A | 7/1978 | Williams |
| 4,129,109 A | 12/1978 | Matsumoto |
| 4,161,166 A | 7/1979 | Roznovsky |
| 4,172,434 A | 10/1979 | Coles |
| 4,274,382 A | 6/1981 | Sugasawa et al. |
| 4,276,863 A | 7/1981 | Sugasawa et al. |
| 4,306,529 A | 12/1981 | Chiesa et al. |
| 4,337,740 A | 7/1982 | Sugasawa et al. |
| 4,388,906 A | 6/1983 | Sugiyama et al. |
| 4,434,767 A | 3/1984 | Kohama et al. |
| 4,489,695 A | 12/1984 | Kohama et al. |
| 4,509,488 A | 4/1985 | Forster et al. |
| 4,528,960 A | 7/1985 | Mizuno et al. |
| 4,530,332 A | 7/1985 | Harvey et al. |
| 4,541,387 A | 9/1985 | Morikawa |
| 4,590,907 A | 5/1986 | Tsukamoto et al. |
| 4,841,933 A | 6/1989 | McHale et al. |
| 4,854,283 A | 8/1989 | Kiyono et al. |
| 5,058,550 A | 10/1991 | Nagano et al. |
| 5,079,691 A | 1/1992 | Heck et al. |
| 5,117,790 A | 6/1992 | Clarke et al. |
| 5,275,143 A | 1/1994 | Lembke et al. |
| 5,374,224 A | 12/1994 | Huffmaster et al. |
| 5,377,631 A | 1/1995 | Schechter |
| 5,404,857 A | 4/1995 | Schommers |
| 5,408,966 A | 4/1995 | Lipinski et al. |
| 5,408,974 A | 4/1995 | Lipinski et al. |
| 5,431,139 A | 7/1995 | Grutter et al. |
| 5,437,253 A | 8/1995 | Huffmaster et al. |
| 5,464,000 A | 11/1995 | Pursifull et al. |
| 5,471,963 A | 12/1995 | Nishioka et al. |
| 5,483,941 A | 1/1996 | Cullen et al. |
| 5,540,633 A | 7/1996 | Yamanaka et al. |
| 5,553,575 A | 9/1996 | Beck et al. |
| 5,555,871 A | 9/1996 | Gopp et al. |
| 5,584,266 A | 12/1996 | Motose et al. |
| 5,584,281 A | 12/1996 | Katoh |
| 5,636,609 A | 6/1997 | Fujiyoshi |
| 5,669,357 A | 9/1997 | Denz et al. |
| 5,692,471 A | 12/1997 | Zhang |
| 5,720,257 A | 2/1998 | Motose et al. |
| 5,752,485 A | 5/1998 | Minowa et al. |
| 5,775,296 A | 7/1998 | Goras et al. |
| 5,778,858 A | 7/1998 | Garabedian |
| 5,791,314 A | 8/1998 | Ito |
| 5,797,384 A | 8/1998 | Kitagawa et al. |
| 5,806,488 A | 9/1998 | Imberg |
| 5,826,563 A | 10/1998 | Patel et al. |
| 5,945,597 A | 8/1999 | Poublon et al. |
| 5,947,095 A | 9/1999 | Kato |
| 5,975,052 A | 11/1999 | Moyer |
| 6,032,650 A | 3/2000 | Rask |
| 6,158,411 A | 12/2000 | Morikawa |
| 6,244,242 B1 | 6/2001 | Grizzle et al. |
| 6,247,449 B1 | 6/2001 | Persson |
| 6,273,076 B1 | 8/2001 | Beck et al. |
| 6,354,268 B1 | 3/2002 | Beck et al. |
| 6,360,724 B1 | 3/2002 | Suhre et al. |
| 6,367,443 B1 | 4/2002 | Bassi et al. |
| 6,405,705 B1 | 6/2002 | Dunsworth et al. |
| 6,408,625 B1 | 6/2002 | Woon et al. |
| 6,484,677 B2 | 11/2002 | Leone et al. |
| 6,497,221 B1 | 12/2002 | French et al. |
| 6,606,552 B2 | 8/2003 | Haimeri et al. |
| 6,619,258 B2 | 9/2003 | McKay et al. |
| 6,619,267 B1 | 9/2003 | Pao |
| 6,655,353 B1 | 12/2003 | Rayl |
| 6,687,602 B2 | 2/2004 | Ament |
| 6,688,281 B1 | 2/2004 | Woolford et al. |
| 6,728,626 B2 | 4/2004 | Maira et al. |
| 6,735,938 B2 | 5/2004 | Surnilla |
| 6,769,398 B2 | 8/2004 | Surnilla et al. |
| 6,823,830 B2 | 11/2004 | Azuma |
| 6,823,835 B2 | 11/2004 | Dunsworth et al. |
| 6,868,326 B2 | 3/2005 | Yasui |
| 6,874,462 B2 | 4/2005 | Matthews |
| 6,876,097 B2 | 4/2005 | Thomas et al. |
| 6,937,933 B1 | 8/2005 | Jautelat et al. |
| 6,978,204 B2 | 12/2005 | Surnilla et al. |
| 7,000,602 B2 | 2/2006 | Cullen et al. |
| 7,021,287 B2 | 4/2006 | Zhu et al. |
| 7,028,661 B1 | 4/2006 | Bonne et al. |
| 7,028,670 B2 | 4/2006 | Doering |
| 7,032,545 B2 | 4/2006 | Lewis et al. |
| 7,032,581 B2 | 4/2006 | Gibson et al. |
| 7,044,101 B1 | 5/2006 | Duty et al. |
| 7,058,501 B2 | 6/2006 | Yasui et al. |
| 7,063,062 B2 | 6/2006 | Lewis et al. |
| 7,069,910 B2 | 7/2006 | Surnilla et al. |
| 7,086,386 B2 | 8/2006 | Doering |
| 7,111,593 B2 | 9/2006 | Song et al. |
| 7,133,763 B2 | 11/2006 | Yasui |
| 7,179,199 B2 | 2/2007 | Kushiyama et al. |
| 7,225,783 B2 | 6/2007 | Hohnstadt et al. |
| 7,231,907 B2 | 6/2007 | Bolander et al. |
| 7,249,583 B2 | 7/2007 | Bidner et al. |
| 7,275,916 B2 | 10/2007 | Smith et al. |
| 7,311,079 B2 | 12/2007 | Surnilla et al. |
| 7,350,499 B2 | 4/2008 | Takaoka et al. |
| 7,363,915 B2 | 4/2008 | Surnilla et al. |
| 7,426,915 B2 | 9/2008 | Gibson et al. |
| 7,503,312 B2 | 3/2009 | Surnilla et al. |
| 7,509,201 B2 | 3/2009 | Bolander et al. |
| 7,516,730 B2 | 4/2009 | Ukai et al. |
| 7,532,972 B2 | 5/2009 | Kolmanovsky et al. |
| 7,577,511 B1 | 8/2009 | Tripathi et al. |
| 7,849,835 B2 | 12/2010 | Tripathi et al. |
| 7,886,715 B2 | 2/2011 | Tripathi et al. |
| 7,891,336 B2 | 2/2011 | Surnilla et al. |
| 7,900,596 B2 | 3/2011 | Hartmann et al. |
| 7,930,087 B2 | 4/2011 | Gibson et al. |
| 7,954,474 B2 | 6/2011 | Tripathi et al. |
| 8,099,224 B2 | 1/2012 | Tripathi et al. |
| 8,131,445 B2 * | 3/2012 | Tripathi et al. ............... 701/102 |
| 8,131,447 B2 * | 3/2012 | Tripathi et al. ............... 701/103 |
| 2003/0131820 A1 | 7/2003 | Mckay et al. |
| 2003/0139872 A1 | 7/2003 | Miki |
| 2005/0182553 A1 | 8/2005 | Miller et al. |
| 2007/0051092 A1 | 3/2007 | Pallett et al. |
| 2007/0051350 A1 | 3/2007 | Pallet et al. |
| 2007/0051351 A1 | 3/2007 | Pallett et al. |
| 2007/0162215 A1 | 7/2007 | Dietl et al. |
| 2007/0272202 A1 | 11/2007 | Kuo et al. |
| 2008/0066450 A1 | 3/2008 | Surnilla et al. |
| 2008/0135021 A1 | 6/2008 | Michelini et al. |
| 2008/0262712 A1 | 10/2008 | Duty et al. |
| 2009/0177371 A1 | 7/2009 | Reinke |
| 2009/0182484 A1 | 7/2009 | Loeffler et al. |
| 2009/0182485 A1 | 7/2009 | Loeffler et al. |
| 2009/0320787 A1 | 12/2009 | Wagner et al. |
| 2010/0006065 A1 | 1/2010 | Tripathi et al. |
| 2010/0012072 A1 | 1/2010 | Leone et al. |
| 2010/0043744 A1 | 2/2010 | Suzuki et al. |
| 2010/0050993 A1 | 3/2010 | Zhao et al. |
| 2010/0100299 A1 | 4/2010 | Tripathi et al. |
| 2011/0030657 A1 * | 2/2011 | Tripathi et al. ............... 123/481 |
| 2011/0048372 A1 | 3/2011 | Dibble et al. |
| 2011/0208405 A1 | 8/2011 | Tripathi et al. |
| 2011/0213540 A1 | 9/2011 | Tripathi et al. |
| 2011/0251773 A1 | 10/2011 | Sahandiesfanjani et al. |
| 2012/0042633 A1 | 2/2012 | Silvestri et al. |
| 2012/0046853 A1 | 2/2012 | Silvestri et al. |
| 2012/0109495 A1 | 5/2012 | Tripathi et al. |
| 2012/0143471 A1 | 6/2012 | Tripathi et al. |

FOREIGN PATENT DOCUMENTS

| | | |
|---|---|---|
| JP | 2004-270627 | 9/2004 |
| JP | 2006-118428 | 5/2006 |
| WO | WO 91/02892 | 3/1991 |

OTHER PUBLICATIONS

U.S. Appl. No. 12/355,725, filed Jan. 16, 2009.
U.S. Appl. No. 12/615,179. filed Nov. 9, 2009.
U.S. Appl. No. 12/615,171. filed Nov. 9, 2009.

International Search Report dated Nov. 3, 2009 in PCT Application No. PCT/US2009/050322.
Written Opinion dated Nov. 3, 2009 in PCT Application No. PCT/US2009/050322.
Japanese Office Action dated Oct. 16, 2012 from Japanese Application No. 2011-517671.

Search Report dated Mar. 14, 2011 from International Application No. PCT/US2011/020862.
Written Opinion dated Mar. 14, 2011 from International Application No. PCT/US2011/020862.

* cited by examiner

INTERNAL COMBUSTION ENGINE CONTROL FOR IMPROVED FUEL EFFICIENCY

CROSS REFERENCE TO RELATED APPLICATIONS

This application is a Continuation-in-Part of U.S. patent application Ser. No. 12/355,725 filed Jan. 16, 2009 and further claims the priority of U.S. Provisional Patent Application No. 61/080,192, filed Jul. 11, 2008; and 61/104,222, filed Oct. 9, 2008. Each of these priority applications is incorporated herein by reference and all are entitled: "INTERNAL COMBUSTION ENGINE CONTROL FOR IMPROVED FUEL EFFICIENCY."

FIELD OF THE INVENTION

The present invention relates generally to internal combustion engines and to methods and arrangements for controlling internal combustion engines to operate more efficiently. Generally, selected combustion events are skipped during operation of the internal combustion engine so that other working cycles can operate at better thermodynamic efficiency.

BACKGROUND OF THE INVENTION

There are a wide variety of internal combustion engines in common usage today. Most internal combustion engines utilize reciprocating pistons with two or four-stroke working cycles and operate at efficiencies that are well below their theoretical peak efficiency. One of the reasons that the efficiency of such engines is so low is that the engine must be able to operate under a wide variety of different loads. Accordingly, the amount of air and/or fuel that is delivered into each cylinder typically varies depending upon the desired torque or power output. It is well understood that the cylinders are more efficient when they are operated under specific conditions that permit full or near-full compression and optimal fuel injection levels that are tailored to the cylinder size and operating conditions. Generally, the best thermodynamic efficiency of an engine is found when the most air is introduced into the cylinders, which typically occurs when the air delivery to the engine is unthrottled. However, in engines that control the power output by using a throttle to regulate the flow of air into the cylinders (e.g., Otto cycle engines used in many passenger cars), operating at an unthrottled position (i.e., at "full throttle") would typically result in the delivery of more power (and often far more power) than desired or appropriate.

In engines that do not generally throttle the flow of air into the cylinders (e.g., most diesel engines), power is controlled by modulating the amount of fuel delivered to the cylinders. Operating such engines at thermodynamically optimal fuel injection levels, again, would typically result in the delivery of more power than desired or appropriate. Therefore, in most applications, standard internal combustion engines are operated under conditions well below their optimal thermodynamic efficiency a significant majority of the time.

There are a number of reasons that internal combustion engines do not operate as efficiently at partial throttle. One of the most significant factors is that less air is provided to the cylinder at partial throttle than at full throttle which reduces the effective compression of the cylinder, which in turn reduces the thermodynamic efficiency of the cylinder. Another very significant factor is that operating at partial throttle requires more energy to be expended to pump air into and out of the cylinders than is required when the cylinder is operating at full throttle—these losses are frequently referred to as pumping losses.

Over the years there have been a wide variety of efforts made to improve the thermodynamic efficiency of internal combustion engines. One approach that has gained popularity is to vary the displacement of the engine. Most commercially available variable displacement engines effectively "shut down" some of the cylinders during certain low-load operating conditions. When a cylinder is "shut down", its piston still reciprocates, however neither air nor fuel is delivered to the cylinder so the piston does not deliver any power during its power stroke. Since the cylinders that are shut down don't deliver any power, the proportionate load on the remaining cylinders is increased, thereby allowing the remaining cylinders to operate at an improved thermodynamic efficiency. The improved thermodynamic efficiency results in improved fuel efficiency. Although the remaining cylinders tend to operate at improved efficiency, they still do not operate at their optimal efficiency the vast majority of the time because they are still not operating consistently at "full throttle." That is, they have the same drawbacks of partial throttle operations, (e.g., lower compression, higher pumping losses) even though the scale of their inefficiencies is reduced.

Another drawback of most commercially available variable displacement engines is that they tend to kick out of the variable displacement mode very quickly when changes are made to the desired operational state of the engine. For example, many commercially available automotive variable displacement engines appear to kick out of the variable displacement operating mode and into a "conventional", all cylinder operational mode any time the driver requests non-trivial additional power by further depressing the accelerator pedal. In many circumstances this results in the engine switching out of the fuel saving variable displacement mode, even though the engine is theoretically perfectly capable of delivering the desired power using only the reduced number of cylinders that were being used in the variable displacement mode. It is believed that the reason that such variable displacement engines kick out of the variable displacement mode so quickly is due to the perceived difficulty of controlling the engine to provide substantially the same response regardless of how many cylinders are being used at any given time.

More generally, engine control approaches that vary the effective displacement of an engine by skipping the delivery of fuel to certain cylinders are often referred to as "skip fire" control of an engine. In conventional skip fire control, fuel is not delivered to selected cylinders based on some designated control algorithm. The variable displacement engines that effectively shut down cylinders that are described above are essentially a class of skip fire engines. Over the years, a number of skip fire engine control arrangements have been proposed, however, most still contemplate throttling the engine or modulating the amount of fuel delivered to the cylinders in order to control the engine's power output.

As suggested above, most commercially available variable displacement engines shut down specific cylinders to vary the displacement in discrete steps. Other approaches have also been proposed for varying the displacement of an engine to facilitate improved thermodynamic efficiency. For example, some designs contemplate varying the effective size of the cylinders to vary the engine's displacement. Although such designs can improve thermodynamic and fuel efficiencies, existing variable cylinder size designs tend to be relatively complicated and expensive to produce, making them impractical for widespread use in commercial vehicles.

U.S. Pat. No. 4,509,488 proposes another approach for varying the displacement of an internal combustion engine. The '488 patent proposes operating an engine in an unthrottled manner that skips working cycles of the engine cylinders in an approximately uniform distribution that is varied in dependence on the load. A fixed amount of fuel is fed to the non-skipped cylinders such that the operating cylinders can work at near their optimum efficiency, increasing the overall operating efficiency of the engine. However, the approach described in the '488 patent never achieved commercial success. It is suspected that this was partly due to the fact that although the distribution of the skipped working strokes varied based on the load, a discrete number of different firing patterns were contemplated so the power outputted by the engine would not regularly match the desired load precisely, which would be problematic from a control and user standpoint. In some embodiments, the firing patterns were fixed—which inherently has the risk of introducing resonant vibrations into the engine crankshaft. The '488 patent recognized this risk and proposed a second embodiment that utilized a random distribution of the actual cylinder firings to reduce the probability of resonant vibrations. However, this approach has the disadvantage of introducing bigger variations in drive energy. The '488 patent appears to have recognized that problem and proposed the use of a more robust flywheel than normal to compensate for the resultant fluctuations in drive energy. In short, it appears that the approach proposed by the '488 patent was not able to control the engine operation well enough to attain commercial success.

Although existing variable displacement engines work well in many applications, there are continuing efforts to further improve the thermodynamic efficiency of internal combustion engines without necessarily requiring expensive alterations to the engine's design.

SUMMARY OF THE INVENTION

A variety of methods and arrangements for improving the fuel efficiency of internal combustion engines are described. Generally, an engine is controlled to operate in a skip fire variable displacement mode. In the variable displacement mode, selected combustion events are skipped so that other working cycles can operate at better thermodynamic efficiency. More specifically, selected "skipped" working cycles are not fired while other "active" working cycles are fired. Typically, fuel is not delivered to the working chambers during skipped working cycles.

In some aspects of the invention, feedback control is used in the determination of the working cycles to be skipped. In various implementations, an appropriate firing pattern is determined at least in part using predictive adaptive control. By way of example, sigma delta controllers work well for this purpose. In some implementations, the feedback includes feedback indicative of at least one of actual and requested working cycle firings. In some implementations, feedback or feed forward indicative of the power provided by each firing is also used in the determination of the firing pattern.

In another aspect of the invention a substantially optimized amount of air and fuel is delivered to the working chambers during active working cycles so that the fired working chambers can operate at efficiencies close to their optimal efficiency.

In another aspect of the invention, a controller is used to dynamically determine the chamber firings required to provide a desired engine output. In some embodiments, the appropriate firings are determined on a firing opportunity by firing opportunity basis.

In some embodiments the controller used to determine the skip fire firing pattern includes a drive pulse generator arranged to receive an input indicative of a desired engine output and to output a drive pulse signal that is synchronized with the engine speed. The drive pulse signal generally indicates when active working cycles are appropriate to deliver the desired engine output. In some implementations, the output of the drive pulse generator may directly be used to define the firing pattern. In other embodiments, a sequencer is used to define the actual firing pattern based at least in part on the drive pulse pattern. The working chamber firings may be sequenced in a manner that helps reduce undesirable vibrations of the engine.

Adaptive predictive controllers work particularly well for use in controlling engine operations in a skip fire variable displacement mode. One class of adaptive predictive controllers that works well in this application are sigma delta controllers. In some embodiments, the controller's clock signal is arranged to vary proportionally with the engine speed. Differential and mixed signal sigma delta controllers also work particularly well. In other implementations, a variety of other controllers including pulse width modulation (PWM), least means square (LMS) and recursive least square (RLS) controllers may be used to dynamically determine the desired chamber firings.

In many operational conditions, the amount of fuel injected into the working chambers in the variable displacement mode is set to operate the working chambers at substantially their optimal thermodynamic efficiency under the current operational conditions. In some embodiments the controller may be arranged to sometimes cause injection of different amounts of fuel into the fired working chambers. Injection of the different fuel quantities can be used to provide smoother and/or more precise control of the torque outputted by the engine and/or to reduce the probability of resonant vibrations occurring during operation in the variable displacement mode and/or to enhance emission characteristics.

The described approaches can be used to significantly improve the fuel efficiency of a wide variety of internal combustion engines, including 2-stroke, 4-stroke and 6-stroke piston engines, rotary engines, hybrid engines, radial engines, etc. The approach is applicable to engines that operate in accordance with a variety of different thermodynamic cycles including an Otto cycle, a diesel cycle, a Miller cycle, an Atkins cycle, mixed cycles, etc.

Various described embodiments include implementations that are well suited for use in: (a) retrofitting existing engines; (b) new engines based on current designs; and/or (c) new engine designs that incorporate other developments or are optimized to enhance the benefits of the described working cycle optimization. The described control may be incorporated into an engine control unit (ECU) or may be provided in a separate processor or processing unit that cooperates with the engine control unit.

BRIEF DESCRIPTION OF THE DRAWINGS

The invention and the advantages thereof, may best be understood by reference to the following description taken in conjunction with the accompanying drawings in which:

FIGS. 1(a) and 1(b) are taken from *Engineering Fundamentals of the Internal Combustion Engine*, by Willard W. Pulkrabek (2004)—ISBN 0-13-140570-5.

In the drawings, like reference numerals are sometimes used to designate like structural elements. It should also be appreciated that the depictions in the figures are diagrammatic and not to scale.

DETAILED DESCRIPTION

Figure 1A:
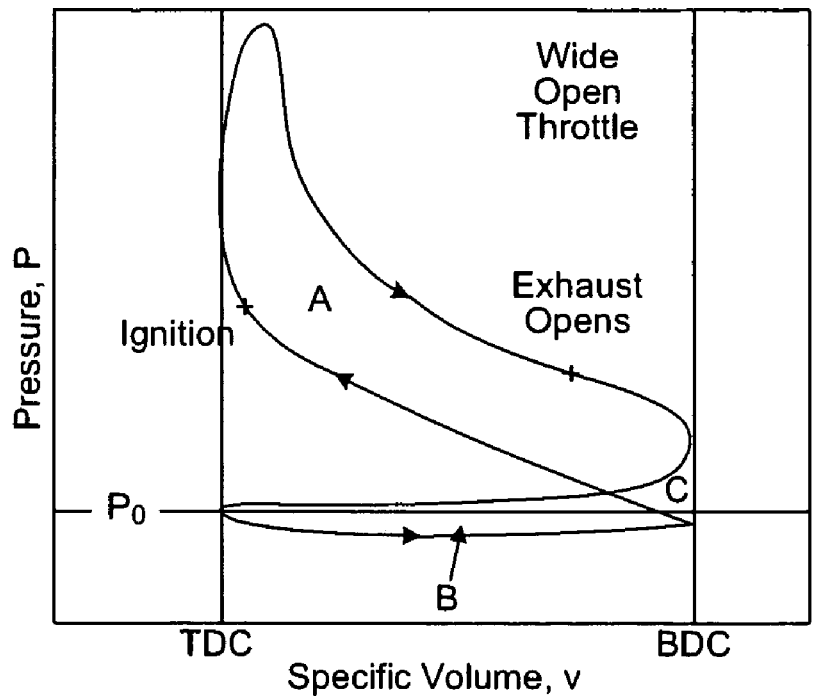
FIG. 1(a) is a pressure volume (PV) diagram illustrating the thermodynamic working cycle of a representative 4-stroke Otto cycle engine operating at full throttle.

The present invention relates generally to methods and arrangements for controlling the operation of internal combustion engines to improve their thermodynamic and fuel efficiencies. Various aspects of the invention relate to motorized vehicles that utilize such engine control and to engine control units suitable for implementing such control.

Most internal combustion engines are arranged to vary the amount of air and/or fuel that is delivered to the cylinders (or other working chambers) based on the engine output that is requested by the user or otherwise required at any given time. However, the thermodynamic efficiency of a fixed size cylinder is not the same at every air/fuel level. Rather, the thermodynamic efficiency is best when an optimal amount of air and fuel is delivered to the cylinder to achieve maximum permissible compression and optimal combustion efficiency. Since internal combustion engines need to be able to operate under a wide variety of different loads, the net result is that the engines tend to operate at lower than optimal compression or air/fuel ratios and therefore inefficiently most of the time. The present invention discloses controlling the operation of an internal combustion engine such that its working chambers (e.g., cylinders) operate under conditions close to their optimal thermodynamic efficiency most of the time.

From a theoretical standpoint, the thermodynamic efficiency of an internal combustion engine can be improved by only firing the cylinders at their optimal efficiency and then skipping working cycles that are not needed. For example, if at a given time, an engine requires 30% of the power that would be outputted by running all of its cylinders at their maximum compression and an optimized air/fuel ratio, then that power can most efficiently be generated by operating 30% of the engine's working cycles at their optimal efficiency while not fueling the cylinders the remaining 70% of the available working cycles. The general benefit of this approach was recognized by Forster et al. in U.S. Pat. No. 4,509,488.

Although the '488 patent recognized the general benefits of running some working cycles at their maximum efficiency while skipping other working cycles, the described approach apparently never enjoyed any commercial success. It is suspected that this is due in part to the difficulties inherent in controlling the operation of such engines. The present application describes a number of engine designs and control arrangements for effectively controlling the operation of an engine in manners that permit some of the engine's working cycles to operate at or near their maximum efficiency while skipping other working cycles to improve the overall fuel efficiency of the engine. The various described embodiments include implementations that are well suited for use in: (a) retrofitting existing engines; (b) new engines based on current designs; and/or (c) new engine designs that incorporate other developments or are optimized to enhance the benefits of the described working cycle optimization.

Improving the thermodynamic efficiency of the engine using the described approaches can significantly improve the fuel efficiency of internal combustion engines. Computer simulation models project that the fuel efficiency of the existing fleet of fuel injected automotive gas engines on the road today could be improved by on the order of 20-50% by installing a firing control co-processor that implements the described techniques and cooperates with the car's existing engine control unit (ECU), or by replacing the ECU with an ECU that implements the described techniques. More dramatic improvements may be possible in applications where it is possible to control the fuel injection profile and/or to provide turbocharged (or supercharged) air flow (which is possible in some vehicles currently on the road) and in applications where the engine and its controller (or a firing control co-processor) are specifically designed to take advantage of the described techniques.

The ability to closely control the operational conditions within an engine's cylinders (or other working chambers) also opens up the possibilities of utilizing different fuels and/or fuel compositions in traditional internal combustion engines that are not practical today due to the need to operate the cylinders under widely varying loads. Operating the cylinders at their optimum efficiency also has the potential benefit of reducing the overall level of emissions of reactive species—such as nitric oxides ($NO_x$)—and other pollutants generated during operation of the engine.

To help appreciate the efficiency gains that can be attained using the described approach, it is helpful to consider the efficiency of a typical internal combustion engine. For the purpose of this illustration we can discuss an Otto cycle engine (which is the engine type used in most passenger cars on the road today). However, the advantages of the present invention are equally relevant to a wide variety of other internal combustion engines, including engines that operate using a Diesel cycle, a Dual cycle, an Atkins cycle, a Miller cycle, two stroke spark ignition (SI) engine cycles, two stroke compression ignition (CI) engines, hybrid engines, radial engines, mixed cycle engines, Wankel engines, and other types of rotary engines, etc.

Figure 1B:
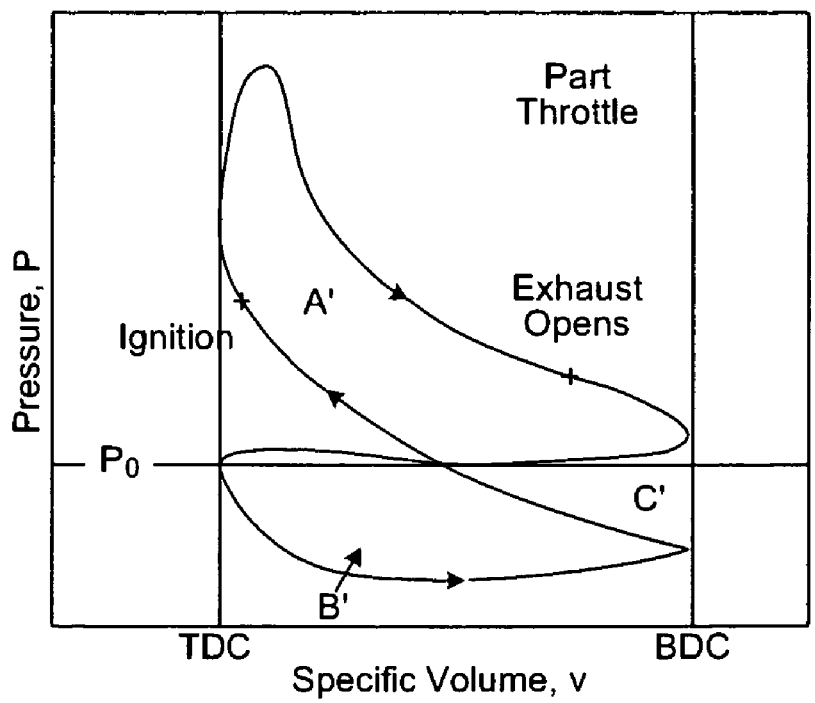
FIG. 1(b) is a pressure volume (PV) diagram illustrating the thermodynamic working cycle of a representative 4-stroke Otto cycle engine operating at partial throttle.

FIGS. 1(a) and 1(b) are PV (Pressure-Volume) diagrams illustrating the thermodynamic working cycle of a representative 4-stroke Otto cycle engine. FIG. 1(a) illustrates the performance of a cylinder at wide open throttle where the cylinder is being used at its maximum efficiency (i.e., an optimal amount of fuel is delivered to the cylinder). FIG. 1(b) illustrates the performance of a cylinder at partial throttle. Since the Otto cycle is a four stroke cycle, the piston reciprocates twice (720° rotation of the crankshaft) for each working cycle of the cylinder. Therefore, each working cycle effectively forms two loops in the PV diagram. The horizontal axis represents the volume. The range of each loop along the volume axis extends from a minimum volume—indicated as TDC (top dead center)—to a maximum volume—indicated as BDC (bottom dead center). In general, the area bounded by the upper loop (A, A') represents the amount of work that is generated by firing a cylinder, whereas the area bounded by the lower loop (B, B') represents the energy losses that are experienced due to pumping air into and out of the cylinder (these losses are frequently referred to as pumping loses). The overall work that is outputted by the engine is the difference between the area of the upper loop and the area of the lower loop.

Comparing the PV diagrams of a cylinder operating at full throttle and a cylinder operating at partial throttle, it can be seen that the overall efficiency of the cylinder operating at partial throttle is below (and often far below) the efficiency of the cylinder at full throttle. There are a number of factors that influence the operating efficiencies—but one of the biggest factors is based on the position of the throttle itself. When the throttle is partially closed, less air is provided to the cylinder. Thus, the pressure within the cylinder when the intake valve closes may be significantly below atmospheric pressure. When the starting pressure within the cylinder is significantly below atmospheric pressure, the effective compression of the cylinder during that engine cycle is reduced, which significantly lowers the pressure that builds up during the combustion stoke and reduces the amount of work generated by the firing of the cylinder. This can be seen by comparing the area of loop A—which is the work generated by a cylinder operating at full throttle—to the area of loop A'—which is the work generated by the cylinder operating at partial throttle. Additionally, the fact that the throttle is partially closed makes it harder to draw air into the cylinder, so pumping losses increase. This can be seen by comparing the area of loop B—which is the pumping loss experienced by the cylinder operating at full throttle—to the area of loop B'—which is the pumping loss experienced by the cylinder operating at partial throttle. By subtracting B from A and B' from A', it can be seen that the net work generated by the engine operating at full throttle is much greater than the net work generated by the engine operating at partial throttle—even when an adjustment is made to compensate for the fact that the partial throttle operation uses less fuel.

Although the comparison illustrated above is for an Otto cycle engine, it should be appreciated that similar types of efficiency losses are experienced by internal combustion engines operating on other thermodynamic cycles when they are operated at less than their optimal efficiency (which typically corresponds relatively closely to substantially unthrottled air delivery combined with combustion at a thermodynamically optimal air/fuel ratio).

In various embodiments of the invention, the thermodynamic efficiency of an internal combustion engine is improved by operating the engine in a variable displacement mode in which some of the working chambers are operated at (or close to) their optimal thermodynamic efficiency while skipping working cycles that are not needed.

Firing Control Unit

Figure 2A:
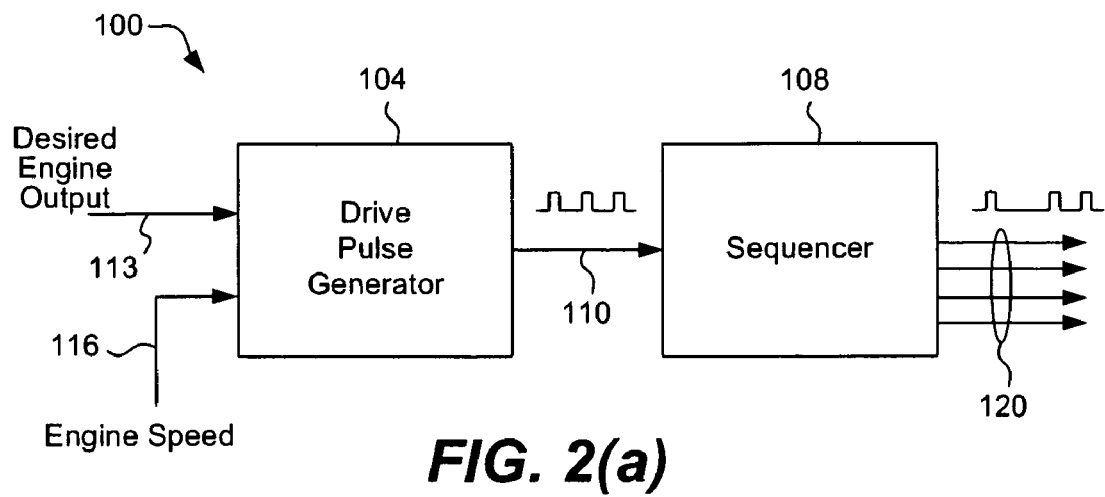
FIG. 2(a) is a functional block diagram that diagrammatically illustrates a control unit that is suitable for operating an engine in accordance with one embodiment of the present invention.

FIG. 2(a) is a functional block diagram that diagrammatically illustrates a control unit that is suitable for operating an engine in accordance with one embodiment of the present invention. In the primary described embodiment the controlled engine is a piston engine. However, the described control is equally applicable to other engine designs. In the illustrated embodiment, a firing control unit 100 includes a drive pulse generator 104 and a sequencer 108. An input signal 113 that is indicative of a desired engine output is provided to the drive pulse generator 104. The drive pulse generator 104 can be arranged to use adaptive predictive control to dynamically calculate a drive pulse signal 110 that generally indicates when cylinder firings are required to obtain the desired output. As will be discussed in more detail below, the controller may be synchronized with the engine speed (input signal 116) so that the generated drive pulse pattern is appropriate to deliver the power desired at the current engine speed—which may be constantly changing. The drive pulse signal 110 may then be provided to a sequencer that orders the pulses to provide the final cylinder firing pattern 120. Generally, the sequencer 108 is arranged to order the firing pattern in a manner that helps prevent excessive or inappropriate vibration within the engine. As is well known in the engine design field, the order that cylinders are fired can have a significant effect on vibrations within many engines. Therefore, as will be described in more detail below, the sequencer is designed to help ensure that vibrations generated by the operation of the engine are within design tolerances. If a particular engine can be run using an arbitrary firing pattern (i.e., the cylinders can be fired in any pattern without generating undue vibrations), then the sequencer could potentially be eliminated and the drive pulse signal 110 could be used to dictate the firing pattern.

In a first implementation, each cylinder that is fired is operated at or near its optimal thermodynamic efficiency. That is, air and fuel are introduced into the cylinder in amounts that allow the most work to be obtained from the cylinders per unit of fuel burnt while still meeting other constraints on the engine (such as emissions requirements, the effects of the combustion on engine life, etc.). In most throttled engines, this corresponds approximately to a "full throttle" position, which permits the most air to be introduced to the cylinder. Many vehicles include engine control units (ECUs) that determine (among many other things) the desired air/fuel ratios and the amount of fuel to be injected for each cylinder firing. Often the ECUs have lookup tables that identify the desired air fuel ratios and/or fuel injection amounts for a number of different operating conditions (e.g., different throttle positions, engine speeds, manifold air flow, etc.) based on various current ambient conditions (including air pressure, temperature, humidity etc.). In such vehicles, the amount of fuel that the firing control unit causes to be injected into each cylinder in the continuously variable displacement mode may be the value stored in the fuel injection lookup table for operating the cylinder in an optimal manner under the current conditions.

The desired output signal 113 may come from any suitable source that can be considered a reasonable proxy for a desired engine output. For example, the input signal may simply be a signal indicative of accelerator pedal position taken directly or indirectly from an accelerator pedal position sensor. Alternatively, in vehicles that do not have electronic accelerator position sensors but have a throttle, a signal indicative of desired throttle position may be used in place of the accelerator position signal. In vehicles that have a cruise control feature, the input signal 113 may come from a cruise controller when the cruise control feature is active. In still other embodiments, the input signal 113 may be a function of several variables in addition to accelerator position. In other engines, that have fixed operational states, the input signal 113 may be set based on a particular operational setting. In general, the desired output signal may come from any suitable source that is available in the vehicle or engine being controlled.

The drive pulse generator 104 is generally arranged to determine the number and general timing of cylinder firings that are required to generate the desired output given the current operating state and operating conditions of the engine. The drive pulse generator uses feedback control, such as adaptive predictive control to determine when cylinders must be fired to deliver the desired engine output. Thus, the drive pulse signal 110 outputted by the drive pulse generator 104 effectively indicates the instantaneous displacement required by the engine to deliver the desired engine output. The displacement required by the engine will vary with operating conditions and can be based on both what has happened in the past and what is predicted for the immediate future. In various embodiments, the drive pulse generator 104 is generally not constrained to limit fluctuations in the number of cylinder firings that are required per revolution of the crankshaft to deliver the desired output. Thus, the effective displacement of the engine can be continuously varied by selecting which cylinders to fire and which cylinders not to fire, on a firing opportunity by firing opportunity basis. This is very different than conventional commercially available variable displacement engines where rapid fluctuations between different displacements, and particularly different cylinder firing patterns, are considered undesirable (see, e.g., U.S. Pat. No. 5,408,974). This ability to continuously vary the effective displacement of the engine is sometimes referred to herein as a continuously variable displacement mode of operation.

A variety of different control schemes can be implemented within the drive pulse generator 104. Generally, the control schemes may be implemented digitally, algorithmically, using analog components or using hybrid approaches. The drive pulse generator may be implemented on a processor, on programmable logic such as an FPGA, in circuitry such as an ASIC, on a digital signal processor (DSP), using analog components, or any other suitable piece of hardware.

One class of controllers that is particularly well suited for use in the drive pulse generator is adaptive predictive controllers. As will be appreciated by those familiar with control theory, adaptive predictive controllers are adaptive in that they utilize feedback to adapt or change the nature of their output signal based on the variance of the output signal from a desired output signal and predictive in that they are integrative so that past behavior of the input signal affects future output signals.

A variety of different adaptive predictive controllers may be used to calculate the chamber firings required to provide the desired output. One class of adaptive predictive controllers that work particularly well in this application is sigma delta controllers. The sigma delta controller may utilize sample data sigma delta, continuous time sigma delta, algorithm based sigma delta, differential sigma delta, hybrid analog/digital sigma delta arrangements, or any other suitable sigma delta implementation. In some embodiments, the sigma delta controller's clock signal is arranged to vary proportionally with the engine speed. In other implementations, a variety of other adaptive predictive controllers including pulse width modulation (PWM), least means square (LMS) and recursive least square (RLS) controllers may be used to dynamically calculate the required chamber firings.

Figure 2B:
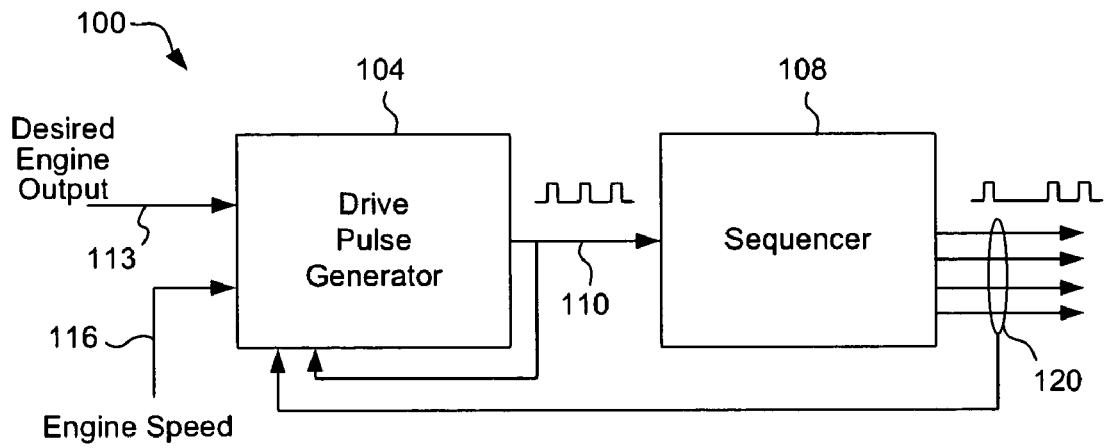
FIG. 2(b) is a functional block diagram of the control unit of FIG. 2(a) that diagrammatically illustrates selected feedback that may be used by the drive pulse generator in some embodiments of the present invention.

The drive pulse generator 104 preferably uses feedback control in determining when drive pulses are appropriate to deliver the desire engine output. Components of the feedback may include feedback of the drive pulse signal 110 and/or feedback of the actual cylinder firing pattern 120 as generally illustrated in FIG. 2(b). Since the drive pulse signal 110 indicates when working chamber firings are appropriate, it may generally be thought of as a signal indicative of requested firings. The sequencer then determines the actual timing of the requested firings. When desired, the information fed back from the actual firing pattern 120 may include information indicative of the firing pattern itself, the timing of the firings, the scale of the firings and/or any other information about the cylinder firings that is desired by or useful to the drive pulse generator 104. Generally, it is also desirable to provide the drive pulse generator 104 with an indication of the engine speed 116 so that the drive pulse signal 110 can generally be synchronized with the engine.

Figure 2C:
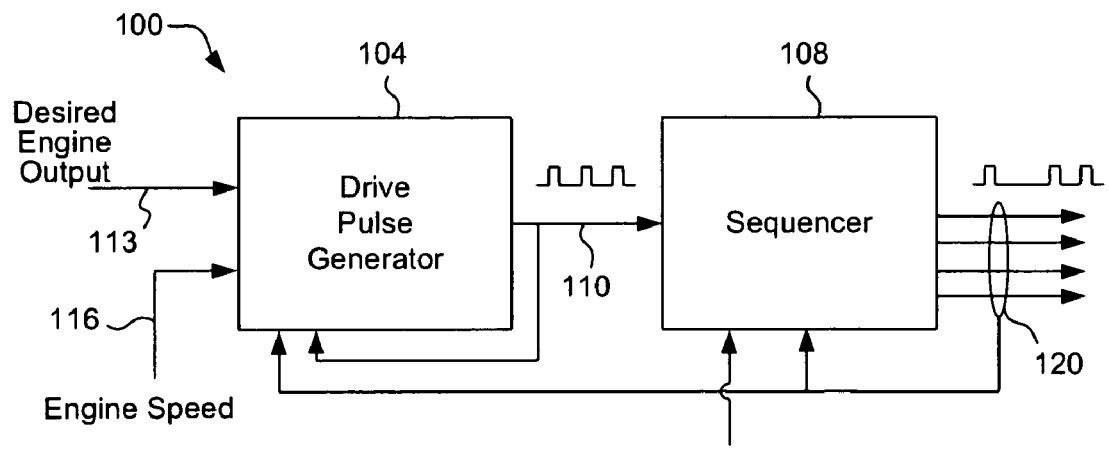
FIG. 2(c) is a functional block diagram of the control unit of FIG. 2(b) that diagrammatically illustrates selected feedback that may be used by the sequencer in some embodiments of the present invention.

Various feedback may also be provided to the sequencer 108 as desired. For example, as illustrated diagrammatically in FIG. 2(c), feedback or memory indicative of actual firing timing and/or pattern 120 may be useful to the sequencer to allow it to sequence the actual cylinder firings in a manner that helps reduce engine vibrations.

Sigma-Delta Control Circuit

Figure 3:
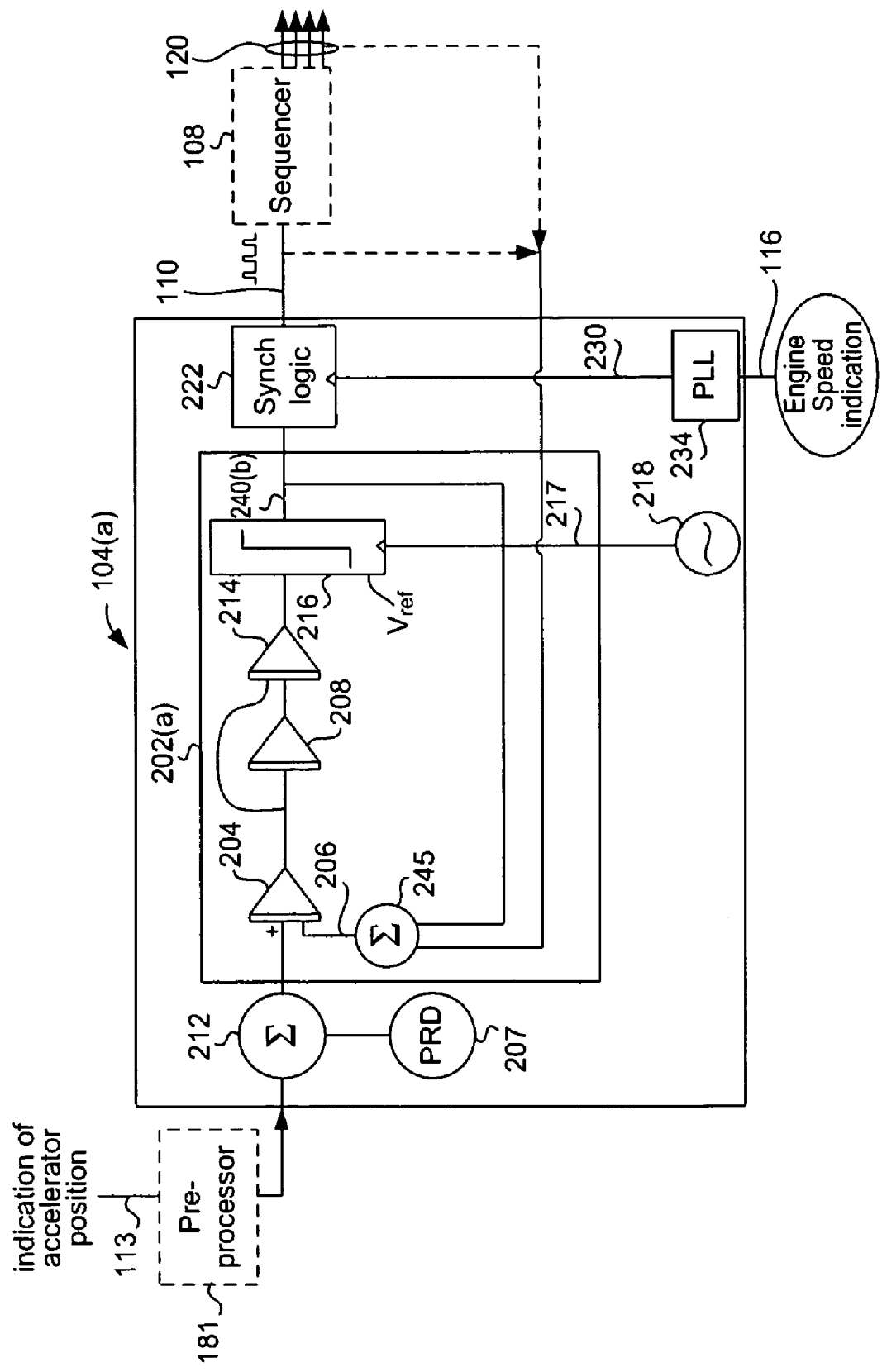
FIG. 3 is a block diagram of a sigma-delta control circuit based drive pulse generator suitable for use with some embodiments of the invention.

Referring next to FIG. 3, one implementation of a sigma-delta control based drive pulse generator 104 will be described. The drive pulse generator 104 includes a sigma-delta controller 202 and a synchronizer 240. The sigma-delta controller 202 utilizes principles of sigma-delta conversion, which is a type of oversampled conversion. (Sigma-delta conversion is also referred to as delta-sigma conversion.) The basic theory of sigma-delta conversion has been described in what is commonly referred to as a seminal reference on the subject: H. Inose, Y. Yasuda, and J. Murakami, "A Telemetering System by Code Modulation: Δ-Σ Modulation," IRE Transactions on Space Electronics Telemetry, Vol. SET-8, September 1962, pp. 204-209. Reprinted in N. S. Jayant, Waveform Quantization and Coding, IEEE Press and John Wiley, 1976, ISBN 0-471-01970-4.

The illustrated sigma-delta control circuit 202(a) is an analog third order sigma-delta circuit generally based on an architecture known as the Richie architecture. Sigma-delta control circuit 202(a) receives an analog input signal 113 that is indicative of a desired output (which might be thought of as desired work output or desired torque). Since sigma-delta controllers of the type illustrated are generally known and understood, the following description sets forth the general architecture of a suitable controller. However, it should be appreciated that there are a wide variety of different sigma-delta controllers that can be configured to work very well for a particular implementation.

In the illustrated embodiment, the input signal 113 is indicative of accelerator pedal position (although as described above, other suitable input signals indicative of, or proxies for, desired output may be used as well). The input signal 113 is provided as a positive input to the sigma-delta control circuit 202(a), and particularly to a first integrator 204. The negative input of the integrator 204 is configured to receive a feedback signal 206 that is a function of the output such that the operation of the sigma delta control circuit 202(a) is adaptive. As will be described later, the feedback signal 206 may actually be a composite signal that is based on more than one output stage. The integrator 204 may also receive other inputs such as dither signal 207 which also will be described in more detail below. In various implementations some of the inputs to integrator 204 may be combined prior to their delivery to the integrator 204 or multiple inputs may be made directly to the integrator. In the illustrated embodiment, the dither signal 207 is combined with the input signal 113 by an adder 212 and the combined signal is used as the positive input. The feedback signal 206 is a combination of feedback from the output of the sigma delta control circuit and the controlled system, which in the illustrated embodiment is shown as feedback representing either the drive pulse pattern 110 or the actual timing of the firings or a combination of feedback from both.

The sigma delta control circuit 202(a) includes two additional integrators, integrator 208 and integrator 214. The "order" of the sigma delta control circuit 202(a) is three, which corresponds to the number of its integrators (i.e., integrators 204, 208 and 214). The output of the first integrator 204 is fed to the second integrator 208 and is also fed forward to the third integrator 214.

The output of the last integrator 214 is provided to a comparator 216 that acts as a one-bit quantizer. The comparator 216 provides a one-bit output signal 219 that is synchronous with a clock signal 217. Generally, in order to insure very high quality control, it is desirable that the clock signal 217 (and thus the output stream of the comparator 216) have a frequency that is many times the maximum expected firing opportunity rate. For analog sigma delta control circuits, it is typically desirable for the output of the comparator to oversample the desired drive pulse rate by a factor of at least about 10 and oversampling factors on the order of at least about 100 work particularly well. That is, the output of the comparator 216 is preferably at a rate of at least 10 times and often at least 100 times the rate at which engine firing opportunities occur.

The clock signal 217 provided to the comparator 216 may come from any suitable source. For example, in the embodiment shown in FIG. 3, the clock signal 217 is provided by a crystal oscillator 218.

It should be appreciated that these clock rates are actually relatively slow for modern digital electronic systems and are therefore readily obtainable and usable. For example, if the controlled engine is a eight-cylinder engine that operates using a four stroke working cycle, then the maximum firing opportunity rate expected might be something on the order of 8,000 RPM×8 cylinders×½. The factor of ½ is provided because, in a normally-operating four-cycle engine, each cylinder has a firing opportunity only once every two revolutions of the engine crankshaft. Thus, the maximum expected frequency of firing opportunities may be approximately 32,000 per minute, or about 533 per second. In this case, a clock operating at about 50 kHz would have nearly 100 times the maximum expected rate of firing opportunities. Therefore, a fixed clock having a clock frequency of 50 kHz or greater would work very well in that application.

In other embodiments, the clock used to drive the comparator may be a variable clock that varies proportionally with engine speed. It is believed that the use of a variable speed clock in a sigma delta controller is different than conventional sigma delta controller design. The use of a variable speed clock has the advantage of insuring that the output of the comparator is better synchronized with the engine speed and thus the firing opportunities. The clock can readily be synchronized with the engine speed by utilizing a phase lock loop that is driven by an indication of engine speed (e.g., a tachometer signal). Some of the advantages of using a variable speed clock that is based on engine speed will be discussed further below with respect to FIG. 7.

The one-bit output signal 240 outputted from the comparator 216 is generated by comparing the output of the integrator 214 with a reference voltage. The output is effectively a string of ones and zeros that is outputted at the frequency of the clock. The output 240 of the comparator 216 (which is the output of the sigma delta control circuit 202(a)) is provided to a synchronizer 222 that is arranged to generate the drive pulse signal 110. In the illustrated embodiment, the sigma delta control circuit 202(a) and the synchronizer 222 together constitute a drive pulse generator 104 (FIG. 2).

The synchronizer 222 is generally arranged to determine when drive pulses should be outputted. The drive pulses are preferably arranged to match the frequency of the firing opportunities so that each drive pulse generally indicates whether or not a particular working cycle of a working chamber should be exercised. In order to synchronize the drive pulse signal 110 with the engine speed, the synchronizer 222 in the embodiment illustrated in FIG. 3 operates using a variable clock signal 230 that is based on engine speed. A phase-locked loop 234 may be provided to synchronize the clock with the engine speed. Preferably, the clock signal 230 has a frequency equal to the desired frequency of the outputted drive pulse signal 110. That is, it is preferably synchronized to match the rate of firing opportunities.

The output signal 240 of the sigma-delta control circuit is generally a digital representation of the analog input signal 113 that is received by the sigma-delta control circuit 202(a). Because (a) the input signal is effectively treated as a desired output, or a desired work output, and (b) the combustion within the working chambers is controlled such that a generally known and relatively constant amount of work is produced by each engine firing—when the digital output signal 240 from the sigma delta control circuit 202(a) contains a certain number of "high" symbols it is appropriate to generate a positive drive pulse (i.e., to order the firing of a working chamber). Thus, conceptually, a purpose of the synchronizer 222 can be thought of as being to count the number of high symbols in the output signal and when enough symbols are counted, sending a drive pulse that is synchronized with the engine speed. In practice, true counting is not actually required (although it can be done in some implementations).

Another characteristic of the output of the described sigma-delta control circuit with a high oversampling rate when used in this type of engine control application is that the controller tends to emit long blocks of high signals followed by blocks of low signals. This characteristic of the output signal 240 can be used to simplify the design of the synchronizer 222. In one implementation, the synchronizer merely measures the length (i.e., time or period) of the blocks of high signals emitted in output signal 240. If the length of the block of high signals exceeds a designated threshold, a drive pulse is generated. If the length of a block of high signals doesn't exceed the threshold—no drive pulses are generated based on that block of high signals. The actual thresholds that are used can be widely varied to meet the needs of a particular design. For example, in some designs the threshold can be the period of the clock signal 230 which (since the clock is synchronized with the engine speed) corresponds to the duty cycle of the drive pulse pattern 110 and the average delay between working chamber firing opportunities. With this arrangement, if the length of a block of high signals is less than one duty cycle, no drive pulses are generated corresponding to the block; if the length of the block exceeds one duty cycle and is less than two duty cycles, then one drive pulse is generated; if it exceeds two duty cycles but is less than three duty cycles, then two sequential drive pulses are generated; and so on.

It should be appreciated that with this arrangement, the "length" or time duration of a burst of high outputs from the sigma-delta control circuit will have to be longer in order to trigger a drive pulse when the engine speed is low than the length of a burst would need to be in order to trigger a drive pulse when the engine speed is high. That is because the duty cycle of the drive pulse signal is longer at lower engine speeds.

In other implementations, the threshold may be set differently. For example, the thresholds might be set such that any block of high outputs having a length that exceeds some designated percentage (e.g., 80 or 90 percent) of the duty cycle of the drive pulse signal causes a drive pulse to be generated, while shorter pulse lengths are effectively truncated.

At first review it may seem that ignoring portions of pulses in the manner suggested above could degrade the performance of the control system to an unacceptable level. However, for many engines, the high frequency of the firing opportunities and the responsiveness of the control system in general make it perfectly acceptable to use such simple synchronizers. Of course, it should be appreciated that a wide variety of other synchronization schemes can be used as well.

As mentioned above, the sigma-delta control circuit is arranged to provide feedback to the first integrator. In the illustrated embodiment, the feedback signal 206 is a composite of: (a) feedback from the output 240 of the comparator 216; (b) the drive pulse pattern 110 outputted by the synchronizer 222; and/or (c) the actual firing pattern 120. A combiner 245 is arranged to combine the feedback signals in the desired ratios. The relative ratios or weights given to the various feedback signals that are fed back to the first integrator 204 may be varied to provide the desired control.

It should be appreciated that although the comparator output, the drive pulse signal and the actual firing pattern are all related—their timing will vary and the general magnitude of the comparator output may differ from the others. The most accurate feedback in terms of reflecting actual engine behavior is the firing pattern—however, there can be significant time delays (from the standpoint of the sigma-delta control circuit 202) between the output of the comparator and the actual firing of a working chamber. The next best feedback in terms of reflecting actual engine behavior is the drive pulse signal. Thus, in many implementations it will be desirable to heavily weight the feedback towards the drive pulse signal and/or the firing pattern. However, in practice, the performance of the sigma delta controller can often be enhanced by feeding back some portion of the comparator output signal 240. By way of example, in some implementations, weighting the feedback of the comparator output signal 240 at in the range of 15-25% of the total feedback signal 206 with the remainder being a reflection of the drive pulse signal or the firing pattern or a combination of the two should work appropriately. Of course, these ratios are just exemplary and the appropriate, preferred and optimal feedback percentages will vary in accordance with the particular implementation of the firing control unit 100 and the associated engine.

In some embodiments, it may be desirable to anti-aliasing filter the input signal 113 and the feedback signal 206. The anti-aliasing functionality can be provided as part of the sigma-delta control circuit 202 or it may be provided as an anti-aliasing filter that precedes the sigma delta control circuit or it may be provided in any other suitable form. In the third order analog continuous time sigma-delta control circuit 202(a) illustrated in FIG. 3, the first integrator 204 provides the anti-aliasing functionality. That is, it effectively acts as a low pass filter.

Another known characteristic of sigma delta controllers is that they sometimes generate "tones" which are cyclic variations in the output signal relative to the input signal. Such tones are particularly noticeable when the analog input signal 113 varies slowly, which is often the case when driving and in many other engine control applications. The presence of such tones within the comparator output signal 240 may be reflected in the engine firing pattern. In some situations, there is a risk that such cyclic variations in the drive pattern can generate undesirable resonances within the engine which may generate undesirable vibration patterns. In extreme cases, the tones could even be manifested as a noticeable fluctuation in drive energy. Accordingly, various arrangements may be provided in an effort to help prevent and/or break up such tones.

One option that can help prevent and/or break up tones in the sigma-delta controller output is to introduce a noise signal into the controller that averages to zero over time, but whose local variations tend to break up the tones in the output signal of the sigma delta controller. In signal processing applications such a noise signal is often referred to as "dither." The dither signal can be introduced at virtually any location within the control loop. In the embodiment illustrated in FIG. 3 the adder 212 combines the input signal 113 with such a dither signal 246. However, the dither signal may be introduced at other convenient locations as well. For example, in sigma delta controllers, dither is often introduced to the last stage before the quantizer (e.g., introduced into integrator 214 in the embodiment illustrated in FIG. 3).

In the illustrated embodiment, a pseudo-random dither generator (PRD) 226 is employed to generate the dither signal, but it should be appreciated that dither can be introduced using a wide variety of other approaches as well. The dither may be generated algorithmically using software or by a discrete dither logic block, or other suitable means or it may be taken from any other suitable source that is available to the controller.

The output of the synchronizer 222 is the drive pulse signal 110 discussed above with respect to FIG. 2. As discussed above, the drive pulse signal 110 effectively identifies the cylinder firings (or instantaneous effective engine displacement) that is needed to provide the desired engine output. That is, the drive pulse signal 110 provides a pattern of pulses that generally indicates when cylinder firings are appropriate to provide the desired or requested engine output. In theory, the cylinders could be fired directly using the timing of the drive pulse signal 110 outputted by the synchronizer 222. However, in many cases it will not be prudent to fire the cylinder using exactly the same timing as pulse pattern 110 because this could generate undesirable vibrations within the engine. Accordingly, the drive pulse signal 110 may be provided to a sequencer 108 which determines an appropriate firing pattern. The sequencer 108 is arranged to distribute the cylinder firings called for in a manner that permits the engine to run smoothly without generating excessive vibrations. The control logic used by the sequencer 108 to sequence the cylinder firings may be widely varied and the sophistication of the sequencer will depend in large part on the needs of a particular application.

Sequencer

Figures 4, 5:
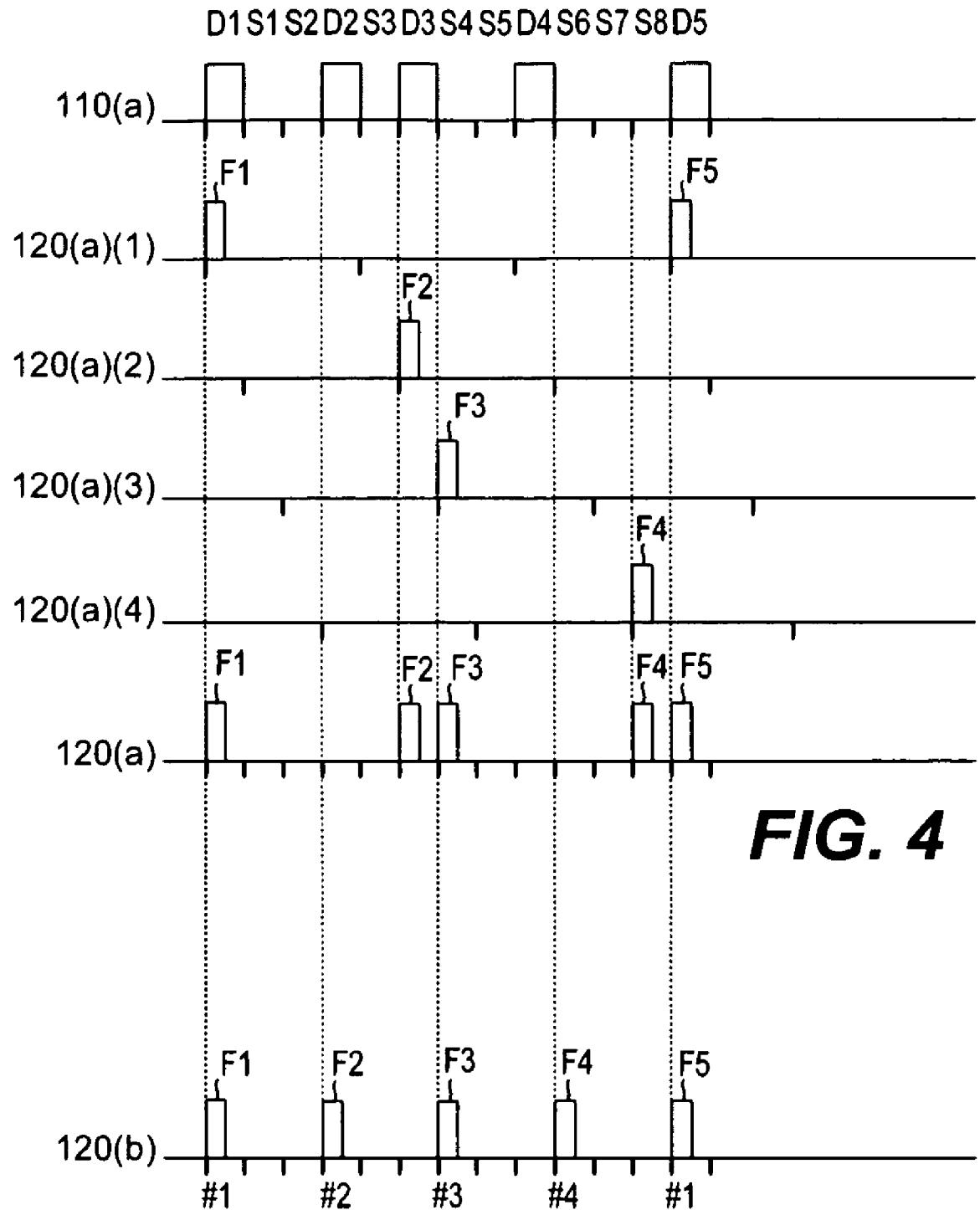
FIG. 4 is a timing diagram illustrating a representative drive pulse pattern and a set of corresponding cylinder firing patterns generated by an embodiment of a sequencer.
FIG. 5 is a timing diagram illustrating a firing pattern generated by a second sequencer embodiment in response to the drive pulse pattern illustrated in FIG. 4.

Referring next to FIG. 4 the operation of a relatively simple embodiment of sequencer 108 will be described that is suitable for many applications. Piston engines in use today operate their cylinders in a fixed sequence. For the purposes of illustration, consider a standard four-cylinder engine. The four cylinders are labeled "1," "2," "3" and "4" by the order in which they would be fired in "normal" operation of the engine (i.e., operation without control to skip working cycles of the engine). It should be appreciated that this order may not, and generally does not, coincide with the physical placement of the cylinders in the engine. The simple sequencer 108(a) may be configured to fire the cylinders in exactly the same order that they would be fired in normal operation. That is, if cylinder #1 is fired, then the next cylinder fired will be #2, then #3, #4, #1, #2, #3, #4, #1, etc.

FIG. 4 is a timing diagram that illustrates a possible drive pulse signal 110(a) inputted to the sequencer 108, the corresponding firing patterns 120(a)(1), 120(a)(2), 120(a)(3), and 120(a)(4), outputted by the sequencer for each of the cylinders, and the composite firing pattern 120(a) outputted by the sequencer. The signals are all clocked at the rate of cylinder firing opportunities, which is twice the RPM with a 4 cylinder, 4-stroke engine. In the pattern illustrated in FIG. 4 the inputted drive pulse signal calls for a first cylinder firing D1, then two skips (S1, S2), a second firing D2, another skip (S3), a third firing D3, two more skips (S4, S5), a fourth firing D4 and three more skips (S6-S8). Since cylinder #1 is available when the first firing D1 is requested, it is fired as indicated by F1 in pattern 120(a)(1). The next two firing opportunities (cylinders #2 & #3) are skipped in accordance with skips S1 and S2 in the input pulse pattern 110(a). The second firing D2 is requested at a time when only cylinder #4 is available—but assuming that the sequencer 108(a) is designed to fire the cylinders in a designated (e.g. normal or conventional) order, it fires cylinder #2 the next time it is available as seen in pattern 120(a)(2) (this corresponds to overall firing opportunity #6). Thus D2 is effectively delayed until cylinder #2 is available and no other cylinders are fired before cylinder #2 comes around, regardless of whether additional firings are requested as can be seen as firing F2 in pattern 120(a)(2).

The drive pulse input signal 110(a) called for a third firing D3 at the sixth firing opportunity. The sequencer 108 allocates this firing to cylinder #3 which is not yet available (only cylinder #2 is then available) so F3 is delayed until cylinder #3 becomes available—which in the illustrated example is the next firing opportunity. The sequencer 108(a) continues to operate using this approach throughout operation in the variable displacement mode. It should be appreciated that the number of firings F instructed by the sequencer 108(a) are identical to the number of drive pulses D received—only the timing has been varied slightly in order to help balance the engine and more uniformly utilize each of the cylinders over time. It is believed that even this very simple sequencer logic will suffice to adequately balance the engine in many implementations that utilize the described sigma-delta control circuit 202 due to the pseudo-randomness of the drive pulse signal 110 generated by the sigma-delta controller. This is particularly true when a reasonable dither is fed into the combiner 212. The fact that the firing pattern 120 is not exactly the same as the drive pulse signal 110 generated by the drive pulse generator 104 may further help break up any tones that might be generated by the drive pulse generator 104.

It is noted that delaying the cylinder firing relative to the drive pulses theoretically makes the engine slightly less responsive to changes in the accelerator pedal position than would be the case if the drive pulses were used to directly control the cylinder firing. However, in practice, this delay may be inconsequential. For example, in a four cylinder engine operating at 3000 RPM, there are 6000 firing opportunities a minute—one hundred a second. Thus, the maximum delay—which would be three firing cycles—would be approximately three-hundredths of a second. Given the cylinder firing rates and the overall mass of the vehicle relative to the energy provided by one firing, delays of this scope will generally be imperceptible to the operator in motor vehicle applications.

A constraint on the first embodiment of the sequencer discussed above is that the cylinders are fired in a fixed order—even when firing opportunities are skipped. However, this is not a requirement in all engine designs. In many applications, it may be perfectly acceptable to have varying firing sequences. For example, in some implementations it might be appropriate to constrain the sequencer to specific "follow patterns." That is, after a particular cylinder is fired, only a set of designated cylinders may be fired next. For example, in an 8-cylinder engine, it may be perfectly acceptable for cylinder 2 or cylinder 6 to follow cylinder 1, and either cylinder 3 or 7 to follow cylinder 2, etc. (In practice even more varied follow patterns can often work effectively). It should be apparent that the sequencer logic can readily be configured to permit these types of fixed firing sequence constraints. By way of example, FIG. 5 illustrates a firing pattern 120(b) generated by a second embodiment of the sequencer which allows cylinders 2 or 4 to follow 1 or 3 and vice versa. The firing pattern 120(b) is generated from the same drive pulse signal 110(a) as illustrated in FIG. 4. It can be seen although the same number of cylinder firings are generated in both embodiments, their respective timing may differ due to differences in the sequencer logic. The actual follow patterns that are appropriate for a particular engine will be highly dependent on the nature of the engine design (e.g., V-block or in-line; number of cylinders, rotational offset of the pistons, etc.), and the vibration analyses necessary to make these determinations are well understood.

Of course, the sequencer 108 can be designed to integrate more sophisticated follow patterns. For example, the last two, three or more firings may be considered in determining which cylinders are available for firing next. In other embodiments, the follow patterns may be a function of engine speed and/or other factors as well.

In still other embodiments, the sequencer 108 does not need to be constrained to specific follow patterns. Rather, the firing pattern can be determined or calculated using any criteria that are appropriate for the engine being controlled. The sequencer 108 may include memory to facilitate more sophisticated analysis and/or may be adapted or programmed to recognize and interrupt undesirable firing patterns that are known to or likely to introduce undesirable vibration into the engine operation. Alternatively or additionally, the sequencer may employ real time vibration analysis that takes into account a variety of factors that might be considered appropriate—including, for example, the rotational speed of the engine, the presence and/or effects of skipped or partial energy working cycles, etc. to appropriately sequence the necessary cylinder firings.

The sequencer can also be designed to address any other design criteria that are deemed important or desirable for a particular engine. For example, to help prolong engine life, it might be desirable to design the sequencer such that all of the working chambers are fired substantially the same amount over time during operation in the variable displacement mode.

As will be apparent to those with experience in electronic control, the logic of the described sequencers can very readily be implemented in digital logic, algorithmically, using analog components or in a variety of combinations of these approaches. Although only a few sequencer logics have been described, it should be appreciated that the logic of the sequencer 108 may be very widely varied to meet the needs of any particular implementation.

Optimized Firings and Air/Fuel Ratios

Many engines are characterized by engine performance maps which model the characteristics of the engine at different engine speeds, loads and other operating conditions. A feature of the described control is that the amount of fuel delivered during each chamber firing can be arranged to match any desired point on the engine performance map. In some circumstances it may be desirable to provide a lean air/fuel ratio, while in others it may be desirable to provide a rich air/fuel ratio.

In most conventional engines, the actual amount of air and fuel delivered to a working chamber is a function of the engine's current operational state. The amount of fuel delivered to a working chamber during a particular working cycle will depend heavily on the amount of air that is delivered to the working chamber. It will also depend in part on the desired air/fuel ratio. The actual amount of air delivered to a chamber during a particular working cycle will vary depending on operational and environmental factors such as manifold air pressure (which is influenced by throttle position), current engine speed, valve timing, inlet air temperature, etc. Generally, the amount of air delivered to a cylinder at a particular throttle position will be less at high engine speeds than it is at low engine speeds in part because the intake valve tends to be open for a shorter period of time when the engine is operating a high RPM.

Modern engine control units receive inputs from a number of sensors that permit the engine control unit (ECU) to monitor the operational state of the engine. By way of example, the sensors may include a mass of air flow sensor (MAF sensor), an ambient air temperature sensor, an engine coolant temperature sensor, a manifold air pressure (MAP) sensor, an engine speed sensor, a throttle position sensor, an exhaust gas oxygen sensor, etc. The ECU interprets the sensor inputs in order to calculate the appropriate amount of fuel to be injected and controls engine operation by manipulating the fuel and/or air flow. The actual amount of fuel injected depends on the engine's operational state and environmental conditions including variables such as engine and ambient temperatures, engine speed and workload, manifold pressure, throttle position, exhaust gas composition, etc. Generally, an extensive amount of effort and analysis is undertaken in order to define an optimal or desired amount of fuel to be provided to cylinders under different operational conditions. Often these efforts result in the development of multi-dimensional maps that define the appropriate amount of fuel to be injected for specific operating conditions. The fuel injection maps are often reflected in lookup tables stored in the ECU. The ECU then uses the lookup tables to determine the appropriate amount of fuel to inject into a working chamber based upon the current operational state of the engine.

When developing the fuel injection maps, a variety of factors may be considered in determining the optimal (or otherwise desired) amount of fuel to deliver for a given amount of air introduced to the cylinder. These factors may include the effects on fuel efficiency, power output, emissions control, fuel ignition, etc. These analyses necessarily have to make some estimates and/or assumptions regarding relevant factors that may not be precisely known or controllable (e.g., properties of the fuel such as the octane or energy content of the fuel). Therefore, the "optimized" amount of fuel that is delivered for a given amount of air and/or the optimized air/fuel ratios are not fixed values. Rather, they may vary between engines and/or between operational states of the same engine based on the performance parameters that are considered important for that engine or operational state. These design choices are typically reflected in the fuel injection maps utilized by the ECUs. Further, many ECUs are designed to dynamically adjust the air/fuel ratios based on feedback received from various sensors such as the exhaust gas lambda (oxygen) sensor.

The same considerations may be taken into account when operating in the continuously variable displacement mode. In some implementations, the throttle position in the continuously variable displacement mode will be substantially fixed (e.g., wide open or close to wide open). However, this is not always the case and it should be appreciated that the actual mass of the air that is introduced into the working chamber will not always be the same even when the air delivery is unthrottled due to differences in the operational state of the engine and environmental conditions. For example, at higher engine speeds, less air may actually enter a cylinder during a particular working cycle than would enter the same cylinder at lower engine speeds. Similarly, at sea level, more air will typically enter a cylinder than would occur at high elevations at the same engine speed. Valve timing and other factors will affect the amount of air introduced into the cylinder as well. Preferably, these factors are taken into account when determining how much fuel to deliver during any particular working cycle. Further, factors such as the desired air/fuel ratio may be taken into account when determining the amount of fuel to deliver. The desired air/fuel ratio may also vary dynamically based on the operational state of the engine. In some circumstances, it may be desirable to use lean air/fuel mixtures, whereas in other operational states it may be desirable to utilize richer air/fuel mixtures.

The determination of the amount of fuel to deliver during any particular optimized firing can readily be accomplished by using the same (or more simplified) types of fuel injections maps that are used today. A difference for throttled engines being that only one (or a limited number) of throttle positions would need to be considered. When retrofitting existing engines, the existing fuel injection maps can typically be used for this purpose. Of course, as the technology develops it may be desirable to develop fuel injection maps specifically tailored for operation in the continuously variable displacement mode or to utilize analytical or computational methods to determine the appropriate amount of fuel to deliver.

Therefore, it should be appreciated that the actual amount of fuel that is injected during each working cycle is generally not an absolute and fixed number (although that is possible and indeed desirable in some implementations). Rather, it is preferably an amount that is optimized for the current operational state of the engine. As suggested above, when we refer to an "optimized" amount of fuel—we don't necessarily mean that the amount is optimized for any particular variable (e.g., fuel efficiency, power, thermodynamic efficiency, environmental concerns). Rather, it may be an amount of fuel that is deemed appropriate for a particular operational state. The optimized quanta of fuel may be provided in a lookup table, calculated dynamically, or determined in any other suitable manner. When lookup tables are provided, the actual quanta of fuel delivered may be adjusted relative to the value provided by the lookup table based on emissions or other feedback received by the ECU.

Figure 14:
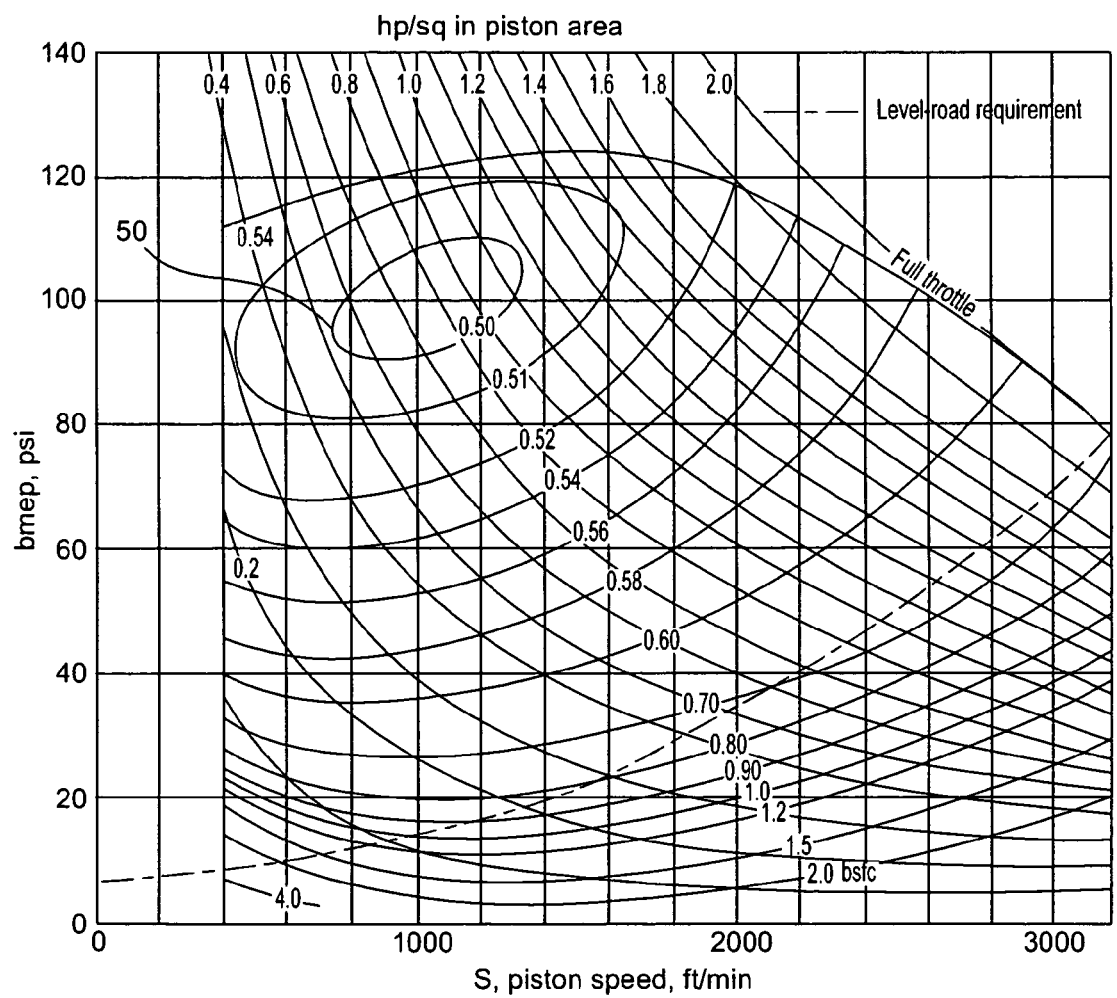
FIG. 14 is a representative engine performance map for a typical US passenger-car engine taken from: *The Internal-Combustion Engine in Theory and Practice, Volume 1: Thermodynamics, Fluid Flow, Performance*, 2$^{nd}$ Edition, Revised, by Charles Fayette Taylor, The MIT Press.

In some implementations it will also be desirable to more affirmatively control the amount of air that is introduced to the cylinders. To help illustrate some of the benefits of controlling the amount of air delivered to the cylinders, reference is made to the performance map for a typical conventional passenger car illustrated in FIG. 14. The figure illustrates both the brake specific fuel consumption (BSFC) and the engine output as a function of the brake mean effective pressure (BMEP) and the piston speed (which directly corresponds to engine speed). The lower the fuel consumption (BSFC) the better the fuel economy of the engine. As can be seen by the graph, the optimal fuel efficiency for the engine represented in FIG. 14 is found in the operational range labeled 50 on the graph. It can be seen that this is at a throttle position slightly less than full throttle with the engine operating within a relatively narrow range of engine speeds. Thus, it should be appreciated that the optimal operating conditions for a particular engine may not be at full throttle and therefore, in throttled engines, it may be desirable to adjust the throttle setting to something less than full throttle to obtain better fuel efficiency or to obtain other desired performance characteristics.

It is noted that FIG. 14 illustrates the brake specific fuel consumption (BSFC) for a typical automotive engine. BSFC is a traditional measure of fuel efficiency for throttled engines operated in a conventional manner. When an engine is operated in a skip fire mode, it will often be preferable to optimize for indicated specific fuel consumption (ISFC) as opposed to BSFC. Indicated specific fuel consumption has an inverse relationship with thermodynamic efficiency so optimizing for a maximum thermodynamic efficiency is understood to be the same as optimizing for a minimum indicated specific fuel consumption. It is understood that a performance map that charts ISFC as opposed to BSFC may look fairly similar to the BSFC performance chart, however the optimized zones may be somewhat different.

As will be appreciated by those familiar with the art, a number of factors will influence the overall efficiency and performance of an engine. One important factor is the amount of air actually delivered to the cylinders. In throttled engines, the amount of air delivered to the cylinders can be modulated using the throttle. Some engines also permit dynamic adjustment of the valve timing which provides further control over the amount of air delivered to the cylinder during active working cycles. Still other engines incorporate turbochargers, superchargers or other mechanisms to further increase or otherwise alter the amount of air delivered to a cylinder during a particular working cycle. When desired and available, any one or combination of the throttle, valve timing or other devices that affect air delivery to the cylinders may be set, optimized or controlled to help optimize the cylinder firings. It should also be appreciated that the most fuel efficient (or otherwise optimized) settings of the throttle, valve timing, etc may vary based on operational condition of the engine. Accordingly, it may sometimes be desirable to adjust the settings (e.g. the throttle setting) during operation of the engine to further improve engine performance. For example, it is understood that in some engines, the most efficient throttle position may vary slightly with the rotational speed of the engine and other factors. In such engines it may be desirable to slightly adjust the throttle position as a function of engine speed or other appropriate factors. By way of example, it is well understood that intake manifold pressure has a significant impact on the efficiency of any particular cylinder firing. Thus, it may be desirable to control the throttle in a manner that maintains a substantially constant intake manifold pressure.

It is noted that this type of throttle modulation is quite different than the throttle modulation utilized during conventional operation of a throttled engine. In conventional operation, the throttle is the primary mechanism used to modulate the output of the engine. The throttle is opened more to provide additional power, and closed more to reduce engine output. In contrast, the described adjustments of throttle position are used to help optimize the firings—and the power output of the engine is primarily controlled using the skip fire techniques described herein.

In addition to optimizing the air and fuel delivery, there are other variables that affect the performance of an engine. For example, it is well understood that in spark ignition engines, the timing of the spark plugs firings can affect both the thermodynamic efficiency of the cylinder firings and the corresponding emissions profile. Many automotive engines are able to adjust the timing of the spark plug firings during operation of the engine. If such control is available, the timing of the spark plug firings can also be adjusted to help optimize the firings. As will be appreciated by those familiar with the art, it is generally desirable to advance the spark when the engine is colder and retard the spark when the engine is warmer. The spark timing may also vary with the rotational speed of the engine and/or other factors.

As discussed elsewhere in this application, when an engine is run in a skip fire mode, there may be non-trivial variations in the temperature of different cylinder due to such factors as the firing history of each particular cylinder. For a variety of reasons, there may also be variations in the actual fuel charge delivered (or expected to be delivered) during any particular working cycle. If desired, a spark timing controller or control algorithm can be designed to attempt to optimize the spark timing of each working chamber firing on a firing by firing basis based on the firing history of that particular cylinder and other factors believed to be relevant to the spark timing.

In another example, some engines have cam phasers, electronic valve controls or other mechanism that may be used alter the valve timing. Some mechanisms (e.g., electronic valves) may facilitate control on a cylinder by cylinder/working cycle by working cycle basis. Others, (e.g. mechanical cam phasers) may facilitate dynamic control of valve timing during operation of the engine—but not on an individual cylinder by individual cylinder basis. The controller can be designed to control the valve timing at whatever level is appropriate based on the mechanisms that are available to alter the valve timing.

Although optimization of only a few operational variables (e.g., air, fuel and spark timing) have been described, it should be appreciated that any variable that is controllable during operation of the engine that affects the operation of the engine may optionally be adjusted as desired to help optimize the cylinder firings. At the same time, although it may be possible to optimize a number of variables, it is not necessary to optimize all of the possible variables, and it is not necessary to optimize any variable to their maximum thermodynamic efficiency or to any specific emissions characteristics. Rather, the benefits of the described skip fire type operation of an engine using generally optimized charges of air and fuel may be obtained over a range of different specific settings of the mechanisms (e.g., fuel injectors, valve lifters, throttle, spark timing, etc.) that affect the thermodynamic efficiency of the cylinder firings.

The determination of the specific settings used at any given time during operation of the engine may be made in any suitable manner. For example, the settings may be calculated dynamically in real time during operation of the engine based upon the current operational state of the engine. Alternatively, appropriate settings may be stored in lookup tables based on predetermined engine performance maps. In still other implementation, values that are calculated or retrieved can be modified based on current operational parameters, such as the emissions profile or current state of the catalytic converter. Of course, a variety of other conventional or non-conventional approaches may be used to determine specific parameters for the optimized firings.

Fuel Rich Drive Pulses

There may be times when it is desirable to provide a richer air/fuel mixture to the working chambers than the normal/full drive pulses in order to provide a desired emissions profile (e.g., to better match the emissions output of the engine to the catalytic converter) or for some other purpose. In effect, this requests delivering more fuel to the cylinder than the amount of fuel that is deemed optimal and more than a stoichiometric amount of fuel. By way of background, in many implementations, the "optimized" amount of fuel that is used for a particular operational state will correspond to a slightly lean mixture. That is, a slightly less than stoichiometric amount of fuel is introduced into each fired working chamber. An issue that can sometimes arise when running an engine lean is that the emissions profile of the cylinders may not always fall within the capacity of the catalytic converter. Similar types of problems occur in the operation of engines in a conventional mode. In order to address this issue, some conventional engines are periodically run in a fuel rich mode (i.e., a slightly greater than stoichiometric amount of fuel is provided) for a brief period in order to adjust the emissions profile in a manner that facilitates good operation of the catalytic converter.

Figure 10:
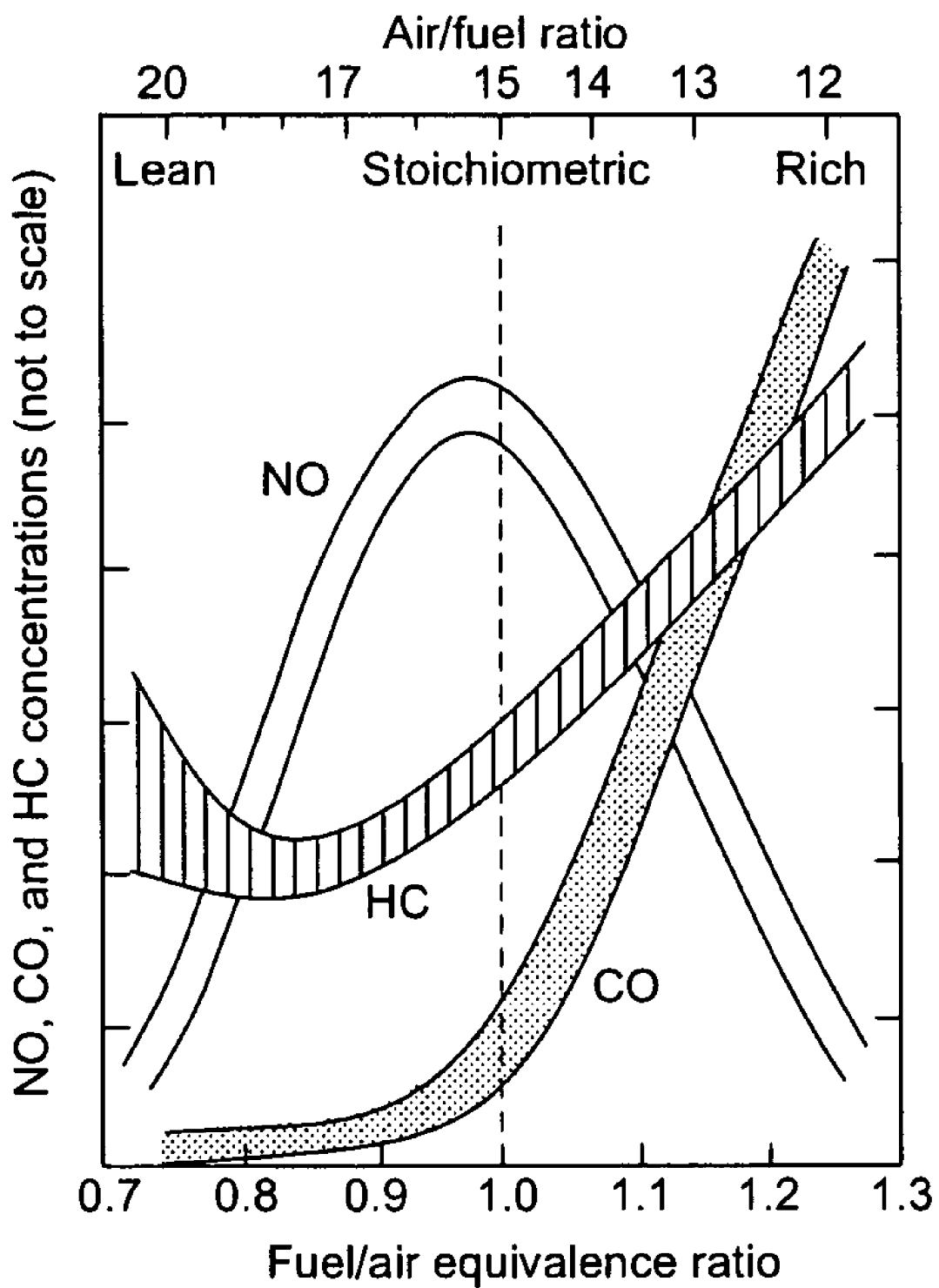
FIG. 10 is a graph illustrating the concentration of certain pollutants as a function of air/fuel mixture in a conventional spark-ignition engine.

The nature of the issue can be understood with reference to FIG. 10, which illustrates selected emissions characteristics of a representative Otto cycle engine at different air/fuel ratios. As can be seen therein, the amount of carbon monoxide (CO) in the emissions tends to increase as the mixture becomes richer and increases quite significantly in mixtures that are richer than stoichiometric. The amount of Nitric Oxide (NO) tends to be highest at a near stoichiometric mixture ratio and fall off relatively quickly as the air/fuel ratio becomes leaner or richer. The amount of hydrocarbons (HC) in the exhaust also generally tends to increase relatively quickly with increases in the mixture ratio beyond stoichiometric conditions. Many catalytic converters require the presence of a certain amount of carbon monoxide to run efficiently. If the engine runs lean, it is possible that the catalytic converter will become depleted and will not work efficiently due to the lack of carbon monoxide. In order to address these problems, some existing ECUs are designed to periodically run the engine with a rich fuel mixture for a short period of time in order to replenish the catalytic converter.

The catalytic converter depletion issue can readily be addressed in the described skip fire variable displacement mode by periodically utilizing fuel rich firings. If desired, the drive pulse generator can be configured to sometimes output "fuel rich" drive pulses that request the delivery of more than an optimal amount of fuel or the sequencer may be arranged to sometimes provide excess amounts of fuel to selected cylinders as appropriate. Alternatively, the sequencer or other logic within the fuel processor or engine control unit may be arranged to direct the fuel injection drivers to increase the amount of fuel delivered in a particular firing, or set of firings in order to obtain the desired effect.

In implementations that utilize the sigma-delta controller 202 at least in part to determine the timing of fuel rich pulses, one of the states of a multi-bit comparator such as described below with reference to FIG. 8 may be used to designate the fuel rich pulses. Although the sigma-delta controller 202 can be used to designate the timing of the fuel rich pulses, that is not necessary. Rather, the timing and generation of the fuel rich firings may be determined by a variety of components in response to signals received from exhaust gas monitoring sensors and/or the ECU. By way of example, in various implementations, the decision to introduce a fuel rich pulse or a set of fuel rich pulses may be made independently by the synchronizer 222, the sequencer 108, the ECU, or other logic within the fuel processor in order to obtain the desired effect. It is noted that a fuel rich firing typically will not significantly affect the power generated by the firing. That is, the amount of energy derived from a fuel rich firing will typically relatively closely approximate the energy derived from a normal/optimized firing. Therefore, from a control standpoint, there is typically no need to alter the feedback to the sigma delta control circuit based on the additional fuel being delivered during fuel rich firings. However, if desired, the feedback can be estimated in another way or adjusted to reflect the actual energy output of the firing.

Partial Drive Pulses

In most of the embodiments discussed above—all of the cylinders that are actually fired are operated at near their optimal efficiency, e.g., with constant or near constant fuel supply with substantially unthrottled operating conditions (e.g. at or close to "full throttle" in throttled engines). However, that is not a requirement. In some circumstances it may be desirable to operate some of the working cycles at less than their optimal efficiency to meet specific short term needs such as more precisely controlling and/or smoothing the engine's output or to address emissions concerns. The described drive pulse generator 104 can readily be configured to cause some percentage (or all) of the non-skipped working cycles to operate at less than their optimal efficiency when that is desired. More specifically, the drive pulse generator may be configured such that some of the generated drive pulses are partial drive pulses that call for reduced energy output cylinder firings. The partial drive pulses may all have the same energy output level (e.g., ½ energy) or may have multiple discrete energy output levels (e.g., ½ and ¼ energies). Of course, the number of different energy output levels that are used in any particular implementation, as well as their relative magnitude, may be widely varied.

When a partial drive pulse is received by the sequencer 108, it arranges for a lower amount of fuel to be injected into the cylinder that is fired corresponding to the partial drive pulse. If the fuel used in the engine can be ignited in a lean environment, it may be possible to reduce the amount of fuel delivered for a particular firing without adjusting the throttle for partial drive pulses so that the amount of air delivered to a cylinder will be unaffected by a partial drive pulse. However, most gasoline engines can not consistently and reliably ignite the gasoline fuel in a very lean environment. Therefore, in such engines it would be necessary to also reduce the amount of air introduced to the cylinders designated to fire as partial drive pulses. It should be appreciated that the response time of most throttles is relatively slow. Therefore, in throttled engines, it may be difficult to toggle the throttle position between full drive pulses and the partial drive pulses in situations where the partial drive pulses are interspersed with full drive pulses. In such engines it may be desirable to reduce the air provided to the cylinders using any other techniques that is controllable in the particular engine, as for example by altering the valve opening timing if valve timing is controllable as it typically would be with electronic valves.

When partial drive pulses are used, the amount of air and fuel that is delivered to the cylinder is preferably measured to supply the proportional amount of drive energy that is reflected in the partial drive pulse. For example, if the partial drive pulse calls for one half the total energy, then the amount of fuel that is supplied would be the amount of fuel expected to deliver one half the total drive energy—which would typically be more than ½ of the fuel required to operate at optimal efficiency, because the thermodynamic efficiency of the cylinder will be lower when it is operated under sub-optimal conditions.

It should be appreciated that although it is preferable to relatively accurately correlate the net energy delivered by the partial energy working cycles with the engine output requested by the partial drive pulses—that is not always required. Particularly when the partial drive pulses are a relatively low percentage of the total number of drive pulses (e.g., less than about 10 or 15 percent), their cumulative impact on the total drive energy delivered by the engine is not particularly large so approximations may still work adequately. For example, a one half drive pulse could be correlated to the delivery of one half (or other fixed percentage—e.g. 65%) of the fuel delivered in a full drive pulse.

Partial drive pulses can be useful in a number of ways. As suggested above, they can be used to help smooth the engine's output. This smoothing can be useful at any engine speed and is especially noticeable at lower engine speeds (low RPMs). Another reason that partial drive pulses are sometimes desirable is to help further reduce engine vibrations. As pointed out above, many controllers such as the sigma-delta control circuit 202 described above are susceptible to generating tones—which in some conditions can lead to resonant vibration or other undesirable vibration patterns. Dither can be introduced to the controller and the sequencer can be designed appropriately to help break up some of these patterns. However, in many applications it may be desirable to provide other mechanisms to help break up patterns and/or more actively control engine vibrations. Partial drive pulses may be used in addition to and/or in place of other pattern control measures discussed herein.

Yet another reason to provide partial drive pulses is to change the emissions profile of the engine. For example, in some operational conditions in some vehicles, the catalytic converter may not be well suited to handle the emissions profile of only optimized full drive pulses. In such situations, the amount of fuel delivered to some of the fired cylinders may be varied to better match the emissions output of the engine to the catalytic converter.

The simple synchronizer 222 described above can readily be configured to handle partial drive pulses. In one implementation, the synchronizer is configured to generate a half energy pulse any time the burst length of high outputs from the sigma-delta control circuit is within a designated range. For example, if the burst length of high outputs is more than half the period of the drive pulse but less than a full drive pulse period, then a half pulse can be generated. Of course, the actual trigger points can be varied to meet the needs of a particular application (e.g., burst lengths from 45 to 90 percent of the drive pulse period or other suitable ranges may be set to trigger the generation of a partial drive pulse).

If multiple partial drive pulse levels are provided, then each level can be configured to trigger on burst lengths having an associated range. For example, burst lengths of 25-49% of a drive pulse period may cause the generation of a quarter drive pulse, and burst lengths of 50-99% of the drive pulse period may cause the generation of a half drive pulse. Again, it should be appreciated that this is merely an example and that the actual ranges and conditions that trigger the partial drive pulses may be widely varied.

When desirable, partial drive pulses can also be used when the burst lengths are significantly longer than the drive pulse period, but not long enough to trigger another full drive pulse. For example, a partial drive pulse may be triggered when the remainder of a burst (i.e., the length of the burst that exceed an integer number of drive pulses) falls within a designated range.

In order to insure that the engine operates efficiently and within acceptable emission levels, in many applications it may be desirable to limit the number of partial drive pulses outputted by the drive pulse generator 104. For example, it may be desirable to limit partial drive pulses to some percentage (e.g., a maximum of 10 or 20 percent) of the drive pulses generated by the drive pulse generator. If desired, the percentage of drive pulses permitted may also be a function of engine speed. For example, if the engine is running very slowly (e.g., idling) it may be desirable to permit more (or all) of the drive pulses to be partial drive pulses.

The drive pulse generator may readily be configured to provide partial drive pulses and to set appropriate conditions or limitations regarding the availability, number and/or timing of the partial drive pulses. By way of example, a sigma delta controller and corresponding drive pulse generator suitable for generating multiple level drive pulses is discussed below with reference to FIG. 8.

Partial Throttle Operation

In still other embodiments of throttled engines, the engine can sometimes be operated in a skip fire type variable displacement mode with a throttle position that is substantially less than wide open (i.e., at partial throttle). In these embodiments the engine remains in a continuously variable displacement mode even though it is not optimizing the working cycles. That is, the amount of air and fuel delivered to each cylinder/working chamber is reduced relative to an optimized firing, although the actual amount of fuel delivered may be optimized for the amount of air actually delivered to the cylinder (e.g. in stoichiometric proportions). Although the fuel efficiency of an engine operating at partial throttle with deoptimized working cycles will generally not be as good as it would be at full throttle, the partial throttle skip fire operating mode will generally still provide better fuel efficiency at a given engine speed/power output than conventional throttled operation of the engine because the active working cycles are more efficient than the working cycles would be if every cylinder was being fired.

This partial throttle skip fire operation can be useful in a variety of applications—including application where relatively low power outputs are required and/or at low engine speeds, as for example, when the engine is idling, the vehicle is braking, etc. Notably, partial throttle skip fire operation tends to facilitate smoother engine operation and/or control at low engine speeds. Also, partial throttle operation may be used to provide better engine braking, to improve emissions characteristics, etc. In some implementations, the controller may be arranged to automatically adjust to a lower throttle setting while continuing to operate in the skip fire type variable displacement mode when the engine is in pre-defined operational states. For example, the control unit may reduce the throttle setting if the engine speed drops below a designated threshold (e.g., below 2000 RPM, 1500 RPM, etc.), during braking and/or before the engine has fully warmed up.

If desired, multiple different partial throttle settings may be employed to meet the needs of a particular application. For example, one implementation might employ four distinct throttle states. One state generally corresponding to full throttle position, a second state corresponding to half throttle position, a third state corresponding to a quarter throttle position and a fourth state corresponding to an idling and/or braking throttle position. The conditions used to trigger transitions between operational states can vary widely in accordance with the needs of a particular application.

The throttle position does not have to be completely fixed in the different partial throttle operational states. Rather, secondary considerations may influence the specific throttle setting used at any particular time in any particular operational state. For example, the actual throttle position for the idle state may vary somewhat based on how warm or cold the engine is. In another example, the actual throttle position for the "full throttle" state may vary to optimize fuel efficiency as discussed above. Of course, other considerations may influence the specific throttle settings as well.

Variable Displacement Operating Mode

There are times during the operation of an engine where it might not be desirable to operate the engine in the described continuously variable displacement operating mode. At such times, the engine can be operated in the same way it would be operated today—i.e., in a normal or conventional operating mode—or in any other manner that is deemed appropriate. For example, when an engine is cold started it may not be desirable to immediately operate any of the cylinders at their optimal efficiency or even in a partial throttle skip fire mode. Another example is when the engine is idling and/or the engine speed is low and the load on the engine is low. In such conditions it may be undesirable to operate the cylinders at their optimal efficiency or even using partial throttle skip fire because it may be difficult to ensure smooth operation of the engine and/or control vibrations. To illustrate the issue, consider a 4 cylinder engine that is idling at 600 RPM with no significant external load (e.g., the vehicle is in neutral). In such a state, a total of 1200 firing opportunities (i.e., 300 firing opportunities per cylinder) would occur each minute or 20 each second. However, in neutral, the load seen by the engine will primarily be the frictional losses associated with keeping the crankshaft turning. This load may be low enough such that more than a second would pass between sequential optimized firings. Such delays between firings could lead to rough operation and undesired vibrations in many engines. Similarly, when the driver is braking and in other situations where the load on the engine is very low, it may be undesirable to continue to optimize the working cycles.

To handle these types of situations, the engine can be run in a conventional mode any time that skip fire operation is undesirable. A wide variety of triggers can be used to determine when it is appropriate to shift between operational modes. For example, an engine control unit that incorporates the optimized control described herein can be arranged to operate in a conventional mode for a fixed period after every start—or until the engine reaches a desired operating temperature. Similarly, the engine control unit may be arranged to operate in a conventional mode any time the engine is operating at speeds outside a prescribed range—e.g., the engine is idling or otherwise operating at less than a threshold engine speed (e.g. 1000 or 2000 RPM). Although the concern is greatest when the engine is operating at low engine speeds, if desired or appropriate, the optimized control of the variable displacement mode can also be disengaged at engine speeds above a designated threshold as well (e.g., at above 6000 RPM). This might be desirable to provide additional power at high engine speeds or when maximum engine output is desired. In another example, the engine could be operated in the variable displacement mode only when the engine is running within a specific range of engine speeds (e.g., 2000-4000 RPM). In other examples, the trigger thresholds for entering and exiting the variable displacement mode may exhibit hysteresis. For example, it may be desirable to provide a first threshold (e.g. operating at over 2500 RPM) to trigger entering into the variable displacement mode and to provide a second threshold (e.g. operating at less than 2000 RPM) for exiting the variable displacement mode. The staggering of the thresholds helps reduce the probability of frequent transitions in and out of different operating modes.

In other specific examples, the variable displacement mode can be disengaged: (a) when the vehicle is braking; (b) if undesired vibrations or other perceived problems are detected in the engine; (c) when the load on the engine is below a designated threshold; and/or (d) when the accelerator pedal position is below or above a designated threshold. In still further examples, the variable displacement mode can be disengaged when there are time delays between sequential firings of greater than a designated period of time (e.g., 0.2 seconds) or gaps between sequential firings of more than a designated number of firing opportunities. In still other embodiments, it may be desirable to provide some hysteresis or delay in transitions between modes. For example, if a threshold is set for the engine to transition from the variable displacement mode to a conventional operational mode if the engine speed falls below 2000 RPM, it might also be desirable to require that the engine operate at less than 2000 RPM for some period (e.g., at least 3 seconds) before the mode transition is made. Such a waiting period helps reduce the probability that very transitory events, such as shifting gears, would trigger a mode change.

It should be appreciated that these are just examples of situations where it may be desirable to opt out of the continuously variable displacement mode and that there may be a wide variety of other situations that might warrant disengagement and/or triggers that may be used to initiate disengagement. The described situations and triggers are simply examples which can be used individually, in any desired combination, or not at all. Various embodiments of engine control units, firing control units, firing control co-processors and other arrangements that incorporate the described optimizations can be arranged to disengage the continuously variable displacement mode whenever deemed appropriate and/or whenever operation in the continuously variable displacement mode is deemed inappropriate.

Feedback Control

In the discussions herein, we often refer to controlling the engine to provide a desired output. In a simple analog approach, feedback indicative of a firing or drive pulse may be provided at a generally constant level ("height") for a period of time corresponding to the period between firing opportunities. It should be appreciated that when this type of feedback is provided, the engine is controlled to provide a desired output that is a function of accelerator pedal position (or other input signal) and the pedal position does not correspond to a fixed torque or power value. Thus, the actual power delivered by the engine at any desired output level will be a function of the current operational state of the engine and the current environmental conditions just as it is in most current vehicle control systems. More specifically, it should be appreciated that the actual amount of drive energy or power that is obtained from each working chamber firing will vary as a function of a number of variables. For example, an optimized firing of an engine operating at a high elevation and at a high RPM will likely provide less power than an optimized firing at a low RPM. Similarly, an optimized firing that has been tuned for emissions considerations may provide a slightly different amount of power than an optimized firing tuned primarily for fuel efficiency.

The controllers described above work well under any conditions and indeed tend to mimic the type of response that is found in many vehicles today. However, the actual amount of power delivered by the engine for a given throttle position may vary slightly as a function of environmental and/or operating conditions. It should be appreciated that the controller can readily be set up to provide different control behavior when desired. For example, the control may be set up to treat the desired output signal as a request for a designated amount of power output from the engine. In one such embodiment, each firing of a cylinder can simplistically be thought of as providing a specified amount of work, and the feedback can be based on this notion. That is, each fed back firing opportunity delivers the same quanta of negative feedback to the sigma delta controller.

It should be appreciated that in real engines, the amount of work, power and/or torque that is actually obtained from the firing of a particular cylinder will not always be the same. A number of factors influence the thermodynamic energy available from a particular firing. These factors include the mass, temperature and pressure of the air introduced to the cylinder, the amount of fuel, the air/fuel ratio and the energy content of the fuel, the engine speed, etc. In various embodiments, the feedback may be adjusted and/or feed forward may be used so that the feedback used within the controller more accurately reflect the actual amount of work (or torque or power) expected from each firing. In specific embodiments, the feedback can be adjusted with changes in the engine's operating conditions and/or when suitable information is available, to account for variations between firings. The variations between firings may be due to: controlled factors such as the fuel charge delivered to a cylinder (e.g., variations between lean, rich and normal fuel charges); inherent factors such as geometric differences in the intake manifold runners which may result in different amounts of air being introduced to different cylinders; operational factors such as current engine speed, firing history, etc.; and environmental factors such as ambient air temperature and pressure, etc.

Most modern automotive engines have a variety of sensors that are made available to the engine control unit that can be used to help estimate the amount of actual energy obtained by any particular firing. By way of example, input variables such as manifold pressure (MAP), mass air flow, air charge temperature, cam timing, engine speed (RPM), injection timing, spark timing, exhaust oxygen level, exhaust back pressure (especially in turbocharged engine), exhaust gas recirculation, and any other inputs that might be available in a particular engine can all be used to help estimate the amount of useful work that is expected from the current firing and adjusting the feedback to the control circuit appropriately. Thus, the feedback provided to the controller may be arranged to vary as a function of any of these factors in combination or individually. Although such fine tuning of the feedback may be desirable in some applications, it should be appreciated that it is not necessary in all application.

In practice, the actual work obtained from any particular firing may be estimated based on a limited number of inputs that are available in a particular engine (e.g., only the amount of fuel provided, only the quanta of air and fuel provided and the engine speed, etc.). Of course, other approaches to estimating the output can be used as well. These estimates can be calculated dynamically during operation, provided in lookup tables accessible by the controller or determined using a variety of other approaches.

Still further, if the engine begins to operate in a range where the power or torque outputted by the engine begins to level or drop off, the drive pulse generator can be designed to recognize the operational state and respond appropriately. In some embodiments, this may be accomplished by simply disengaging the continuously variable displacement mode and operating using conventional control. In some other embodiments, the drive pulse generator may be adapted to adjust the outputted drive pulses accordingly. Of course, a wide variety of other approaches can be used to handle these situations as well. In situations where partial drive pulse/throttle firings are made, the feedback may be scaled to more accurately reflect the reduced energy generated by the reduced fuel firing(s).

In a controller that is designed to treat the input signal as an indication of a desired power output, the quanta of feedback associated with each firing may be scaled to reflect the amount of energy obtained from each firing. In controllers that take feedback from several location (as for example, illustrated in FIG. 3), the feedback from each source is scaled in appropriate proportions such that the total feedback relatively accurately reflects the power provided by a particular firing. It is noted that in a digital system, the quanta of feedback provided may be set appropriately to reflect the power expected from a particular firing. In an analog sigma delta system, the "width" of the feedback pulse is indicative of the engine speed and the "height" of the feedback pulse is scaled such that the total quanta of feedback corresponds to the energy obtained from the associated firing.

In most of the embodiments described above it is contemplated that the feedback from the driven system (e.g., the drive pulse pattern 110 outputted by the synchronizer 222; and/or the actual firing pattern 120) be based on an explicit feedback signal. However, it should be appreciated that in some embodiments the required information can be derived from other signals that might be available to the controller. For example, each actual firing of a working chamber will have some effect on the engine speed (i.e., it will increase the engine speed). The change may be quite small in terms of its impact on the driven mechanical system—but such changes may be readily detectable using modern electronic signal processing techniques. Therefore, if desired and the tachometer signal is accurate enough, the actual firing pattern feedback can be derived from a tachometer (engine speed) signal if desired. In general, the feedback may be derived from any signal source that is available to the controller that would have information indicative of the firing pattern embedded therein.

Figure 18:
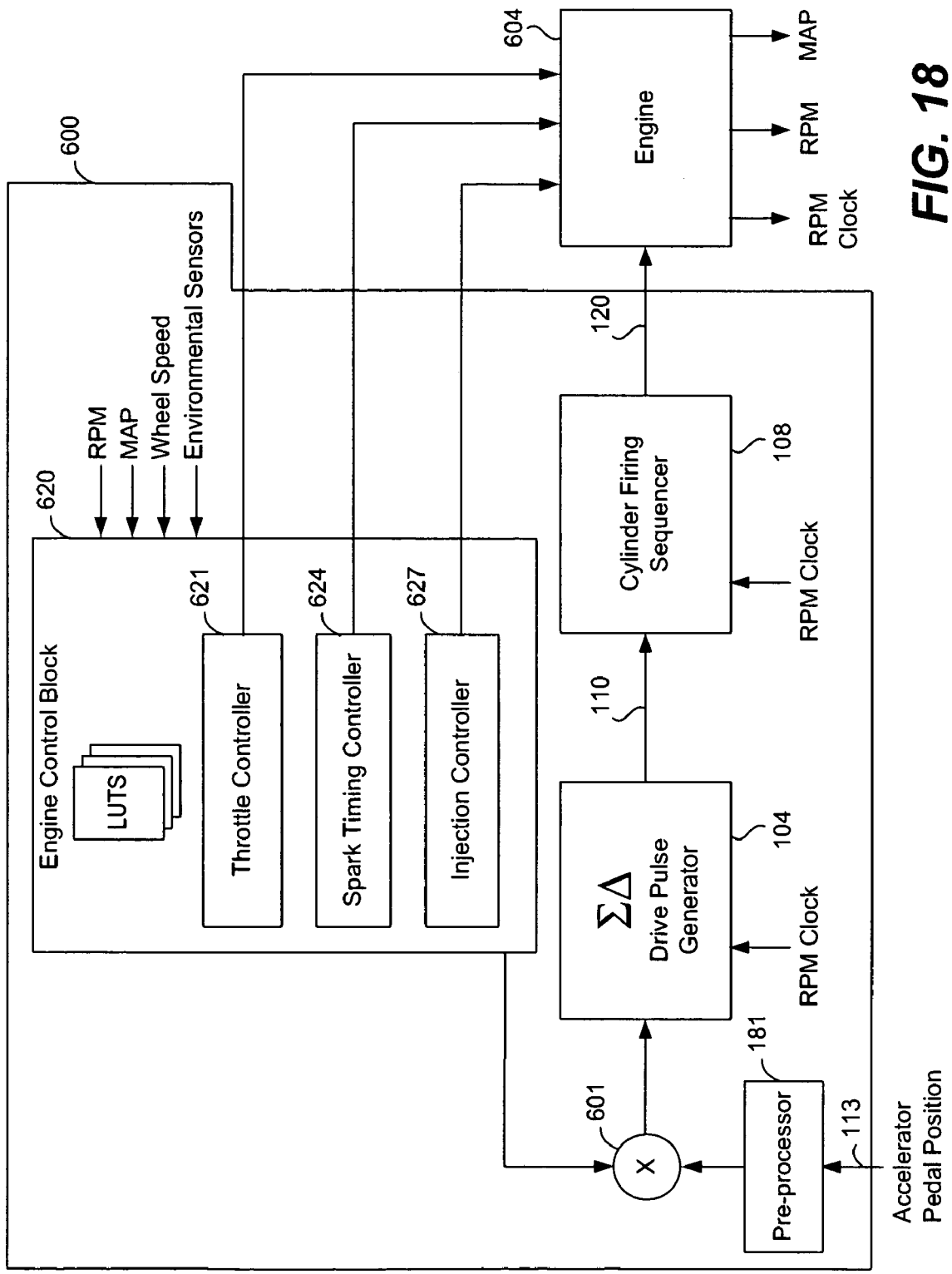
FIG. 18 is a block diagram of an engine control system in accordance with another embodiment of the invention that uses both feedback and feed forward in the determination of the firing pattern.

Referring next to FIG. 18, another embodiment of the invention that utilizes both feedback and feed forward in the determination of the firing pattern will be described. In this embodiment, the controller 600 is arranged to compensate for variations in the drive energy provided by each firing. The figure also illustrates some of the other engine controls in addition to the firings that may be controlled by any of the described engine controllers. In the illustrated embodiment, an indication of the accelerator pedal position is fed to a preprocessor 181 that is arranged to preprocess the pedal position signal. As previously discussed, the pedal position signal is treated as an indication of the desired output of the engine. The purpose of the preprocessor 181 is described in more detail in the section labeled pre-processor stage below. The preprocessed pedal signal is fed to a multiplier 601 which multiplies the pedal signal by a factor appropriate to compensate for variations in the drive energy provided by the firings. This is an example of using feed forward to adjust the controller for variations that occur during operation. The factored desired output signal is provided to drive pulse generator 104, which produces drive pulse signal 110. The drive pulse signal 110 is fed to sequencer 108 which determines the actual firing pattern 120 as previously described. The firing pattern 120 is used to control the cylinder firings of engine 604.

The engine controller 600 is also arranged to control other engine variables such as the throttle position, the spark timing, and the injectors. In the illustrated embodiment, an engine control block 620 is arranged to instruct component controllers to control their associated components in a manner that facilitates efficient or optimized operation of the engine. The engine control block 620 is arranged to determine the desired setting for any of a variety of controllable components in order to permit the engine to operate efficiently. Generally, the appropriate setting will be found in appropriate lookup tables. However, when desired, the appropriate setting can be calculated dynamically based upon current operational and/or environmental conditions.

In the illustrated embodiment, the engine control block 620 includes a throttle controller 621, a spark timing controller 624 and an injection controller 627. In other embodiments, the engine control block may include additional device drivers appropriate for controlling other controllable components of a specific engine or vehicle. One such example is a transmission controller for controlling an automatic transmission. In still other embodiments, a stock ECU can be used to handle these functions of the engine control block.

The engine control block 620 receives a number of sensor inputs including current engine speed (RPM), intake manifold pressure (MAP), wheel speed, available environmental sensors, etc. The engine control block 620 also has a series of lookup tables that store the desired setting to provide the desired (e.g. optimized) firings based on current conditions. In a simple system, these variables might include the desired fuel charge, spark timing and manifold pressure. The tables may be multi-dimensional maps based on factors such as the rotational speed of the engine, current environmental conditions and/or other aspects of the operational state of the engine. The specific controllers then control their associated components to obtain the desired firings. It should be appreciated that existing engine controller technology are very well suited for handling the control of these components and accordingly, such functionality, may readily be incorporated into the engine control block. These controls may also vary some of the actual settings (e.g. the fuel charge) to accommodate other concerns such as emissions control, etc. It should be appreciated that the specific control schemes, algorithms and prioritizations used in the various component controllers may be widely varied to meet the needs of any particular application. For example, as explained above, in some situations it may be desirable to maintain a relatively constant manifold pressure. The desired manifold pressure for specific operating conditions can be stored as part of the lookup table in an injection map. This information may be passed to the throttle controller which receives appropriate available sensor inputs—such as the current manifold pressure, the current engine speed (e.g., RPM), etc. Based on these inputs the throttle controller may be arranged to controls the throttle in a manner that provides the desired manifold pressure.

Based upon the setting and the current operating conditions of the engine, the engine control block 620 can also determine the amount of drive energy that standard firings will provide relative to a nominal drive energy. A suitable multiplier factor can then be calculated to supply to the multiplier 601 to compensate for the difference between the expected drive energy of a firing and the nominal drive energy of a firing. For example, if the drive energy expected from the firings is 95% of the nominal drive energy, the multiplier may be arranged to multiply the pedal input by the inverse of 95%. The use of a multiplier in this manner during optimized firings causes the controller to effectively treat the accelerator pedal position as a request for a desired power.

As explained above, there are also times when it will be desirable to operate at partial throttle while remaining in the skip fire variable displacement mode. The multiplier can be used to facilitate such partial throttle operation as well. For example, if a decision is made to utilize half energy firings, the engine control block 620 may set the throttle and the fuel charge appropriately such that each firing provides approximately half of the drive energy. At the same time, the multiplier factor supplied to multiplier may be set to "2". This effectively tells the drive pulse generator 104 that twice as many firings are needed to provide the desired output. It should be apparent that the multiplier can be used in this manner to facilitate operation at virtually any desired level of partial throttle.

It should be appreciated that the engine controller architecture shown in FIG. 18 schematically illustrates just one suitable implementation and that the architecture of the engine controller may be widely varied to perform the desired functions and to appropriately direct the controllable engine components. It should also be appreciated that in any given implementation, the described multiplier may be used to facilitate both desired power based control and partial throttle operation—or just one of those functionalities.

In some implementations it will be desirable to utilize the described skip fire mode of operation in conjunction with cruise control. Generally the same firing control unit may be used in conjunction with cruise control as previously described, with the cruise controller providing the input signal 113 just as cruise controllers work today.

In yet another embodiment, the cruise control functionality can even be built into the drive pulse generator, although the interpretation of the input signal 113 and the feedback to the controller need to be changed appropriately. Typically, cruise control seeks to maintain a constant vehicle speed, as opposed to a constant power output. To function as a cruise controller, an indication of the desired speed may be used as the input signal 113 instead of an indication of accelerator pedal position. The desired speed input signal may come directly or indirectly from the cruise control unit or from any other suitable source. In such implementations the feedback provided to the drive pulse generator is indicative of the current speed of the vehicle as opposed to specific firings. The indication of the may come from any suitable source, as for example from one or more wheel speed sensors, a speedometer or other appropriate sources. When the vehicle transitions out of cruise control, the input signal and the feedback can revert back to the desired output signal and feedback indicative of the firings respectively as appropriate. Alternatively, if the conditions that exist when the vehicle transitions out of cruise control are unsuitable for skip fire operation, the vehicle can be transitioned to a conventional operating mode where all of the cylinders are fired all of the time.

In the description herein, a number of different feedback and feed forward approaches are described. Any of these approaches can be made to work adequately in specific applications. The choice of the approach used will have an effect on the engine's performance and efficiency and the selection of a particular feedback approach may be based on the desired performance characteristics for the engine.

Retrofitting Current Engines

In current commercially available variable displacement engines, selected cylinders are shut down—often in banks—and the remaining cylinders are used in their normal operating mode. Since fewer cylinders are working when some of the cylinders are shut down, the remaining cylinders operate under conditions that are more efficient than they would be if all of the cylinders were operating. However, they still don't operate at their optimal efficiency.

When selected cylinders of a conventional variable displacement engine are shut down, the valves associated with those cylinders are typically closed and kept closed through the operation of the engine. In engines that don't have electronic valves, this requires a more complex mechanical structure and some coordinated efforts to selectively disengage the valves from the camshaft. As a result, commercially available variable displacement engines are not designed to rapidly move back and forth between different displacements.

One reason that the valves are kept closed in cylinders that are shut down in conventional commercially available variable displacement engines is to help reduce pumping losses that would inherently occur in the shut down cylinders if the valves of the skipped cylinders open and close at their normal times. The same type of pumping losses would occur if the valves are opened and closed at their normal times when operating in the described continuously variable displacement mode. Therefore, when used in engines that have selective control over the opening and closing of the valves, it may be desirable to close the intake and exhaust valves of cylinders that are skipped. However, the fuel and thermodynamic efficiency of the engine will be substantially improved even if the valves of skipped cylinders are opened and closed at their normal times.

The perceived need to close the valves associated with shut down cylinders may have led to the impression that it is impractical to convert existing fixed displacement internal combustion engines to variable displacement engines. One very significant advantage of the present invention is that an appropriate controller can readily be installed on many existing engines to retrofit those existing engines to significantly improve their fuel efficiency. This is true even if it is not possible or practical to close the valves of skipped cylinders—which will be the case in a significant majority of the existing engines. Retrofitting can be done by replacing the engine control unit (also often referred to as an engine control module) with an improved engine control unit that incorporates the control of the present invention; by interfacing a firing control co-processor or a co-processing unit that incorporates the control of the present invention with the existing engine control unit; or by otherwise incorporating the described control into an existing engine control unit.

Another reason that the valves associated with shut down cylinders are held in the closed position in conventional variable displacement engines is to insure that the emission control unit doesn't try to change operation of the engine due to the very large amount of oxygen that would be present in the exhaust gas stream if the valves associated with unfueled, skipped cylinders opened and closed normally. Specifically, if air is sucked into a cylinder and not burned before it is expelled from the cylinder, the expelled gas will have dramatically more oxygen in it than would be present if fuel had been injected into the cylinder and burned (which would have the effect of consuming much of the oxygen present). Many engines have exhaust gas oxygen sensors to detect the amount of oxygen present in the exhaust gas stream. The oxygen sensors provide information to the emission control units, which utilize the information to help manage engine operations to insure that exhaust gas emissions are minimized and conform with environmental regulations. If the valves of skipped cylinders are allowed to open and close in a conventional manner while operating in the continuously variable displacement mode, then the exhaust gases will have far more oxygen than the emissions control unit expects. Accordingly, when engines that have exhaust gas oxygen sensors are run in a manner that allows the valves of skipped cylinders to open and close in a normal fashion, it will typically be desirable to adjust or override the oxygen sensor signal, or to adjust any control that is based on the level of oxygen in the exhaust gas to account for the extra oxygen that is expected in the exhaust. In other applications, it may be desirable or necessary to replace the oxygen sensor with a wideband lambda sensor that works with the engine control unit or firing control co-processor. Additionally, as previously mentioned, it may sometimes be desirable to optimize the amount of fuel provided with each firing and/or to periodically provide partial or fuel rich fuel charges to insure that the exhaust emissions are suitable for good operation of the catalytic converter.

Another factor that may be desirable to consider when retrofitting current engines is trying to ensure that the "feel" of operating the engine (e.g. driving the vehicle that includes the controlled engine) does not change too appreciably after the retrofit is made. That is, it might be desirable for the feel of the engine to be similar before and after a retrofit is made. One way to help accomplish this is to transition the engine from the continuously variable displacement mode to a "normal" operating mode that modulates the throttle and does not skip cylinders anytime it is perceived that the feel of operating the engine might change significantly. In other implementations, the control in the variable displacement mode may be altered in specific situations to provide a feel that is closer to the feel that would be experienced during normal operations.

By way of example, many vehicles (including trucks, cars, etc.) experience noticeable "engine braking" when the accelerator pedal is released. In the continuously variable displacement mode, the throttle is typically held at something close to wide open to allow maximum air to be supplied to the working chambers and thereby facilitate optimizing the thermodynamic efficiency of the engine. However, when the throttle is wide open, the pumping losses experienced by the engine are reduced and accordingly, the amount of engine braking that would be felt by a user may be reduced by a noticeable amount. In some situations, it may be desirable to try to more closely mimic the engine braking feel that would be perceived during pre-retrofit operations. Again, this can be accomplished by transitioning the engine from the continuously variable operating mode to a normal operating mode any time the accelerator pedal is released or the brakes are applied.

Alternatively, the throttle could be partially or fully closed (e.g., closed to the extent it would be closed during normal operations), while still skipping selected firings in the continuously variable displacement mode. If such an approach were used to facilitate engine braking, the amount of fuel introduced into the fired working chambers would be adjusted to correspond to the reduced amount of air that would be provided to the cylinders due to the closing, or partial closing of the throttle.

Although the concept of engine braking is being discussed in connection with a discussion of retrofitting existing engines, it should be appreciated that the design goals for a particular engine may require more effective engine braking than would be provided with a fully open throttle even in new engines. Accordingly, the firing control unit 100 may be arranged to adjust the throttle position to provide desired engine braking as desired. Alternatively or additionally, in engines that facilitate selective control of the opening and closing of the valves (e.g. engines that have electronic valves) it may be possible to modulate the opening and/or closing of the valves of skipped cylinders to provide enhanced engine braking.

It should be appreciated that engine braking is just one facet of an engine's "normal" feel that may be desirable to replicate during operation in a variable displacement mode. The firing control unit 100 may be designed to replicate other desired aspects of an engine's operational feel as well.

Exhaust and Emissions Systems

As will be appreciated by those familiar with vehicle engine design, the exhaust systems of many existing engines are tailored to the expected chemistry and temperatures of the exhaust gases. When the valves of skipped cylinders are allowed to open and close in a conventional manner while operating in the continuously variable displacement mode, air is effectively pumped through the unfired cylinders. This results in the exhaust gases outputted under skip fire operation having a very different profile than the exhaust gases that would be expected during normal operation of the engine. Most notably, when air is pumped through unfired cylinders, the exhaust gases will have more oxygen (and often far more oxygen) than would be present during normal operation of the engine. The unburnt air pumped through skipped cylinders is also much colder than the exhausts gases that are expelled from a fired cylinder. Many conventional emissions systems are not capable of handling either the cold or the excess oxygen that are inherent when air is pumped through unfired cylinders. Therefore, in many application (and especially in applications which pump air through unfired cylinders), it will be important to make sure that the exhaust and emissions systems are capable of handling the exhaust gases outputted using the skip fire approach.

The nature of the problem is particularly acute in engines that are required to meet high emissions standards and are designed to throttle the delivery of air to the working chambers in order to modulate power (e.g. most non-diesel automotive engines). The exhaust systems utilized in such engines often have catalytic converters that are not designed to handle the large amounts of oxygen or the relatively cold air that are inherently present when air is pumped through skipped cylinders.

Unlike most Otto cycle engines, most commercially available diesel engines run unthrottled and modulate the amount of fuel that is delivered to the cylinders in order to control the engine output. As such, diesel engines tend to have widely varying amounts of oxygen in the exhaust gases. Therefore, the exhaust systems in diesel engines are generally arranged to handle a much wider variety of exhaust chemistries than the exhaust systems used in many Otto cycle engines. By way of example, some automotive diesel engines use a scrubbing system to clean the exhaust gases. Such scrubbing systems are well suited for handling the exhaust gases having oxygen rich pulses and varying temperatures that are inherent when air is pumped through skipped cylinders. Of course, a variety of other emissions systems may be used as well, so long as they are capable of handling the profile of exhaust gases outputted during skip fire operation.

When designing new engines, the exhaust and emissions systems can readily be designed to meet the needs of any particular design. However, when retrofitting existing engines to run in the described variable displacement mode, emissions and exhaust issues often will need to be considered as well. If the engine is capable of closing the valves of unfired cylinders, then the existing exhaust and emissions systems can typically handle the exhaust generated during operation in the variable displacement mode. Any required fine tuning of the exhaust profile can typically be accomplished by firmware or software in the fuel processor or engine controller appropriately setting and/or occasionally varying the charge of fuel delivered during firing opportunities as discussed above.

Many existing engines don't have complex emissions systems and therefore their existing exhaust systems are not adversely affected by the excess oxygen present in the exhaust stream when air is pumped through unused cylinders. In these engines, the emissions will typically be improved by operation in the variable displacement mode because the engine is operated more efficiently with more consistent combustion chamber conditions so the fuel charge can readily be tailored to provide a better emissions profile.

Many other existing engines employ emissions systems that are not capable of handling excess oxygen pumped through unfired systems. In such engines, it may be necessary to modify the exhaust and/or emissions systems such that they are able to handle the excess oxygen and bursts of relatively cold air passing through the exhaust. In some applications, this may require replacement of the exhaust and emissions systems, with systems that are capable of handling the exhaust stream.

In still other embodiments, it may be desirable to effectively provide two parallel exhaust paths. One for exhaust gases expelled from fired working chambers and the other for air pumped through unfired cylinders. This can theoretically be accomplished by inserting a flow director in the exhaust path (e.g., in the exhaust manifold) that can be toggled between two positions—a first position that directs the exhaust gases to the normal exhaust and emissions systems, and a second position that directs the exhaust gases to an alternative exhaust path that bypasses the normal emissions equipment, but has any emissions equipment that may be required to handle air pumped through unfired cylinders. With this arrangement, the fuel processor can control the exhaust flow director (not shown) to toggle back and forth between positions to direct the exhaust gases to the appropriate path. It should be appreciated that such control is quite easy to implement because the fuel processor knows when each firing occurs and the delay between a firing and the corresponding exhaust gases reaching the flow director is relatively easily determined based on the engine's geometry and current rotational speed.

In still other implementations one or more high speed valves could theoretically be inserted into the intake manifold (or at another appropriate locations in the intake air flowpath) and controlled to block air from being delivered to skipped cylinders (i.e., before the air reaches the cylinder's intake valve). This would substantially reduce or eliminate the pumping of air through unfired cylinders and would eliminate the corresponding need to alter the existing exhaust and/or emissions systems. Of course, in other embodiments other suitable modifications can be made to the engine to insure that either (1) air is not pumped through unused cylinders; or (2) the exhaust and emissions systems can handle any air pumped through unused cylinders.

Wall Wetting Issues

There are a variety of different fuel injections schemes that are used in conventional internal combustion engines. One common technique—referred to as port injection—contemplates injecting fuel into an intake port in the fuel intake manifold. The fuel then mixes with air in the intake manifold before the air/fuel mixture is introduced into a cylinder by the opening of the cylinder's intake valve. In most port injection systems, considerable efforts are made to optimize the fuel injection characteristics (including injector targeting, injection timing, injection spray envelope and injection fuel droplet size) in order to reduce engine emissions, increase performance and/or improve fuel economy. However, when running such an engine in a skip fire mode, different injection characteristics may be desirable.

A known issue for port injection systems is referred to as wall wetting. Specifically, wall wetting occurs when fuel is injected into the intake manifold and some amount of the fuel impinges upon the walls of the intake manifold thereby causing the formation of a thin film of fuel on the intake manifold walls. The amount of fuel that coats the walls of the manifold varies based on a number of factors including: (a) the injector targeting which includes the direction of fuel spray from the injector relative to the intake valve; (b) the injection spray envelope which includes the width of the fuel spray from the injector; (c) fuel drop size; (d) injection timing which involves the start and finish time for injecting fuel relative to the times that the valve is opened and closed. (Note that if the injection continues after the intake valve is closed, fuel will impinge upon the closing valve and spray back over the walls of the intake manifold).

Wall wetting has several unique implications when running an engine in a skip fire mode where air is pumped through cylinders that are not fired. Most notably, if the walls of the intake manifold adjacent a particular cylinder are coated with fuel after that particular cylinder is fired and that cylinder is not fired during its next firing opportunity, then air passing over wet portions of the intake manifold will typically evaporate some of the fuel film wetting the walls of the cylinder. Such evaporation of fuel wetting the walls of the intake manifold has several potential effects. One potential effect is that evaporated fuel may be pumped through an unfired cylinder and out the exhaust. This increases the level of hydrocarbons in the exhaust and reduces fuel efficiency. When unburned hydrocarbons are present in the exhaust, they will likely be consumed by the catalytic converter. Over time, too many hydrocarbons in the exhaust cases can reduce the life of the catalytic converter. Another effect of wall wetting evaporation is that the next time a skipped cylinder is to be fired, less fuel may be available to the cylinder since some of the fuel intended for the cylinder may effectively go to "rewetting" the walls of the intake manifold.

In order to reduce the effects of wall wetting losses, it may be desirable to alter the injection profile to a profile less susceptible to wall wetting—e.g., by altering the injection timing or other characteristics of the injection. It also may be desirable to adjust the amount of fuel delivered in any particular cylinder firing to compensate for the evaporative wet wall losses that are expected to have occurred by the time a skipped cylinder is fired. Of course, the actual amount (quanta) of additional fuel that is appropriate for any given firing will vary widely with the operational state of the engine and any appropriate compensation may be used.

As will be understood by those familiar with wall wetting, in some existing engine designs the amount of fuel that is present on the walls of the intake manifold may be nearly as much as or potentially even more than the amount of fuel that is injected during any one cylinder firing. If a normal fuel charge is injected after several skipped cycles, there is a risk that almost all of the injected fuel may go to "rewetting" the walls of the intake manifold and that the cylinder may not receive enough fuel to fire properly which is undesirable. It should be appreciated that it is particularly desirable to adjust the quanta of fuel injected in these types of situations.

In some of the embodiments discussed above, the firing of the cylinders is effectively randomized. In engines having fuel delivery techniques that are susceptible to wall wetting or similar types of losses, such randomization of the cylinder firing will inherently experience some reduction in fuel efficiency due to the wall wetting losses. Accordingly, when appropriate it may be desirable to sequence the firings in a manner that favors more recently used cylinders. This can readily be implemented using an appropriate cylinder firing prioritization algorithm in the sequencer.

By way of example, a simple sequencer designed for use in a multi-cylinder engine may be programmed to only fire a cylinder that was fired during its previous firing opportunity unless more than a designated number of requested firings (e.g., more than one or two requested firings) are queued in the sequencer. Alternatively, the sequencer may be programmed to delay a requested firing for up to a designated number of firing opportunities (e.g., up to 2 or 3 firing opportunities) if it can be satisfied by firing a cylinder that was fired the previous round. These embodiments are merely intended as examples of the types of considerations that might go into the development of the sequencing logic. It should be appreciated that the appropriate logic may vary significantly between different engines and based on different design priorities. Of course, significantly more sophisticated logic may be, and typically would be incorporated into the sequencing algorithm. As a general rule, in embodiments that seek to reduce wall wetting losses it is desirable to design the sequencer in a manner that ensures that a significant majority of the actual firings of the firings occur in working chambers that were fired during their previous working cycle. By way of example it may be desirable to ensure that at least 75% of the firings occur in working chambers that were fired during their previous working cycle, even when less than 50% of the working chambers are actually fired.

Another firing control approach that reduces wall wetting losses and the corresponding emission increases will now be described. In this embodiment, instead of randomizing all of the cylinders, only one cylinder (or a small subset of the cylinders) is randomized at any given time. The other cylinders are either fired all of the time, or not at all. For the purpose of illustration, consider a scenario in which a six cylinder engine is being operated in a manner that requires the output of two and a half (2½) cylinders operating at an optimized efficiency (e.g., at their maximum compression and an optimized air/fuel ratio). In theory, the appropriate amount of power could be delivered by firing two of the cylinders all of the time and a third cylinder half of the time. If a relatively modest amount of additional power is required, then the third cylinder may be controlled to fire a higher percentage of the time to increase the power output of the engine to meet the need. If a little less power is required, then the third cylinder may be fired a lower percentage of the time to meet the engine's reduced power requirement. If a request is made for more power than can be delivered by the three cylinders firing all of the time, then three cylinders may be fired all of the time and another cylinder (e.g., a fourth cylinder) may be controlled to delivered the additional power required. As more power is required, additional cylinders may be added to the fired set of cylinders. As less power is required, cylinders may be removed from the fired cylinder set. This approach to sequencing is generally referred to herein as a single cylinder modulation skip fire approach.

One advantage of the single cylinder modulation skip fire approach is that it tends to significantly reduce wall wetting losses and the corresponding reduction in fuel efficiency and increased emissions issues that occur in certain types of engines (e.g. port injected engines). A side benefit is that the single cylinder modulation skip fire approach tends to have good vibration characteristics (i.e., it tends to generate less vibrations than many other firing patterns). This is believed to be due the fact that the frequency of variation in the firing pattern is reduced (e.g., reduced by a factor equal to the number of cylinders that the engine has).

The described single cylinder modulation skip fire approach can be implemented using a variety of different arrangements. For example, the sequencer 108 described above can readily be configured to deliver such a firing pattern. The single cylinder modulation skip fire approach may be implemented algorithmically or in logic in the sequencer while using a drive pulse generator in accordance with any of the other described embodiments. Alternatively, a different control architecture incorporating a specialized drive pulse generator that controls the firing of only a subset of the available cylinders may be utilized. By way of example, an alternative controller architecture that is particularly well adapted for providing single cylinder modulation skip fire is described below with respect to FIG. 12.

As will be appreciated by those familiar with wall wetting issues, direct injection engines tend to avoid most of the wall wetting issues that are experienced by port injection engines (although even direct injection engines may experience the development of a small film of fuel on the cylinder walls). Thus, some of the advantages of the described skip fire variable displacement engine are more pronounced with direct injection engines than port injection engines. However, with good management of the wall wetting issue, port injection systems can get efficiencies that are close to the efficiencies that are available to direct injection systems.

Fuel Control Processor

The described control can be implemented in a wide variety of different manners. It can be accomplished using digital logic, analog logic, algorithmically or in any other appropriate manner. In some embodiments the continuously variable control logic will be build into the engine control unit (ECU—sometimes also referred to as an ECM—engine control module). In other embodiments, the continuously variable displacement mode control logic can be built into a firing control co-processor or a co-processing unit that is arranged to work in conjunction with an existing engine control unit.

It is anticipated that as the technology develops, the continuously variable displacement mode control logic will be integrated into the engine control units that are provided with new vehicles or engines. This is particularly beneficial because it allows the ECU to readily take advantage of all of the features of the engine that are available to improve engine performance using the continuously variable displacement mode.

New ECUs that incorporate the continuously variable displacement mode can also be developed for vehicles that are on the road today (and for other existing engines and/or engine designs). When such ECUs are developed the existing engines can readily be retrofitted by simply replacing the existing ECU with an improved ECU that incorporates the variable displacement mode.

Alternatively, as will be appreciated by those familiar with current automotive engine control design—the engine control units in most late model automobiles are arranged such that third party devices can interface with the engine control unit. These interfaces are often provided, at least in part, to facilitate engine diagnostics—however, a variety of third parties products such as turbochargers, superchargers, etc. include control co-processors that have been designed to utilize such interfaces to work with the engines without voiding the manufacturer's warranty. These interfaces can be used advantageously to allow a low cost firing control co-processor that incorporates the continuously variable control logic to be installed as a retrofit to greatly improve the fuel efficiency of cars on the road today.

Firing Control Co-Processor

Figure 6:
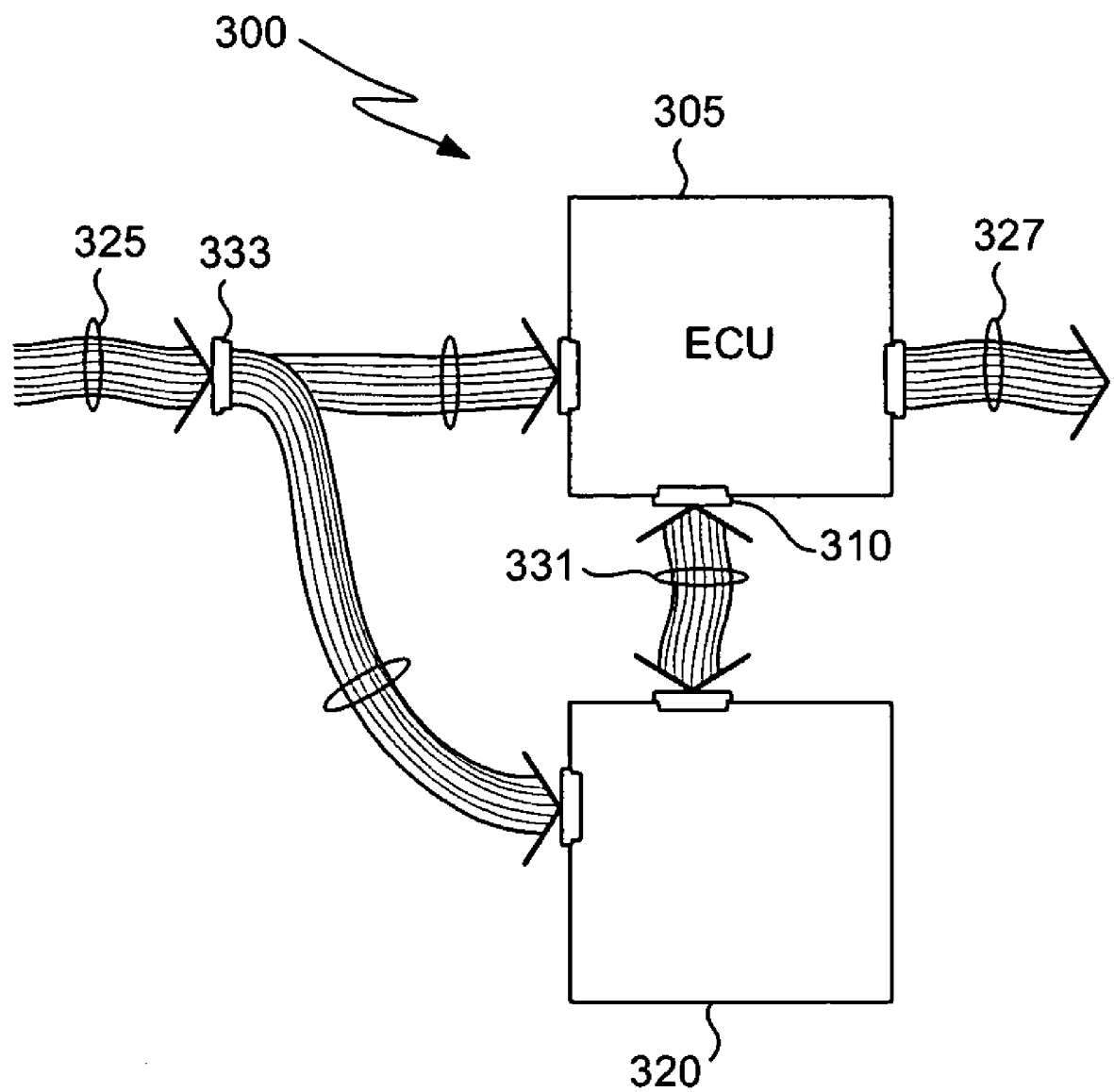
FIG. 6 is a block diagram of an engine control architecture that includes a firing control co-processor in accordance with one embodiment of the present invention.

Referring next to FIG. 6 an engine control architecture that includes a firing control co-processor (sometimes referred to as a fuel co-processor) in accordance with one embodiment of the present invention will be described. The engine control system 300 includes a conventional engine control unit (ECU) 305 and a firing control co-processor 320 that incorporates continuously variable displacement mode control logic such as the logic illustrated in FIG. 2. This design is particularly well adapted for retrofitting existing engines to incorporate the described continuously variable displacement operating mode.

As will be appreciated by those familiar with the art, the designs of the existing ECUs and their respective interfaces vary significantly and accordingly, the firing control co-processor must be adapted and designed to work with the particular ECU provided for the engine. Conceptually, the ECU typically includes an input cable 325 having a plurality of input lines that deliver the signals and sensor inputs required by the ECU and an output cable 327 that includes a plurality of output lines that deliver the control and other outputs provided by the ECU to other devices. In practice, the input and output cables may be integrated into a single cable bundle or multiple bundles that mix input and output lines, and/or may include some duplexed I/O lines.

Most late model automotive engine control units (ECUs) have external interfaces that permit third party devices to interact with the ECU. Often, this interface takes the form of a diagnostic interface. The ECU 300 in the embodiment illustrated in FIG. 6 includes an external diagnostics interface 310 and the firing control co-processor 320 communicates with the ECU through the diagnostic interface. Specifically, an ECU bus cable 331 connects the firing control co-processor 320 to the diagnostic interface 310. The input cable 325 is connected to a splitter 333 that delivers the input signals to both the ECU 305 and the firing control co-processor 320. Therefore, the co-processor has all of the information available to it that is available to the ECU. When operating in the continuously variable displacement mode, the firing control co-processor communicates with the ECU over the ECU bus cable 331 and overrides the throttle and fuel injection level instructions calculated by the ECU and instead orders the firings and throttle positions determined to be appropriate by the firing control co-processor. The co-processor also overrides other inputs (such as the oxygen sensor input) as appropriate to insure that the rest of the engine's systems run correctly.

Figure 11:
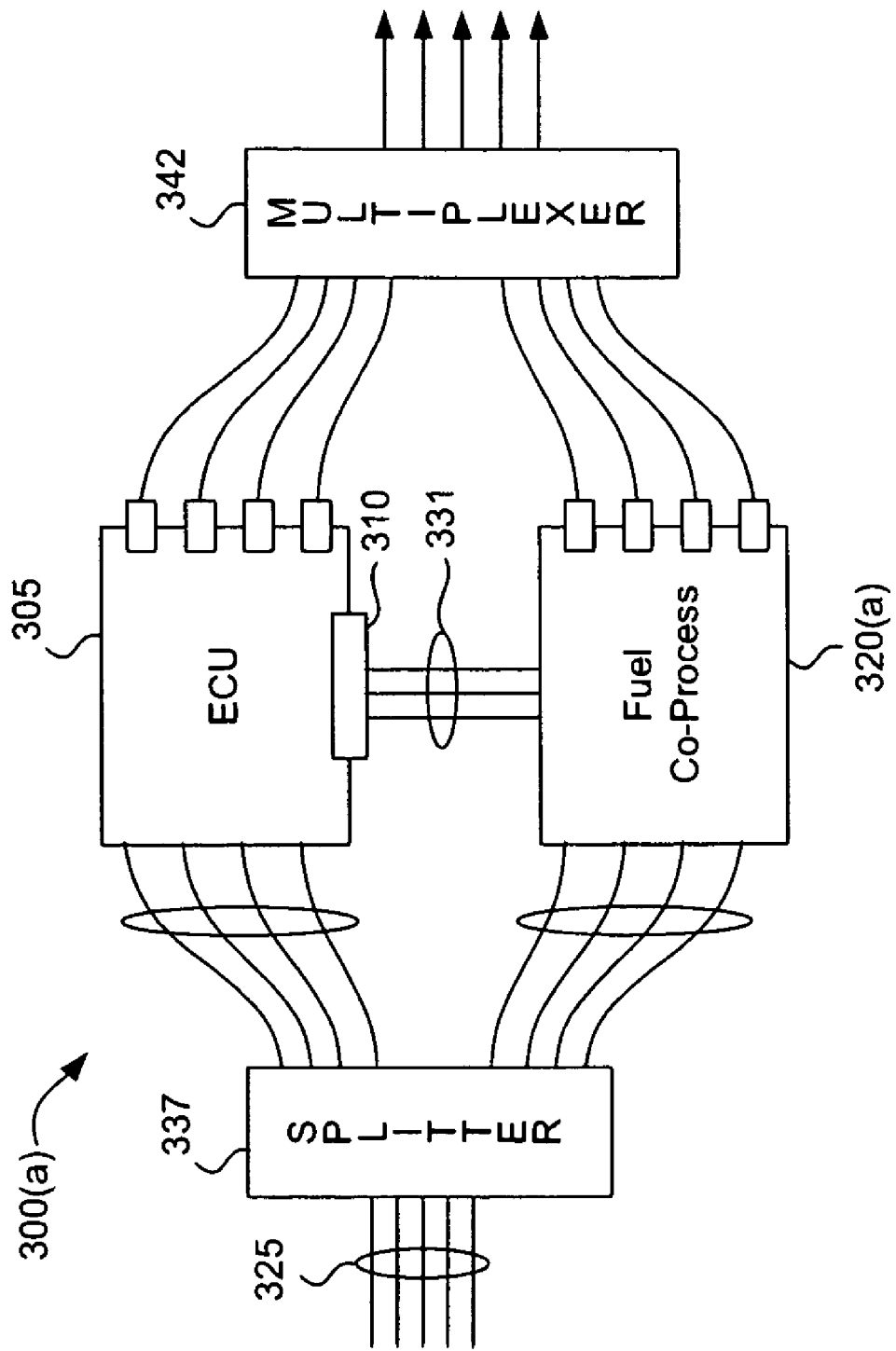
FIG. 11 is a block diagram of an engine control architecture that includes a firing control co-processor in accordance with another embodiment of the present invention.

Another firing control co-processor embodiment is illustrated in FIG. 11. In the illustrated embodiment, the engine control system 300(*a*) includes a conventional engine control unit (ECU) 305, a firing control co-processor 320(*a*) that incorporates continuously variable displacement mode control logic and a multiplexer 342. In this embodiment, the firing control co-processor 320(*a*) (in addition to the ECU 305) includes a set of injector drivers (one for each of the fuel injectors) so that the firing control co-processor itself can drive the fuel injectors. In this arrangement, the ECU 305 and the firing control co-processor 320(*a*) operate in parallel, with each receiving inputs from the input cable 325 and both determining the appropriate engine control, which are fed to multiplexer 342. When the engine is operating in the continuously variable displacement mode, the multiplexer 342 is directed to only deliver the signals received from the firing control co-processor 320(*a*) to the fuel injectors (and any other components controlled by the firing control co-processor). Any time the engine is taken out of the variable displacement mode, the multiplexer 342 is directed to only deliver the signals received from the ECU to the fuel injectors (and other components). Any components that are controlled by the ECU in both the normal and variable displacement operating modes are always controlled directly by the ECU.

It should be appreciated that fuel injector drivers can be relatively expensive to produce in part because they are (in the context of the engine controller) relatively high powered devices. Therefore, the described multiplexing before the injector drivers is a desirable feature. Indeed, it is particularly desirable to multiplex at the logic level (that is before high voltage or high power signals are involved).

In the embodiment of FIG. 11, the firing control co-processor 320(*a*) communicates with the ECU over ECU bus cable 331 through the diagnostic interface 310 and is arranged to override any input signals (such as the oxygen sensor signal) that need to be corrected for when the engine operates in the variable displacement mode.

Figure 15:
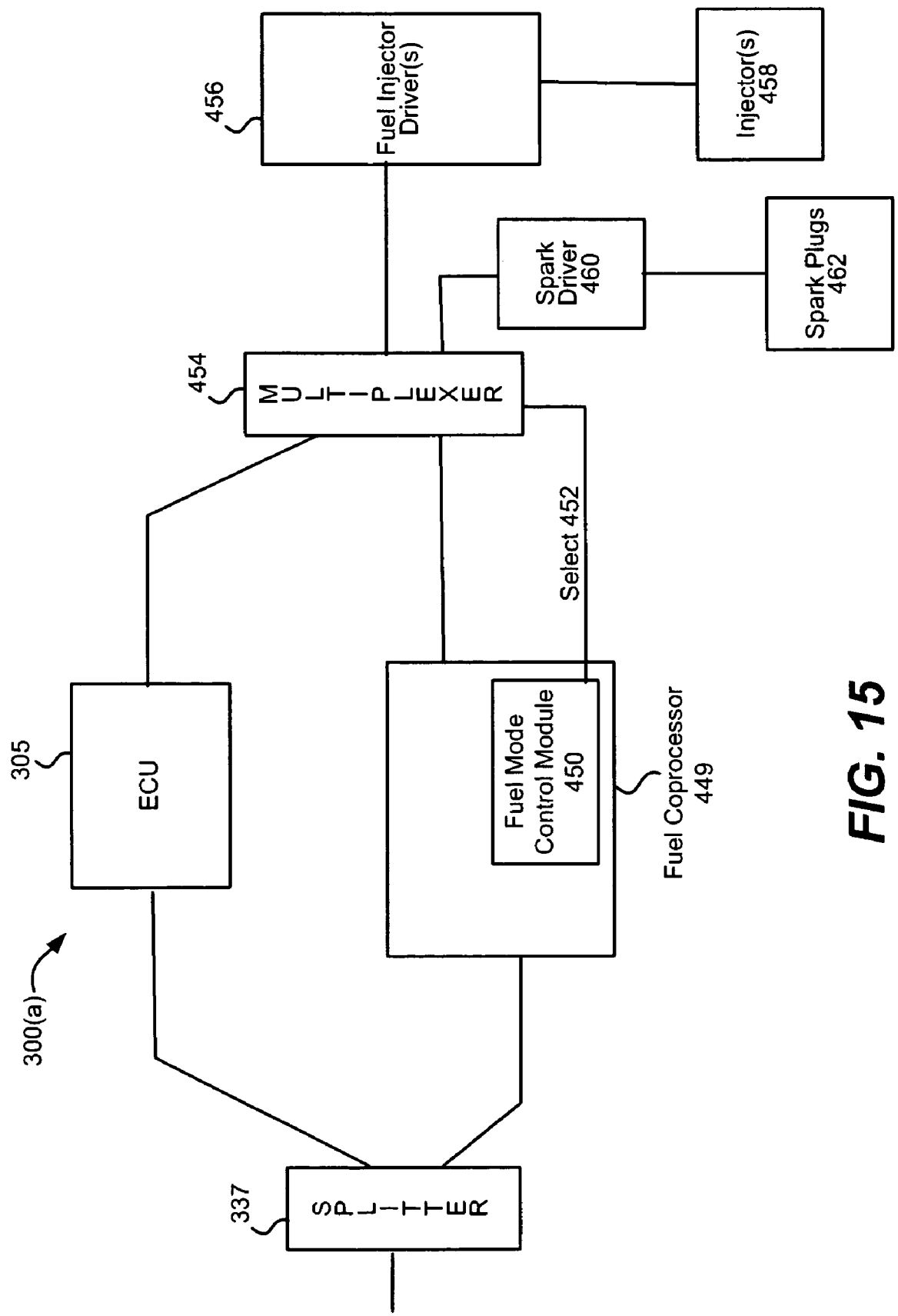
FIG. 15 is a block diagram of an engine control architecture that includes a firing control co-processor and a multiplexer in accordance with another embodiment of the present invention.

Referring next to FIG. 15 another engine control architecture that includes a firing control co-processor in accordance with yet another embodiment of the present invention will be described. As in previous embodiments, sensor and other inputs destined for the ECU 305 are split by a splitter 337 and concurrently provided to the fuel coprocessor 449. The output control signals from both the ECU 305 and the fuel coprocessor 449 are then provided to a multiplexer 454.

In one embodiment, the fuel coprocessor 449 includes a fuel mode control module 450. The fuel mode control module 450 determines whether or not the engine should be operated in the continuously variable displacement (skip-fire) mode. The output of the fuel mode control module 450 can be a select line 452 that controls the multiplexer 454.

In the embodiment described with reference to FIG. 15, the multiplexer 454 is implemented at the logic level. That is, the low-voltage digital signaling lines are provided directly from the ECU and the fuel coprocessor 449 to the multiplexer 454. The select line 452 controls which set of output signals are allowed through by the multiplexer 454. Voltages of such digital logic lines are generally below 6V.

The number of signals to be multiplexed by the multiplexer 454 can vary according to implementation. In the example shown in FIG. 15, only the outputs for spark and fuel injection are shown, and the number of those lines will also vary according to the number of cylinders of the particular engine. The width of the select line 452 will be dependent on the number of control logic lines being multiplexed.

The output of the multiplexer 454 is provided to the spark plug drivers 460 and the fuel injector driver(s) 456. The spark plug drivers 460 need not be aware whether their input control signal originates with the fuel coprocessor 449 or with the stock ECU 305. The spark plug drivers 460 will use the input control signal and generate the proper electric impulse for the spark plugs to be fired. Similarly, the fuel injector drivers 456 need not be aware whether their input control signal originates with the fuel coprocessor 449 or with the stock ECU 305. The fuel injector drivers 456 will use the input control signal and generate the proper electric impulse to operate the one or more injectors to be utilized.

Figure 16:
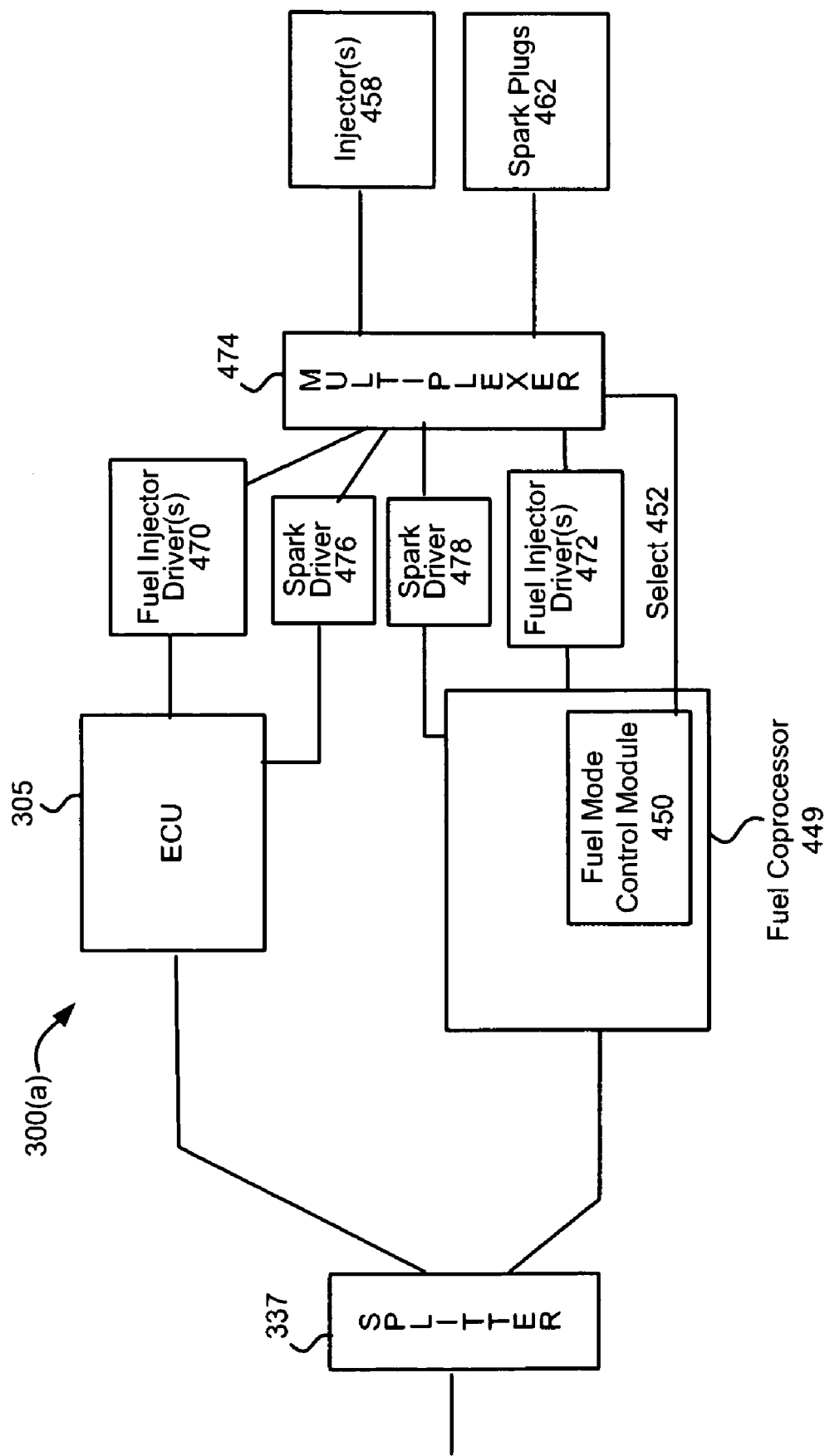
FIG. 16 is a block diagram of an engine control architecture that includes a firing control co-processor and a high-voltage multiplexer in accordance with another embodiment of the present invention.

Another arrangement for a fuel coprocessor 449 is shown in and now described with reference to FIG. 16. In this embodiment, the output signals of the fuel coprocessor 449 and the ECU 305 are first provided to the drivers controlled by these signals. For example, the fuel injection control signals from the ECU 305 are provided to fuel injection drivers 470, while the fuel injection control signals from the fuel coprocessor 449 are provided to fuel injection drivers 472. Similarly, the spark plug control signals from the ECU 305 are provided to spark plug drivers 476, while the spark plug control signals from the fuel coprocessor 449 are provided to spark plug drivers 478.

The higher voltage driver control signals are then provided to multiplexer 474, which is controlled by the fuel mode control module 450 using the select line 452 as set forth above.

Figure 17:
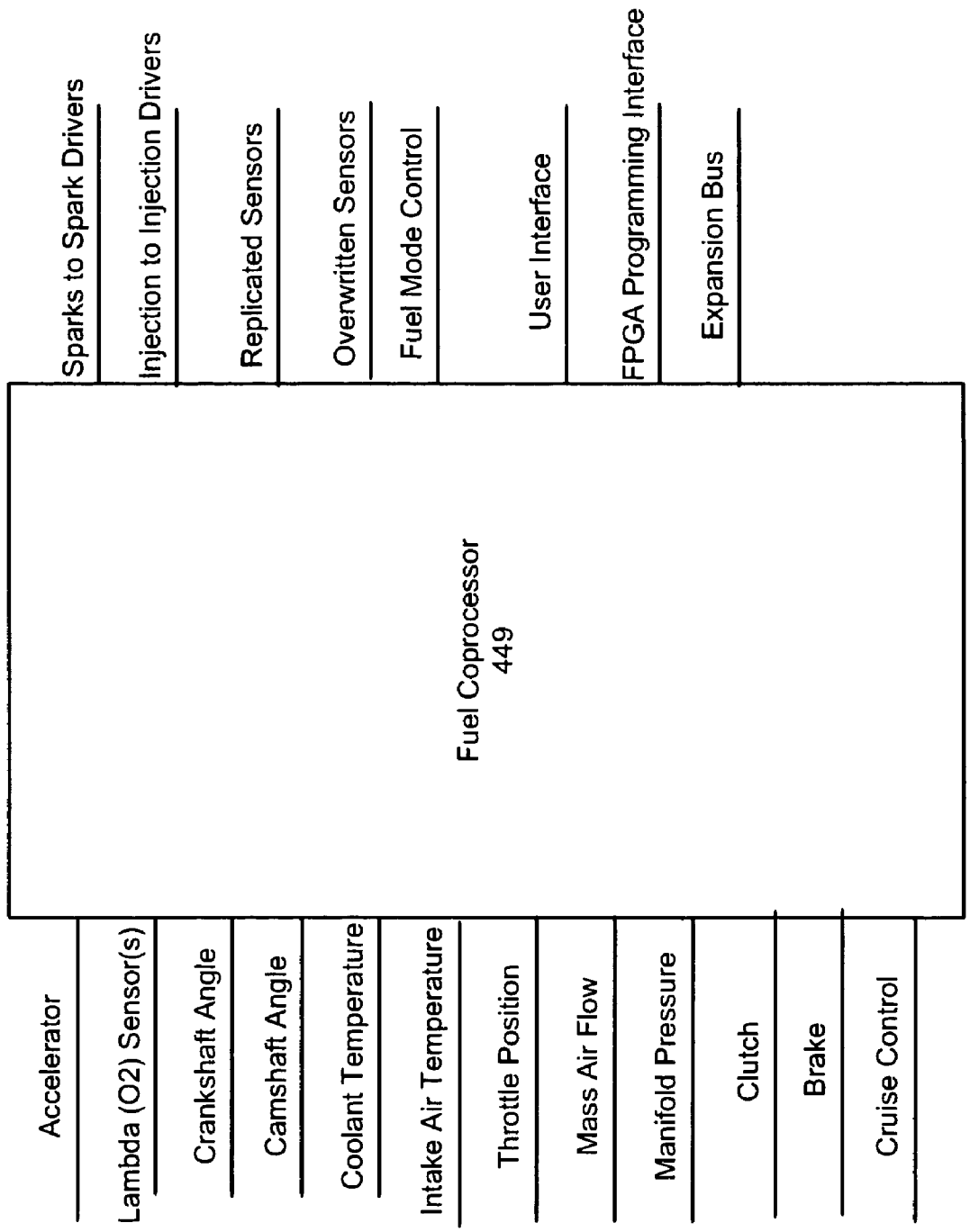
FIG. 17 is a block diagram of a firing control co-processor in accordance with another embodiment of the present invention.

FIG. 17 illustrates some of the possible input and output signals of an example fuel coprocessor 449. Some of the input signals may be used exclusively in the determination of a skip-fire firing pattern, some input signals may be used exclusively to determine whether to operate in the continuously variable displacement mode (for example by the fuel mode control module 450), and some input signals may be used for both purposes. Yet other input signals may be provided to the fuel coprocessor 449 to be adjusted or overridden prior to delivery to the engine control unit.

Use of the accelerator as an input for a drive pulse generator of the fuel coprocessor 449 has been discussed above. The accelerator input signal can be provided as a pedal, lever, or other accelerator position sensor. In some applications, an accelerator may be popularly referred to as a throttle, but the actual throttle position sensor is a separate input to the fuel coprocessor 449.

Some of the other inputs for the fuel coprocessor 449 include one or more lambda sensors—also referred to as oxygen or $O_2$ sensors—crankshaft and camshaft angle sensors, coolant, intake and exhaust gas temperature sensors, a throttle position sensor that senses the position of the butterfly valves, a mass air flow sensor, and intake and exhaust manifold pressure sensors. Additional input signals can include clutch, brake, and cruise control sensors. Clutch and brake sensors generally report a binary status (engaged/disengaged) for these vehicle controls. Generally, most of these sensors output an analog signal representing the parameter sensed over time, but digital implementations of most sensors is possible.

In one embodiment, the fuel coprocessor 449 outputs control signals to the fuel injection drivers and the spark plug drivers. The continuously variable displacement mode is implemented using these control signals to identify which injectors and spark plugs are to be actuated on a working-cycle by working-cycle basis.

Other outputs of the fuel coprocessor 449 can include replicated and overwritten sensor signals. For example, an input sensor signal may need to be provided to the ECU 305, if the fuel coprocessor 449 is inline with the ECU 305. Furthermore, as set forth above, some sensor readings may need to be overwritten—or spoofed—before providing them to the ECU 305 in order to keep the ECU 305 from responding to a condition purposefully created by the fuel coprocessor 449.

Another output of the fuel coprocessor 449 is the fuel mode control signal that indicates whether to operate in the continuously variable displacement mode. As shown in FIGS. 15 and 16, this signal can be used to control a multiplexer 454 that selects between various control lines from the ECU 305 and the fuel coprocessor 449.

Furthermore, the fuel coprocessor 449 can include several input/output interfaces such as a user interface to perform diagnostics, data analysis, and setup and configuration of the fuel coprocessor 449, and FPGA programming interface to allow for low level configuration of the fuel coprocessor 449 if it is implemented using an FPGA (field-programmable gate array). The fuel coprocessor 449 can also include an expansion bus to allow the connection of additional peripheral vehicle control or analysis devices.

The firing control co-processor may be implemented as a single chip solution, a chip set, a board level solution. For example, in one embodiment, the firing control co-processor may include a motherboard and a daughterboard that interfaces with the motherboard. Conceptually, the motherboard is intended to be a relatively generic engine controller that can be used with a wide variety of different engines. The daughterboard is intended to be a customized unit for use with a particular engine and is designed to provide the appropriate interface between the specific engine and the motherboard. Preferably, the motherboard and daughterboard would each be implemented as a single chip solution. However, if that level of integration is not achieved, one or both can be implemented as a chip set or at the circuit board level. The motherboard/daughterboard architecture is advantageous in that facilitates more rapid development of fuel processors for different engines since the motherboard, which provides the core functionality does not need to be redesigned for use with different engines. Rather, only the daughterboard needs to be adapted for use with a particular engine or vehicle, etc.

Although specific wirings of the firing control co-processor are illustrated in FIGS. 6 and 11, it should be appreciated that a wide variety of other wirings could be utilized. For example, the splitter 333 may be designed to only deliver some of the input signals to the firing control co-processor 320, since some of the input signals may not be relevant to the firing control co-processor's operation. Additionally or alternatively, input signals that are intended to be modified by the firing control co-processor may be wired to first be input to the co-processor and then a (potentially) modified signal may be fed from the firing control co-processor to the ECU. That is, the firing control co-processor may intercept some or all of the input signals and modify some of those signals as appropriate prior to their delivery to the ECU.

In still other embodiments some or all of the output lines may be connected to the fuel processor rather than the ECU. This is particularly appropriate in implementations in which the firing control co-processor is designed to determine the firing pattern in all operations of the engine.

In most of the firing control co-processor embodiments described above the firing control co-processor is created as a separate device from the engine control unit. Such an arrangement is well suited for many applications. However, in the long run it would be desirable to incorporate the described skip fire variable displacement control into the ECU chip.

Because the logic needed to implement the described skip fire variable displacement approach is relatively specialized but the same logic blocks can be used to control a variety of different engines, in many applications, it may be desirable to integrate a firing control co-processor block into a single integrated circuit die that also contains all of the other ECU functionality. This can be analogized to the way that some microprocessor chips integrate a math co-processor into the same die. The integrated ECU/firing control co-processor architecture can help further reduce the costs of implementing the described skip fire engine control.

Electronic Valves—and Operating on Half Cycles

In conventional 4-stroke reciprocating piston engines the working cycle of each piston can only begin after every second reciprocation of the piston (e.g., after 0, 2, 4, 6, 8 . . . reciprocations of the piston). In engines that utilize a conventional camshaft to open and close the valves, the same is true in the continuously variable displacement mode. That is, the intake valves can only be opened every other reciprocation of the crankshaft even when one or more working cycles are skipped. However, some more recent engine designs have incorporated electronic valves (i.e., valves that are opened and closed electronically rather than mechanically). In such engines it is possible to open the valves at any desired time. When an engine having electronic valves is operated in a variable displacement mode that skips working cycles of the engine, there is no inherent need to limit the initiation of working cycles to every other reciprocation of the engine. That is, rather than restraining the controller to skipping integer numbers of working cycles (e.g., 1, 2, 3 . . . working cycles) the controller may be arranged to skip half working cycles as well (e.g., ½, 1, 1½, 2, 2½, 3 . . . working cycles). This can help both smooth and improve the precision and responsiveness of the engine. It can also be beneficial from a vibration control standpoint because the availability of starting on a half cycle can help break up patterns that can develop in the drive pulse signal. For example, if the simple sequential sequencer discussed above with respect to FIG. 4 is used to generate a firing pattern, the sequencer can readily be adapted to allow the "next" working cycle to begin at what would traditionally be considered a midpoint of a working cycle. In a 4-stroke piston engine this means that a working cycle can be initiated after any number of reciprocations of the piston—including after odd numbers of reciprocations of the piston. In contrast, the working cycles of traditional 4-stroke piston engines can only be initiated after an even number of reciprocations of the pistons. Of course the same principles apply to piston engines having longer (e.g., 6 stroke) working cycles.

The half cycle (or partial cycle) initiation of a working cycle approach can be used in any engine that has the ability to selectively open and close the valves at any time. Engines with electronically controlled valves are the only commercially available engines that currently have such abilities. However, if other valve control technologies that utilize magnetic, electromagnetic, mechanical, or other suitable techniques for controlling the opening and closing of the valves are developed, they can readily be used as well.

When control over the timing of the opening and closing of the valves is provided, the valves may be held closed during skipped working cycles as they are in most current commercially available variable displacement engines. Alternatively, it may be desirable to open and close the valves in a different sequence than normal fired cylinders to help reduce pumping losses.

It should be appreciated that the ability to begin a working cycle during any reciprocation of the engine is believed to be very different than operations possible in current engine designs.

Sigma Delta Controller with Variable Clock

As discussed above, a variety of adaptive predictive controllers including a variety of different sigma delta controllers may be used in the drive pulse generator 104. As mentioned above, a variable clock can be used in the sigma delta control circuit 202. Using a variable clock that is based on engine speed for the comparator has the advantage of better synchronizing the output of the sigma delta control circuit with the engine's operation. This, in turn can help simplify the overall design of the synchronizer portion of the drive pulse generator.

Figure 7:
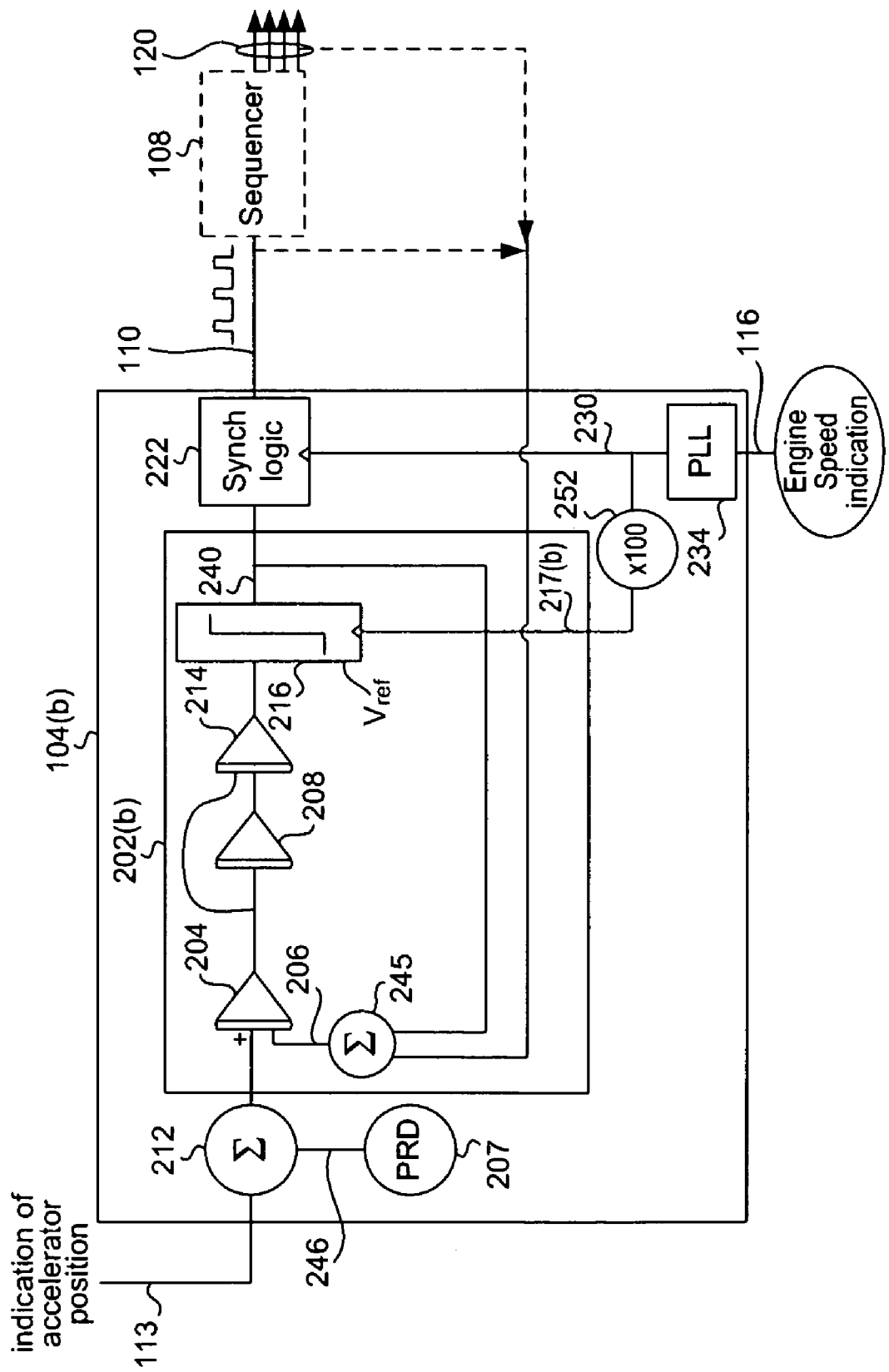
FIG. 7 is a block diagram of a sigma-delta control circuit embodiment having a variable clock based on engine speed.

Referring next to FIG. 7 an alternative embodiment of the drive pulse generator that incorporates a variable clock sigma delta controller 202(b) will be described. The drive pulse generator 104(b) has a structure very similar to the drive pulse generator 104(a) described above with reference to FIG. 3. However, in this embodiment, the clock signal 217(b) provided to the comparator 216 is a variable clock signal that is based on engine speed. The clock signal is generally synchronized with the engine speed by utilizing a phase lock loop 234 that is driven by an indication of engine speed (e.g., a tachometer signal). As described above—it is desirable for the sigma delta controller to have a sampling rate, and therefore an output signal 240(b) frequency that is substantially higher than the desired frequency of the drive pulse pattern outputted by the synchronizer 222. Again, the amount of oversampling can be widely varied. As indicated above, oversampling rates on the order of 100 times the desired drive pulse frequency work well and accordingly, in the illustrated embodiment a divider 252 is arranged to divide the clock signal 230 provided to the synchronizer logic by a factor of 100, and the output of the divider 252 is used as the clock for comparator 216. This arrangement causes the output of the comparator 216 to have a frequency of 100 times the frequency of the drive pulse pattern that is output by the synchronizer 222. Of course, in other embodiments, the divider can be arranged to divide the signal by any integer number that provides sufficient oversampling. In other respects, the other components of the sigma delta controller 202 may be the same as described above with respect to FIG. 3. Any of the designs of the synchronizer 222 and/or the sequencer 108 discussed above or a variety of other synchronizer and sequencer designs may also be used with variable clock sigma delta controller 202(b). One advantage of synchronizing the output of the sigma delta controller 202 with the engine speed is that it permits simpler synchronizer designs.

Sigma Delta Controller with Multi-Bit Comparator Output

As discussed above, in some embodiments it might be desirable to utilize reduced energy cylinder firings. The reduced energy firings may be used for a variety of purposes including helping reduce the probability of undesirable vibrations being generated by the engine, to help fine tune the control, to facilitate operation during idling or at low engine speeds, etc. To facilitate the reduced energy firings, the drive pulse generator 104 may be arranged to produce some partial drive pulses in the drive pulse pattern to indicate when reduced energy firings are desired.

Figure 8:
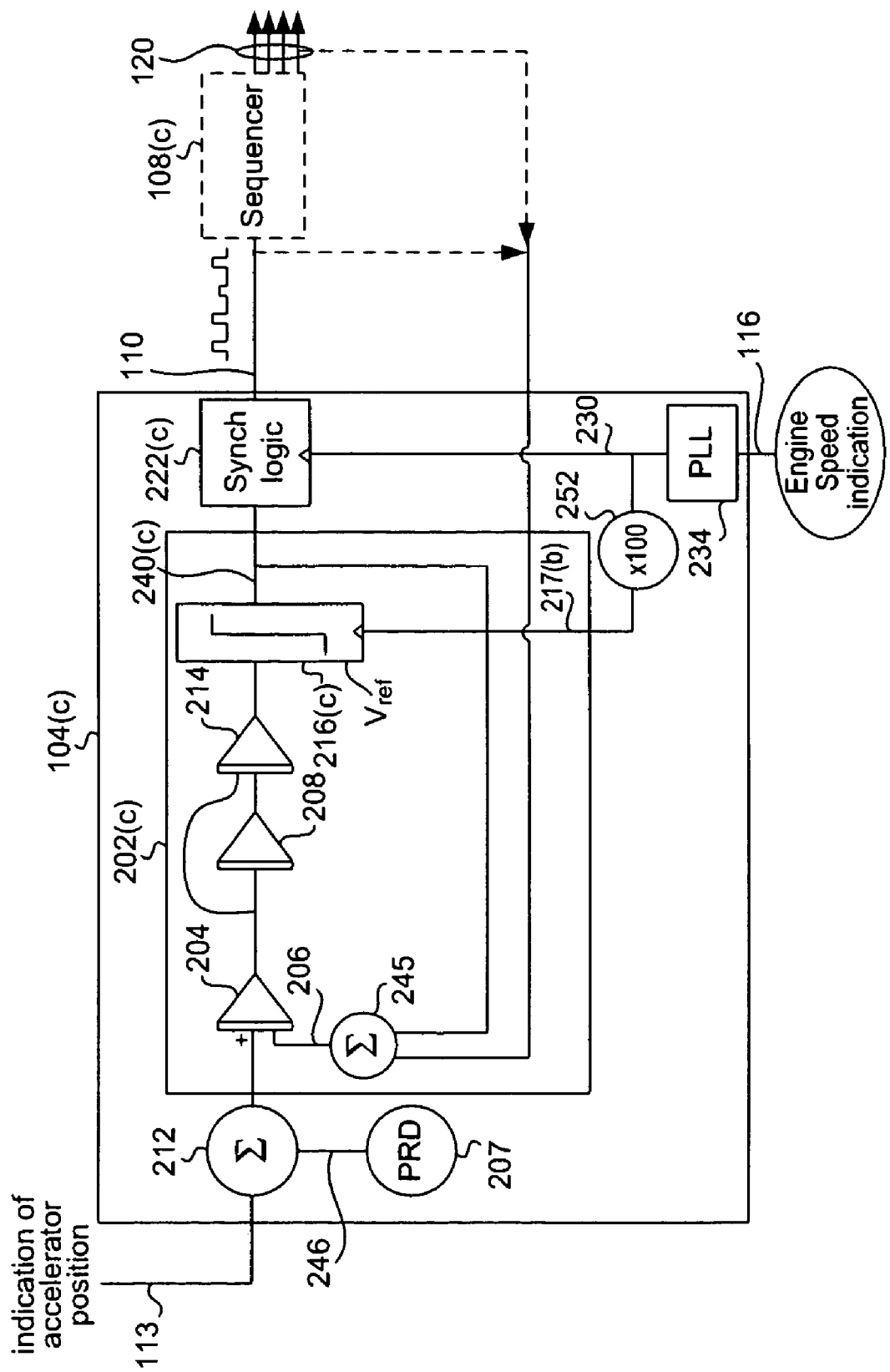
FIG. 8 is a block diagram of a sigma-delta control circuit embodiment having a multi-bit comparator.

Referring next to FIG. 8, a modification of the sigma delta controller that outputs a multi-bit signal will be described. In the illustrated embodiment, the multi-bit output of the sigma delta controller is used by the synchronizer 222 to generate partial drive pulses. In this embodiment, the sigma delta controller 202(c) may have a design similar to any of the previously described embodiments—however the comparator 216(c) is arranged to output a multiple bit signal 240(c). In the primary described embodiment, the comparator 216(c) is two bit comparator and accordingly the output signal 240(c) is a two bit signal. However, in other embodiments higher bit comparators may be provided which would result in higher bit output signals 240(c). The actual number of bits used can be varied to meet the needs of any particular application.

The various states of the multi-bit output signal can each be set to have an associated meaning. For example, in a two bit comparator—a 0,0 output signal might reflect a zero output; a 1,1 output signal might be a full signal output—e.g. one; a 0,1 might be arranged to represent a ¼ signal; and a 1,0 might be arranged to represent a ½ signal. Of course a two-bit comparator may readily be designed to have the various states represent different levels than the 0, ¼, ½, and 1 levels suggested above. In higher order comparators, many more states would be available. For example, in a three-bit comparator, 8 states would be available; in a four-bit comparator 16 states would be available, etc.

As will be appreciated by those familiar with multi-bit comparator sigma delta design, the comparator 216(c) may be configured to output some (generally controllable) percentage of the non-zero samples as intermediate level signals. These intermediate signals can be treated by the synchronizer 222 and the sequencer 208 as corresponding to requests for partial energy drive pulses and reduced energy firings. For example, if the sigma delta controller 202(c) outputs a string of one half (½) level output signals that is sufficiently long to cause the synchronizer 222(c) to generate a drive pulse—the outputted drive pulse can be a half energy drive pulse. The half energy drive pulse, in turn, is used by the sequencer 108(c) to direct a half energy firing. The same type of logic can be used for other (e.g. quarter) level output signals. When the comparator output is a multi-bit output, the synchronizer and the sequencer can readily be arranged to handle and output corresponding multi-bit signals.

It should be appreciated that multi-bit comparator sigma delta controllers are typically arranged to generate extended strings of symbols having the same state. Therefore, any of the general sequencer logics described above can be used to output drive pulses having the same state as the signal 240(c) fed to the synchronizer 222(c). That is, the drive pulse outputted by the synchronizer may be arranged to match the level of the signal 240(c) input into the synchronizer that caused generation of the drive pulse.

Again, it should be appreciated that the logic of the synchronizer 222(c) can be optimized and/or widely varied to meet the needs of any particular application. In some applications it may be desirable to provide more sophisticated synchronizer logic to handle specific situations in a desired manner. For example, different logic may be provided to handle situations where the signal 240 inputted to the synchronizer transitions from a higher level to a lower non-zero level that is held through the end of a drive pulse period. In some implementations it may be desirable to have the drive pulse output at the lower level in such situations. Similarly, when the signal transitions from a lower non-zero level to a higher non-zero level, it may be desirable to provide specific logic to dictate what happens in such circumstances It should be appreciated that the thermodynamic (and fuel) efficiency of the engine will be best when the working chambers are operated at their optimal efficiency. Therefore, it is generally undesirable to have too many reduced energy firings unless there is a specific need for them. However, there are some situations where reduced energy firings may be desirable from a control standpoint. Generally, the number of reduced energy firings is preferably relatively low (e.g., less than 20% or more preferably less than 10%) when the engine is operating at moderate to higher engine speeds. The comparator 216(c) can readily be designed to output such percentages of intermediate signals in an effort to insure final number of reduced energy firings is within a desired range.

The comparator and/or synchronizer logic may also be arranged to take engine speed and/or the operational state of the engine (e.g. cold start, etc.) into account when determining the percentage of intermediate comparator output signals and/or partial drive pulses to output. For example, when the engine is idling or cold starting, it may be desirable to only output intermediate signals from the comparator so that only partial drive pulses are generated in those situations. It should be appreciated that the comparator and/or synchronizer logic may be arranged to accommodate a wide variety of different desired operational rules.

Differential Sigma Delta Controllers

In still other embodiments differential sigma delta controllers may be used. In such embodiments the synchronizer can be arranged to generate drive pulse patterns based on the differential signals outputted by the sigma delta controller. A wide variety of different differential sigma delta controllers may be used and generally they may include the variable clock and/or multi-bit comparator output features discussed above when desired. One advantage of differential sigma delta controllers is that they can often be configured to provide even smoother performance than a corresponding non-differential sigma delta controller.

In some circumstances it may be advantageous to operate in a mode that we refer to as implied differential sigma delta. In such a mode, either the synchronizer or the sequencer (or both) are constrained to limit the drive pulses and/or chamber firings to one at a time. That is, in this mode, each fired working chamber is constrained to be followed by a skipped firing opportunity (and/or each drive pulse is constrained to be followed by null pulse). This implied differential sigma delta is particularly useful when the engine is operating at a level where significantly less than 50% of the firing opportunities are required to deliver the desired engine output since it can help further smooth the engine output by insuring that two firings do not immediately follow one another when the required output is relatively low.

It should be appreciated that automotive engines are often operated under conditions that require a relatively small fraction (e.g., 10-25%) of the power that the engine is capable of delivering. The implied differential sigma delta approach is particularly useful under these types of operating conditions. In some implementations it may be desirable to operate the engine in an implied differential sigma delta mode during some operational conditions, in a different type of continuously variable displacement mode during other operational conditions, and in a conventional operating mode during still other operational conditions. Of course, the number and nature of the various operational modes can be widely varied. Therefore, it should be appreciated that the engine controller may generally be arranged to operate in a variety of different operational modes during different operational conditions.

The constraints provided by implied differential sigma delta may also be widely varied. For example, when low engine outputs are required, there may be instances when it is desirable to constrain the firings pattern to skip at least two firing opportunities after each firing. In other instances it may be desirable to allow two firings to follow one another, but not three. In still other instances, it may be desirable to require a firing any time a designated number of skips follow one another. Generally, it should be appreciated that the firing pattern for a particular engine may be constrained by the sequencer or the synchronizers in a wide variety of manners that are determined to be appropriate to provide the desired engine output, and the constraints may be arranged to vary with the load placed on the engine, the overall ratio of firings to skips, or any other factor that is appropriate for the control of a particular engine.

Digital Sigma Delta Controllers

Figure 9:
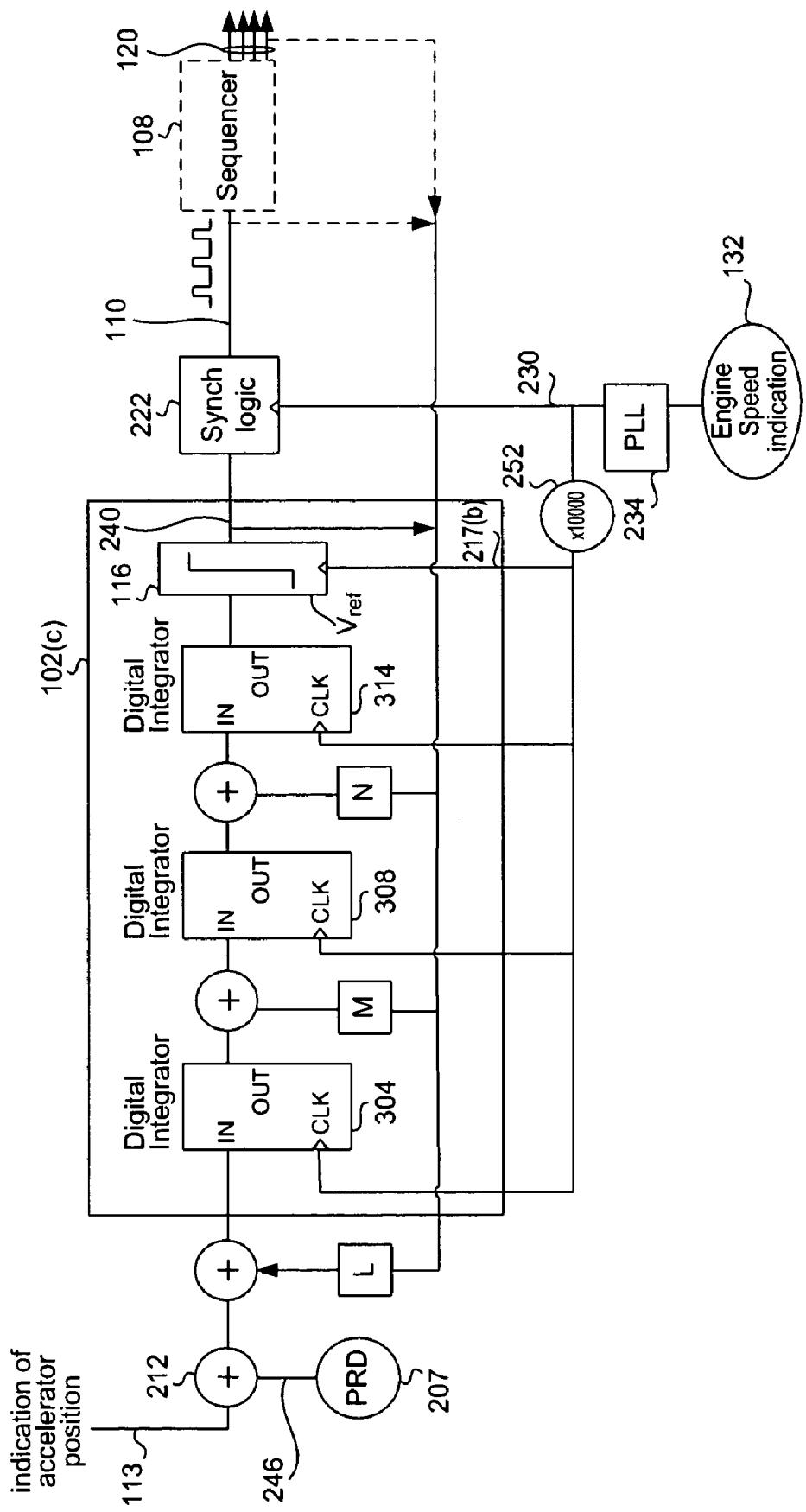
FIG. 9 is a block diagram of a digital sigma-delta control circuit embodiment in accordance with another embodiment of the invention.

As mentioned earlier digital sigma delta controllers may also be used. One such embodiment is illustrated in FIG. 9, which illustrates a digital third order sigma delta control circuit 202(c). In this embodiment, accelerator pedal position indicator signal is inputted to a first digital integrator 304. The output of the first digital integrator 304 is fed to a second digital integrator 308 and the output of the second digital integrator 312 is feed to a third digital integrator 314. The output of the third digital integrator 314 is fed to a comparator 116 that may be arranged to operate in the same manner as either the single bit or multi-bit comparators described above with respect to the analog sigma delta circuits. In the embodiment illustrated in FIG. 9, the first digital integrator 304 effectively functions as an anti-aliasing filter.

Negative feedback is provided to each of the three digital integrator stages 304, 308 and 314. The feedback may come from any one or any combination of the output of the comparator 116, the output of the synchronizer logic 222 or the output of the sequencer 126. Each stage feedback has a multiplication factor of L, M, and N respectively.

Like the analog sigma delta control circuit described above, the primary input to the digital sigma delta control circuit may be an indication of the accelerator position 113 or any other suitable proxy for desired output. As previously described, the desired output signal 113 is combined with pseudo random dither signal 246 in the illustrated embodiment in order to reduce the possibility of generating undesirable tones.

The primary difference between analog and digital operation is that the integrators in analog sigma delta are continuously active, whereas the digital integrators are typically only active at the beginning of each clock cycle. In some implementations, it may be desirable to run the clock at a very high speed much like the fixed and variable clocks described above with respect to various analog sigma delta designs. However, that is not a requirement. Since the output that is ultimately desired has a frequency that is equal to the firing opportunities that are being controlled, the clock may be synchronized with the firing opportunities which may eliminate the need for (or simplify the function of) the synchronizer and/or the sequencer. Thus, when a digital controller is used, the controller design can be simplified by running the clock at the frequency of the firing opportunities being controlled.

Although analog and digital controllers have been described, it should be appreciated that in other implementations, it may be desirable to provide hybrid analog/digital sigma delta controllers. In a hybrid analog/digital controller, some of the stages of the sigma delta controller may be formed from analog components, while others may be formed from digital components. One example of a hybrid analog/digital sigma delta controller utilizes an analog integrator 204 as the first stage of the controller, in place of the first digital integrator 304. The second and third integrators are then formed from digital components. Of course, in other embodiments, different numbers of stages may be used and the relative number of analog vs. digital integrators may be varied. In still other embodiments, digital or hybrid differential sigma delta controllers may be used.

Single Cylinder Modulation Skip Fire

Figure 12:
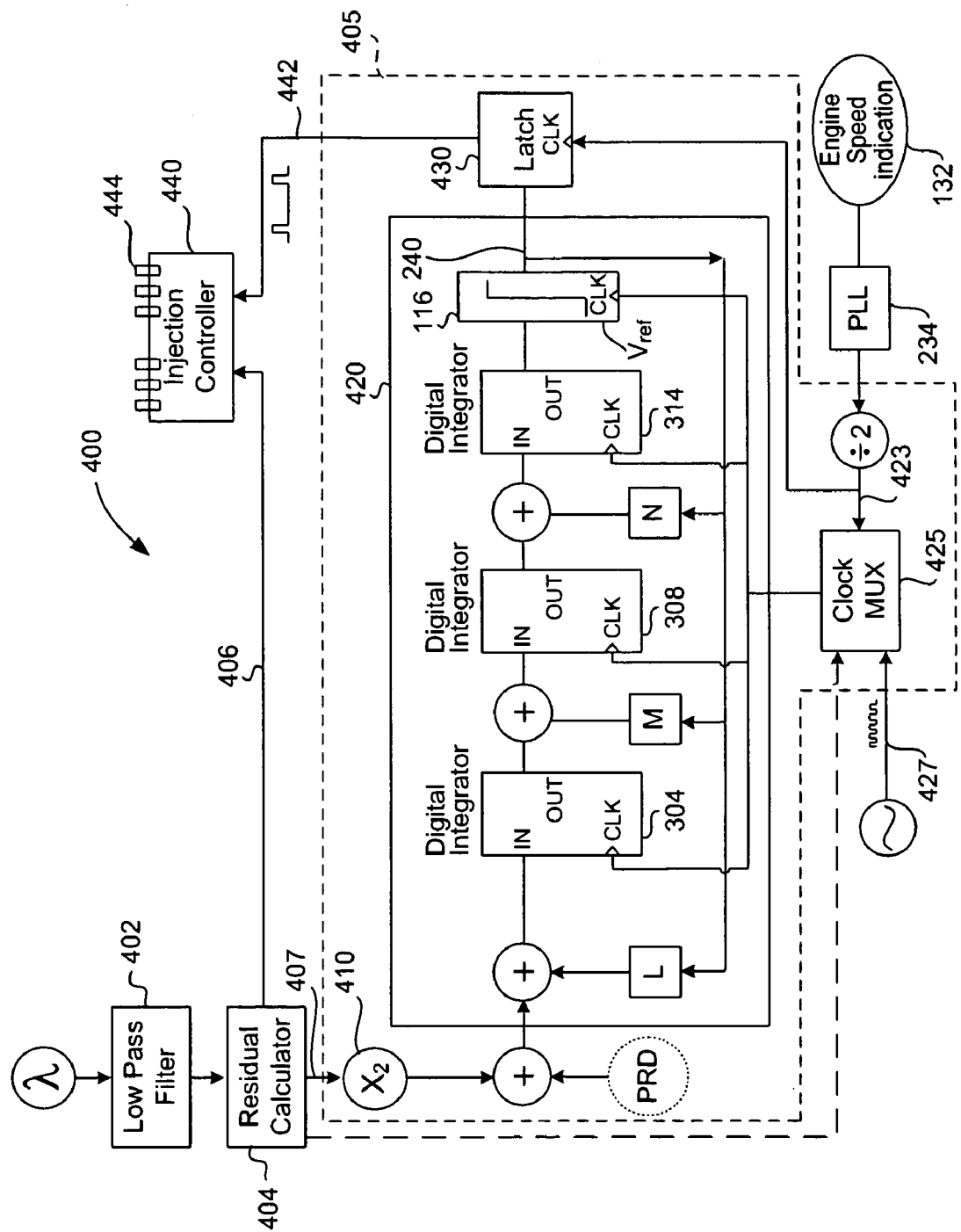
FIG. 12 is a block diagram of an engine controller suitable for implementing a single cylinder modulation skip fire technique in accordance with yet another embodiment of the present invention.

Referring next to FIG. 12, an engine control unit 400 in accordance with yet another embodiment of the invention will be described. This embodiment is particularly well suited for use in implementing the single cylinder modulation skip fire approach described above and various variations of that approach. In the illustrated embodiment, an indication of the accelerator pedal position 113 (or other appropriate indicator of desired output) is provided to an optional low pass filter 402. The low pass filter (which can also be utilized with any of the other described embodiments) is intended to smooth out very short (e.g. high frequency) variations in the desired output signal. These types of variations may be caused, for example, by jitter in a driver's foot position due to road vibrations or other causes. The low pass filter can be used to reduce or eliminate such jitter and other unintended high frequency variations in the input signal 113.

The filtered indication of the desired output is then supplied to a residual calculator 404 that effectively divides the input signal by the available number of cylinders. For example, if the engine has six cylinders, the input signal is conceptually divided by six. The residual calculator may be scaled so that the result includes an integer and a remainder. In general, the integer output 406 may be used by the controller as an indicator of how many cylinders to fire all of the time and the remainder output 407 may effectively be used to control the modulated cylinder. The divider is preferably scaled appropriately such that the output provides the desired power output range for the engine. For example, conceptually, it may be scaled such that when maximum power is desired (e.g., when the accelerator pedal is fully depressed), the divider outputs an integer equal to the number of cylinders in the engine with no remainder. Of course, in other implementations, the scaling may be different, non-linear dividers may be used as desired and/or other components may be adjusted to compensate for scaling or other variations.

In the illustrated embodiment, the integer output 406 of the residual calculator is supplied to an injection controller 440 and the remainder output 407 is supplied to a modulated working chamber controller 405. More specifically, the remainder is provided to a multiplier 410 that is included in a modulated working chamber controller 405. The multiplier 410 multiplies the remainder signal by a factor equal to the number of cylinders available to the engine. For example, in a typical six cylinder engine, the multiplier may multiply the remainder by a factor of six. The output of the multiplier 410 is then used as the control input for a drive pulse generator. The drive pulse generator may take any suitable form. By way of example, in the illustrated embodiment, the drive pulse generator includes a predictive adaptive controller 420 that takes the form of a digital third order sigma delta controller that is similar to the digital sigma delta controller 202(a) described above, although it uses a different clock signal. Of course, in other embodiments, the multiplier can be eliminated and the sigma delta controller 420 may be scaled appropriately to provide the desired output.

In this embodiment, the output of multiplier 410 is inputted to a first digital integrator 304. If desired, an optional pseudo random dither may be combined with the output of the multiplier before the first digital integrator 304. The output of the first digital integrator 304 is fed to a second digital integrator 308 and the output of the second digital integrator 308 is feed to a third digital integrator 314. The output of the third digital integrator 314 is fed to a comparator 116 as previously described. Since the design of sigma delta controller 420 is quite similar to the design described above with reference to FIG. 9, an explanation of similar features is not always repeated. The output of comparator 116 is provided to a latch 430, which in turn delivers the drive signal to injection controller 440. The comparator output is also fed back as a negative input to the first digital integrator 304. The clock signal provided to the sigma delta controller 420 and the latch 430 is synchronized with the firing opportunities of the modulated cylinder. With this arrangement the output of the latch 430 can be used as the drive pulse pattern 442 for the modulated cylinder. In embodiments that don't include a latch, the output of comparator 116 may directly be used as the drive pulse pattern. This eliminates the need for a synchronizer as used in the embodiment of FIG. 9.

It is noted that in most of the previously described embodiments, a high frequency clock is used. In contrast, the embodiment of FIG. 12 uses a very low frequency clock that is synchronized with the frequency of the firing opportunities of the cylinder(s) that is/are being controlled. Therefore, if at any given the sigma delta controller 420 is controlling just one cylinder, then the clock would have a frequency that is synchronized with the firing opportunities of the single cylinder being controlled such that just one clock cycle occurs each firing opportunity of the controlled cylinder. In other embodiments, where the controller 420 is controlling the firing of more than one cylinder (e.g. 2, cylinders, 3 cylinders, all of the cylinders, etc), the clock frequency may match the frequency of the firing opportunities of all of the controlled cylinders.

In the illustrated embodiment the integer output 406 of residual calculator 404 and the drive pulse pattern 442 signal are both provided to an injection controller 440. The injection controller 440 acts as a simplified sequencer and controls the fuel injection drivers 444. The logic of the injection controller is arranged to always fire a set of cylinders equal to the number of cylinders identified by the integer output of the injection controller. Additionally, one cylinder is fired in the pattern dictated by the drive pulse pattern 442. The remaining set of cylinders is not fired. The specific cylinders in the fired cylinder set are preferably selected in a manner that provides good engine vibration and thermal management characteristics. In many implementations it will be desirable to arrange the injection controller 440 to periodically alter the cylinders in the fired cylinder set over time. There are several potential benefits to periodically varying the specific cylinders in the fired cylinder set. One consideration that will be important in some engine designs is the thermal management of the engine. It should be appreciated that there will be a significant temperature difference between cylinders that are fired all of the time and cylinders that are skipped all of the time. That difference is further amplified if relatively cold air is pumped through skipped cylinders. The temperature differences may also have an impact on emissions. Therefore, it may be desirable to sometimes alter the specific cylinders in the skipped and always fired cylinder sets to help insure that the engine maintains an acceptable thermal balance.

There are other reasons for periodically varying the cylinders in the fired cylinder set as well. For example, it may be desirable to insure that over time, all of the cylinders are fired roughly the same amount. This can help insure even wear characteristics of the engine and help clean the unused cylinders. The specific cylinders in the various cylinder sets can be changed relatively often (e.g., on the scale of every few minutes or more frequently), relatively infrequently (on the scale of each time the engine is turned off, hours of engine operation, etc.) or anything in between.

It should be appreciated that with the described approach, calls for relatively small amounts of additional power can often be accommodated by more frequently firing the single modulated cylinder. Similarly, calls for relatively small reductions of power can often be accommodated by less frequently firing the single modulated cylinder. However, in some instances a call for additional or reduced power will have the effect of changing the integer value calculated by the residual calculator 404. In these instances, an additional cylinder may be added, or removed from the set of always firing cylinders. It should be appreciated that in some implementations, the sigma delta controller 420 may have a latency that could adversely affect the "feel" of the engine when a transition is made adding or subtracting a cylinder from the set of always firing cylinders. The nature of the potential problem can be appreciated by considering a hypothetical situation in which one cylinder is operating all of the time and a second, modulated cylinder is operating 95% of the time (i.e., the integer output 406 of the residual calculator 404 is "1" and the remainder output 407 of the residual calculator 404 is effectively 0.95). When driving, an operator may make a slight adjustment to the accelerator pedal increasing the requested power to a level "2.05" that causes the integer output 406 of the residual calculator 404 to increment to "2", and the remainder output 407 of the residual calculator to fall to 5%. If left alone, the sigma delta controller would eventually adapt to the new requested power level. However, the transient effect could be that too much power is delivered for a short period because the controller has latency. This can be imagined as if the controller was trying to continue to operate at a 95% firing frequency for a brief period while it is only intended to be operating at a 5% firing frequency.

In order to improve the transient response of the controller when incrementing or decrementing the number of cylinders in the set of always firing cylinders, the sigma delta controller can effectively be "reset" by applying a short burst of a higher speed clock signal to the sigma delta controller 420 in the period between firing opportunities of the modulated cylinder. This allows the integrators to adjust to the new level of requested power for the modulated cylinder. It should be appreciated that the resetting of the sigma delta controller 420 can be accomplished in a wide variety of different manners. By way of example, one way to implement this approach is to provide a clock multiplexer 425 that multiplexes the modulated cylinder firing opportunity clock signal 423 with a high frequency clock signal 427 that is actuated by a reset signal 429 sent from residual calculator 404 every time that the integer count of the residual calculator is incremented or decremented. The burst may be significantly shorter than the period of the firing opportunity clock signal 423 and preferably has enough cycles to allow the sigma delta controller 420 to fully adjust to the new requested power level. Since the digital electronics can readily operate at high speeds (e.g. at clock rates in the kilohertz, megahertz, or higher frequency ranges) while the firing opportunities of a single cylinder are typically at frequencies well under 100 Hz, there is ample time to reset the controller 420 between firing opportunities.

In this embodiment, the only output of the comparator that is utilized by the latch is the comparator output that is active when the modulated cylinder firing opportunity clock signal 423 triggers the latch. If desired, the bursts can be timed such that the bursts can only occur between sequential firing opportunities. With this arrangement, all of the signals in the reset burst are ignored by the latch so that the burst never impacts the firing. However, this is not a requirement.

In the described embodiment, at any given time, only a single cylinder is modulated while each of the other cylinders is either always skipped or always fired. However, in other implementations, the engine controller 400 can be modified to modulate the firing of more than one cylinder (e.g., 2 cylinders, etc.) while the each of the other cylinders is either always skipped or always fired.

When the residual calculator 404 determines that more or fewer cylinders should be in the "always fired" set, an appropriate signal is sent to the injection controller 440, which makes the appropriate adjustments. The specifics of which cylinders are added to (or removed from) the always fired set can be widely varied based on a variety of design considerations and the needs of any particular system. For example, in some implementations or situations, when adding a cylinder to the always fired set, it may be desirable to designate the currently modulated cylinder as the next "always fired" cylinder and then designate one of the cylinders in the skipped cylinder set as the "new" modulated cylinder. In other implementations or situations, it may be desirable to simply designate one of the cylinders in the skipped cylinders set as the next "always fired" cylinder and to continue to modulate the same cylinder. In still other implementations or situations it may be preferable to simply select a new set of always fired cylinders and a new modulated cylinder without any particular regard to the previous designations. Of course a wide variety of other factors can be considered as well in allocating the cylinders among the "always fired", "skipped" and "modulated" cylinder sets.

During operation, the residual calculator 404 continuously monitors the desired output signal 113 and continually divides the signal. Virtually any change in the desired output signal 113 will result in a change in the remainder output signal 407 which is fed to the modulated working chamber controller 405. The controller 405, in turn produces a drive pulse pattern that delivers the output designated by remainder output signal 407. Any time the integer value of the residual calculator changes, a reset signal is sent to clock multiplexer 425 which applies high frequency clock 427 to the sigma delta controller 420 for a short period of time, thereby resetting the sigma delta controller and permitting it to adjust to the new remainder level. The reset signal may be triggered any time the integer output increments or decrements.

As discussed above, one potential issue that arises when operating in the skip fire mode relates to the operation of the skipped cylinders. If the valves open and close during the skipped working cycles, then air is pumped through the cylinder to the exhaust and the exhaust/emissions systems must be designed to handle the excess oxygen in the exhaust gases. In some engines (e.g., engines with electronic valves), the opening and closing of the valves can be controlled on a working cycle by working cycle basis, which is ideal since it permits skipped cylinders to remain closed. However, in practice, very few vehicles on the road today have electronically controlled valves (or otherwise have the ability to control the opening and closing of the valves on a working cycle by working cycle basis).

As discussed above, most commercially available variable displacement engines are designed to shut down selected cylinders in order to vary the displacement of the engine. When a cylinder is shut down, its valves are typically not opened during the engine's intake or exhaust strokes. Although selected cylinders can be shut down, the response time of the disengagement mechanism may prevent the cylinders from being activated and deactivated on a working cycle by working cycle basis. Although traditional variable displacement engines exhibit improved efficiency relative to ordinary engines, the engine output is still controlled by varying the amount of air and/or fuel delivered to the active cylinders. Thus, their efficiency can be further improved by utilizing the optimized skip fire techniques described herein.

The engine control unit 400 described with reference to FIG. 12 is also well suited for use with these types of variable displacement engines. For example, if a particular engine is capable of shutting down particular cylinders or particular banks of cylinders, then the unused cylinders can be shut down during operation in the single cylinder modulation skip fire mode. This can further improve the emissions characteristics of the controlled engine, in part because the amount of excess oxygen in the exhaust is reduced. Shutting down skipped cylinders can also reduce pumping losses relative to engines that are not capable of shutting down any cylinders, thereby facilitating improved thermodynamic efficiency as well.

As will be appreciated by those familiar with the art, certain existing variable displacement engines are capable of shutting down selected cylinders, either individually, or in banks. For example, Honda currently produces a six cylinder variable cylinder management engine that is capable of shutting down 2, 3, or with slight modification, 4 cylinders. Other engines are arranged to shut down cylinders in pairs or in other banks. The single cylinder modulation skip fire controller 400 is well suited for use with such engines because some, and potentially all, of the unused cylinders may be shut down thereby reducing both excess oxygen in the exhaust and pumping losses. In such arrangements the injection controller 440 may be arranged to additionally switch the engine between operational states as would be appropriate based on the engine design.

Rapid Modulation of Operating State in Variable Displacement Engines

A problem that the inventors have observed in the operation of commercially available variable displacement engines is that their controllers appear to be designed to disengage from the variable displacement mode any time a non-trivial change is made in the state of the engine—e.g., if there is a call for more or less power, if there is a significant change in load, etc. The result is that under normal driving conditions, the engine does not tend to operate (or stay) in the more efficient reduced displacement mode a very high percentage of the time. It is suspected that one reason for this is the difficulty in controlling the engine in a manner that provides close to the same "feel" in response to movements of the accelerator pedal regardless of the number of cylinders that are being utilized. Therefore, rather than risk altering the feel of the engine, most conventional variable displacement engine controllers appear to opt out of the variable displacement mode.

The feedback control system described with respect to FIG. 12 is very well adapted for providing the desired power regardless of the number of cylinders being operated at any given time. The result is that the engine can provide substantially the same feel in response to calls for more (or less) power, regardless of the number of cylinders that are being used at any particular time. Thus, the described controller is well adapted for use in conventional variable displacement engines and can further improve their fuel efficiency not only due to the use of more efficient (e.g., optimized) firings, but also due to its ability to facilitate operations at reduced cylinder counts a higher percentage of the time. Because of its ability to effectively control the engine at lower cylinder counts, the described feedback control system can improve the efficiency of conventional variable displacement engines even if the firings are not optimized (e.g., even if the engine is throttled).

As described above, one potential problem that may be encountered using the pure single cylinder modulation skip fire approach described above is that if the valves of an unfired cylinder cannot be kept closed, then air is pumped through the engine. This drawback may be enough to preclude cost effective retrofitting of some engines because the engines' existing emissions system are not capable of handling uncombusted air pumped through skipped cylinders.

If a variable displacement engine is capable of shutting down different banks of cylinders in order to provide several different displacements (e.g. an engine capable of operating on 2, 3, 4 or 6 cylinders), the problems generated by pumping air through unfired cylinders can potentially be eliminated by rapidly shifting between different operational modes of the engine. For example, if the desired output of an engine can be provided by optimally firing two cylinders all of the time and a third cylinder half of the time, then conceptually the desired output can be obtained by rapidly switching back and forth between a two cylinder operating state and a three cylinder operating state such that, on average, two and a half cylinders are fired during each full cycle of the engine. If this is done effectively, then air would not be delivered to (and therefore would not be pumped through) any unfired cylinder. A limiting factor for this type of application is the speed at which changes between different operational states can be made.

Figure 13:
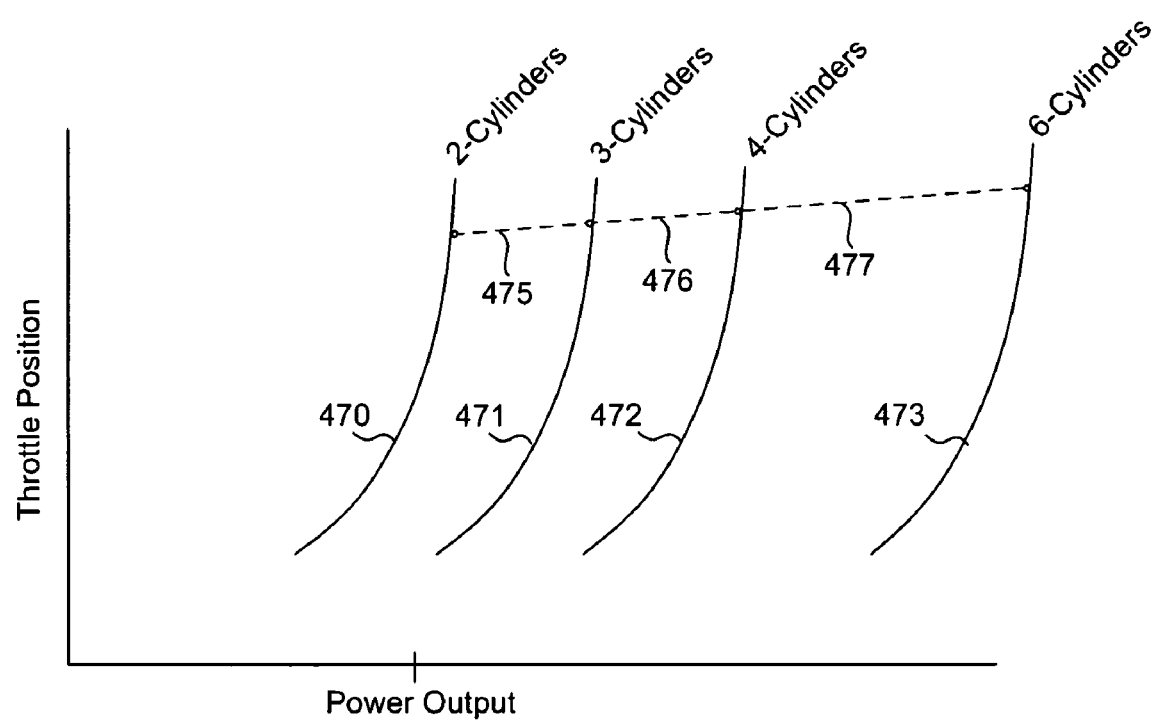
FIG. 13 is a graph illustrating the horsepower output of a representative variable displacement engine as a function of throttle position using different numbers of cylinders.

If a variable displacement engine can be switched to a new operational state relatively quickly, then it may be possible to use a controller similar to the controller described above with respect to FIG. 12 to control the engine. In such an embodiment the injection controller 440 would additionally be arranged to direct the engine to switch between operational states as necessary. Referring next to FIG. 13, a suitable control scheme for operating such an engine will be described. FIG. 13 is a graph illustrating the power that is available in a conventional variable displacement engine as a function of throttle position. In the illustrated embodiment, the engine is an Otto cycle engine capable of operating using 2, 3, 4 or 6 cylinders. When the desired engine output is less than the amount of power that can be provided by operating two cylinders in their optimal state, then the requested power may be delivered by operating the engine in a throttled two cylinder operational mode that uses throttling of the two operational cylinders to modulate the power. This is generally similar to the manner in which conventional variable displacement engines are operated today and the engine performance is represented in FIG. 13 by curve 470 which illustrates the power output of two throttled cylinder. When the requested power equals or exceeds the amount of power that can be delivered by two cylinders operating at their optimal level, then the engine may be switched to an optimized (e.g. substantially unthrottled) operational mode that uses a controller similar to the controller illustrated in FIG. 12 to deliver the requested power. As discussed above with reference to FIG. 14 and elsewhere, the "optimized" operational state may not actually correspond to a fully open throttle state. Thus, it should be appreciated that in the context of this description, when we use the term "unthrottled" or "substantially unthrottled" it does not intended to be limited to only conditions where the throttle is fully open. Rather, it is intended to indicate a state where the throttle is open sufficiently to allow a relatively full charge of air to enter the cylinders and is not being used as the primary mechanism for modulating the output of the engine.

When the requested power is an amount between the power that can be delivered by two and three cylinders operating all of the time at their optimal levels, then the injection controller 440 directs the engine to switch back and forth between the two and three cylinder modes as directed by the drive pulse signal 442. That is, when the drive pulse signal 442 is low, the injection controller 440 places the engine in the two cylinder mode, and when the drive pulse signal 442 is high, the injection controller 440 places the engine in the three cylinder mode. In this operational state, the engine runs substantially unthrottled and the cylinder firings are optimized as previously described. Thus, the drive pulse signal 442 effectively serves as the indicator of when the engine should be placed in the two cylinder mode, and when it should be in the three cylinder mode. Similarly, when the requested power is an amount between the power that can be delivered by three and four cylinders operating all of the time at their optimal levels, then the injection controller directs the engine to switch back and forth between the three and four cylinder modes as directed by the drive pulse signal 442.

In FIG. 13, the engine output when switching between the two and three cylinder modes is represented by line 475 and the engine output when switching between three and four cylinders is represented by line 476. This contrasts with lines 471, 472 and 473 which illustrate the engine output using three, four and six cylinders respectively in a conventional throttled manner. It should be appreciated that allowing the engine to run substantially unthrottled when delivering more power than can be delivered by two cylinders alone can significantly improve the fuel efficiency of the engine.

When the requested power is an amount between the power that can be delivered by four and six cylinders operating all of the time at their optimal levels, then the injection controller directs the engine to switch back and forth between the four and six cylinder modes as appropriate based on the drive pulse signal 442. It should be appreciated that the engine controller 400 must be arranged to account for the fact that two additional cylinders are fired when the engine switches from the four to six cylinder operational states. This difference can be handled in several different ways. For the purpose of illustration, consider an implementation in which the engine can only be switched between operational states once each full operational cycle of the engine. That is, each operational cylinder must be fired once when the engine switches operational states. One suitable approach to compensating for the additional cylinder would be to utilize injection controller logic to determine when to switch between the four and six cylinder states. For example, if the integer output 407 of the residual calculator is a "4", then the injection controller would require the accumulation of two "high" drive pulses before switching to the six cylinder mode for one operational cycle of the engine, after which the injection controller would switch then engine back to the four cylinder operational state until two more "high" drive pulses have been accumulated.

When the integer output 407 of the residual calculator is a "5", then the injection controller would effectively add one to the accumulator each full working cycle of the engine, which would have the desired effect of causing the engine to operate in the six cylinder state a higher percentage of the time to thereby deliver the desired power.

A second suitable approach to compensating for the additional cylinder would be to utilize sigma delta controller logic to dictate when the four and six cylinder states are appropriate. In one such implementation, the input to the sigma delta controller may be adjusted appropriately to account for the fact that two cylinders are being controlled instead of just one. This could involve changing the residual calculator to logic that outputs a "remainder" signal that is based on the amount the desired output signal exceeds "4" cylinders and then dividing that value by a factor of two in order to compensate for the fact that a "high" drive pulse signal causes two additional cylinders to fire.

In still another implementation, if the mode switching response time of the engine is quick enough that a mode switch can be made between the firing opportunities of the "$5^{th}$" and "$6^{th}$" cylinders, then the engine controller can be configured to operate just like the single cylinder modulation skip fire engine controller described above with mode switching being used to shut down cylinders as appropriate.

It should be appreciated that the foregoing examples are merely exemplary in nature and that the details of any specific implementation would need to be adjusted to compensate for the capabilities of the specific variable displacement engine being controlled. The actual number of permissible operational states and the actual number of available cylinders in each such state will vary from engine to engine. The controller will need to be adjusted to utilize the available states. Additionally, the response time for switching between different operational states will vary from engine to engine. Some engines may take more than one full operational cycle of the engine to switch between operational modes, while others may be quick enough to facilitate switching back and forth between modes on a firing opportunity by firing opportunity of the cylinders basis. In view of these variations, the logic of the engine controller would need to be customized to capabilities of the engine. It should be appreciated that not all existing variable displacement engines are robust and quick enough to switch back and forth between modes at the speed that would be required to run the engine smoothly in the described mode switching manner. However, it should be appreciated that operating a suitable conventionally configured variable displacement mode in this type of mode switching manner is one way that the air pumping problem can be addressed.

Pre-Processor Stage

In some of the embodiments described above, a signal from the accelerator pedal position is treated as the indication of the desired engine output that is used as the input to the control system (e.g., drive pulse generator 104, engine control unit 400, etc). In such embodiments, the desired engine output signal 113 can be taken directly from a pedal position sensor on the vehicle, or it may be amplified in an appropriate manner. In other embodiments, the pedal position sensor signal may be combined with other inputs (such as the dither signal 207 described above) before it is provided to the drive pulse generator 104. In still other embodiments, the accelerator pedal position sensor signal may be provided to a preprocessor 181 (as represented by, for example, as a dashed box in FIG. 3), which either generates its own signal or does some level of processing on the pedal sensor signal. The output of the preprocessor 181 would then be used as the input to the drive pulse generator, with or without an additional dither signal as may be appropriate for a particular design.

The preprocessor 181 may be arranged to provide any desired type of preprocessing of the accelerator pedal position sensor signal. For example, it may be desirable for an automobile to provide a fuel savings mode where the accelerator pedal position signal is preprocessed in a way that helps operate the engine in the most fuel efficient manner. In another example, it is generally known that some drivers tend to relatively rapidly fluctuate the pedal position. For such drivers it may be desirable for an automobile to provide a smooth driving mode in which a preprocessor averages or smooths certain pedal position fluctuations (e.g., the preprocessor may take the form of, or include, the low pass filter 402 described above with respect to FIG. 12). In still other implementations, the vehicle may include a cruise controller. In such vehicles, the cruise controller may be incorporated in the preprocessor or may serve as the source of the drive pulse generator's input signal 113 when the vehicle is in the cruise control mode. In still other embodiments, anti-aliasing filtering of the pedal position may be provided in the preprocessor 181. Of course, the preprocessor may be arranged to perform any other type of preprocessing that is deemed appropriate for the engine and/or vehicle being controlled.

Transmission Control and Continuously Variable Transmission

It is well known that engine speed has an effect on the fuel efficiency of an engine. This effect can be seen graphically in the performance map illustrated in FIG. 14. As seen in FIG. 14 and discussed above, engines tend to be most efficient when operated within a relatively narrow range of engine speeds, manifold pressures, etc. For this reason, the engine control units (ECUs) used on many vehicles having automatic transmissions are arranged to control the shifting of the gears of the transmission based at least in part on the engine speed in an effort to improve overall fuel efficiency. The fuel processor may be arranged to control or influence the gear selection in a similar manner when operating in the skip fire type variable displacement mode.

Some existing vehicles use continuously variable transmissions. A known advantage of a continuously variable transmission is that it allows the engine to operate at closer to its peak efficiency over a range of vehicle speeds than standard transmissions. It should be appreciated that the use of a continuously variable transmission in conjunction with the described skip fire based variable displacement engine operation allows the engine to run at very close to its optimal thermodynamic efficiency most of the time. That is, the described skip fire approach allows each firing to be optimized for thermodynamic efficiency (or other desired parameters) and the use of a continuously variable transmission allows the engine to operate at an optimal engine speed (RPM), thereby allowing operation of the engine in the optimal zone (e.g. zone 50 in FIG. 14) most of the time.

Although existing engine controllers often control the transmission in an effort to improve efficiencies, the inventors are unaware of any existing engine controllers that are able to control the transmission, and the manifold pressure and the working chamber firings in a manner that ensures that fired working chambers are operated in a relatively tight zone optimized for fuel efficiency or other desired criteria.

Diesel Engines

Although many of the examples set forth above discuss applying the described skip fire based variable displacement approach to engines based on the Otto cycle or other thermodynamic cycles that modulate power by throttling air delivery to the working chambers, it should be appreciated that the invention is very well suited for use in diesel engines. Indeed, many existing diesel engine designs are particularly well adapted for operation using the described skip fire approach. For example, the exhaust and emission systems used in many existing diesel engines are already adapted for use with high oxygen content exhaust streams which can simplify both retrofitting and new engine design. Also, most diesel engines use direct injection which eliminates the wall wetting issues discussed above. Further, many diesel engines currently employ injection profiling. That is, the injection of fuel into a cylinder is staged and timed to improve the thermodynamic efficiency of the cylinder firing. Such profiling can further improve the efficiency of the engine when using optimized firings. Therefore, it should be appreciated that any of the engine control embodiments described above may be used in conjunction with diesel engines.

Other Features

Although only a few embodiments of the invention have been described in detail, it should be appreciated that the invention may be implemented in many other forms without departing from the spirit or scope of the invention. Many of the examples given above relate to 4-stroke piston engines suitable for use in motor vehicles. However, it should be appreciated that the described continuously variable displacement approaches are very well suited for use in a wide variety of internal combustion engines. These include engines for virtually any type of vehicle—including cars, trucks, boats, aircraft, motorcycles, scooters, etc.; for non-vehicular applications such as generators, lawnmowers, leaf blowers, models, etc.; and virtually any other application that utilizes an internal combustion engine. The various described approaches work with engines that operate under a wide variety of different thermodynamic cycles—including virtually any type of two stroke piston engines, diesel engines, Otto cycle engines, Dual cycle engines, Miller cycle engines, Atkins cycle engines, Wankel engines and other types of rotary engines, mixed cycle engines (such as dual Otto and diesel engines), hybrid engines, radial engines, etc. It is also believed that the described approaches will work well with newly developed internal combustion engines regardless of whether they operate utilizing currently known, or later developed thermodynamic cycles.

Some of the examples above were based on Otto cycle engines which are typically throttled so they often do not operate at maximum compression. However, the concepts are equally applicable to unthrottled engines such as diesel cycle engines, Dual cycle engines, Miller Cycle engines, etc.

In some of the embodiments explicitly discussed above, it was assumed that all of the cylinders would be used or otherwise operated in the continuously variable displacement mode. However, that is not a requirement. If desired for a particular application, the firing control unit can readily be designed to always skip some designated cylinder(s) (working chamber(s)) when the required displacement is below some designated threshold and/or to always fire selected cylinders at particular required displacement levels. In still other implementations, any of the described working cycle skipping approaches could be applied to traditional variable displacement engines while operating in a mode in which some of their cylinders have been shut down.

The described continuously variable displacement mode of operation can readily be used with a variety of other fuel economy and/or performance enhancement techniques—including lean burning techniques, fuel injection profiling techniques, turbocharging, supercharging, etc. It is believed that the fact that the conditions within the cylinders are relatively fixed in fired cylinders make it easier to implement enhancement techniques that are generally known, but not in widespread use (e.g., the use of fuel injection profiling with multiple staged injections in automotive engines). Additionally, it is believed that the controlled conditions within the cylinders may also enable a variety of other enhancements that are not practical in conventional engines.

Most of the drive pulse generator embodiments described in detail above utilized sigma delta controllers. Although it is believed that sigma delta controllers are very well suited for use in controlling the engine, it should be appreciated that a variety of other controllers, and particularly adaptive (i.e., feedback) controllers may be used or developed for use in place of the sigma delta control. For example, it should be appreciated that other feedback control schemes may be used to convert the inputted desired engine output signal 113 to a stream of drive pulses that can be used directly or indirectly to drive the engine.

In several of the described embodiments, the sigma delta controller is generally designed to convert the inputted desired engine output signal to signals that can be used to generate drive pulses. Sigma delta is one type of converter that can be used to represent the input signal. Some of the described sigma delta converters exhibit oversampled conversion and in various alternative embodiments, other oversampled converters can be used in place of sigma delta conversion. In still other embodiments, other types of converters can be used as well. It should be appreciated that the converters may employ a wide variety of modulation schemes, including various pulse width modulation schemes, pulse height modulation, CDMA oriented modulation or other modulation schemes may be used to represent the input signal, so long as the synchronizer component of the drive pulse generator is adjusted accordingly.

It should be apparent from the foregoing that the described continually variable displacement approach works very well with existing engine designs. However, it is believed that the described skipped working cycle control approach will also facilitate or even enable a wide variety of other technologies that can be used to further improve the thermodynamic efficiency of the engine. For example, the use of a supercharger or a turbocharger in combination with the described continuously variable displacement approach can further improve the efficiency of an engine. Computer simulation models suggest that the combination of the described continuously variable displacement control approach with a supercharger can readily improve the fuel efficiency of many existing Otto cycle engines by over 100%.

One of the reasons that such significant improvements are possible in automotive engines is because most automotive engines are operated at a relatively small percentage of their potential horsepower most of the time. For example, an engine that is designed to deliver maximum power outputs on the order of 200-300 horsepower may require no more than 20-30 horsepower most of the time—as for example when the vehicle is cruising at 100 kilometers per hour.

In the discussions above, a number of different skip fire based control techniques have been described and a number of different enhancements have been described. In numerous situations, enhancements have been described in the context of a particular controller. However, it should be appreciated that many of the enhancements may be used in conjunction with a number of the controllers. For example, the described fuel pulse variations (e.g., optimization of fuel injection amounts, rich fuel pulses, lean pulses, etc.) may be used in conjunction with any of the described controllers. Any of the described control methods and controllers may be implemented as a co-processor or incorporated into the engine control unit itself, etc.

In some implementations it may be desirable to provide redundant controllers—as for example redundant sigma delta controller. The redundant controllers may run concurrently so that if one fails the other may take over. Often digital sigma delta controllers can be tuned more precisely than analog sigma delta controllers. At the same time, digital sigma delta controllers may be slightly more susceptible to failure than analog sigma delta controllers. Thus, in some implementations, it may be desirable to provide redundant sigma delta controllers, with a primary controller being a digital controller and a secondary or backup controller being an analog sigma delta controller.

It is noted that over the years, there have been a number of proposals that contemplated operating specific engines in a "skip fire" mode. However, it is the Applicants' understanding that none of these approaches have ever enjoyed any significant commercial success. It is suspected that a major factor that contributed to this lack of acceptance is that prior efforts were unable to control the engine in a manner that delivered the required engine smoothness, performance and drivability characteristics to enjoy commercial viability. In contrast, it is believed that the described engine control and operation approaches are well suited for use in a variety of different applications.

Therefore, the present embodiments should be considered illustrative and not restrictive and the invention is not to be limited to the details given herein, but may be modified within the scope of the appended claims.

What is claimed is:

1. An engine controller suitable for use with an internal combustion engine having at least one working chamber, each working chamber being arranged to operate in a succession of working cycles, wherein the engine controller has a skip fire variable displacement operational mode arranged to direct selective firing of the at least one working chamber in a firing pattern that causes selected active working cycles to be fired and selected passive working cycles not to be fired, wherein the engine controller is further arranged to:
   direct the delivery of a substantially optimized amount of air and fuel to the at least one working chamber during a first set of the active working cycles; and
   dynamically calculate the firing pattern based at least in part on feedback control to deliver a desired power output.

2. An engine controller as recited in claim 1 further comprising a predictive adaptive controller arranged to determine the firing pattern.

3. An engine controller as recited in claim 2 wherein the predictive adaptive controller is a sigma delta controller.

4. An engine controller as recited in claim 1 wherein the engine controller includes:
   a drive pulse generator that provides a sequence of drive pulses that are synchronized with the engine speed and define a drive pulse pattern that generally indicates when active working cycles are appropriate to deliver the desired engine output; and
   a sequencer that receives the drive pulse pattern and determines an actual firing sequence based at least in part on the received drive pulse pattern.

5. An engine controller as recited in claim 1 wherein the engine controller is further arranged to direct the delivery of a substantially optimized amount of air and fuel to a majority of the working cycles that are not skipped during operation in a first state of the variable displacement mode.

6. An engine controller as recited in claim 1 wherein the amount of air and fuel directed to be delivered to the working chambers by the engine controller during the first set of active working cycles is arranged to cause the working chambers to operate at substantially their optimal thermodynamic efficiencies based on current operating conditions of an engine controlled by the engine controller.

7. An engine controller as recited in claim 1 wherein:
   the amount of air and fuel directed to be delivered to the working chambers during each working cycle in the first set of the active working cycles is optimized for a substantially unthrottled operating condition of the engine; and
   the engine controller is further arranged to control the fuel delivery system to selectively deliver a reduced amount of fuel to the working chambers during a second set of active working cycles, wherein the reduced amount of fuel is substantially less than the optimized amount of fuel.

8. An engine controller as recited in claim 1 wherein the engine controller is further configured for use in a throttled engine and is arranged to provide a plurality of operational levels in the skip fire variable displacement operational mode, wherein the operational levels vary in their relative settings of the throttle.

9. An internal combustion engine comprising:
- a plurality of working chambers each arranged to operate in a succession of working cycles;
- a fuel delivery system arranged to facilitate the delivery of fuel into the working chambers; and
- an engine controller as recited in claim 1.

10. A method of controlling the operation of an internal combustion engine having at least one working chamber, each working chamber being generally arranged to operate in a succession of working cycles, the method comprising operating the engine in a variable displacement mode that includes:
- firing the at least one working chamber in a firing pattern that skips selected skipped working cycles and fires selected active working cycles;
- delivering a substantially optimized amount of air and fuel to the at least one working chamber during a first set of the active working cycles; and
- wherein the firing pattern is determined at least in part using feedback control to provide a desired engine output.

11. A method as recited in claim 10 wherein the optimized amount of air and fuel delivered to the working chambers during the first set of active working cycles is optimized to substantially maximize the thermodynamic efficiency of the engine in the current state of the engine.

12. A method as recited in claim 10 wherein a substantially optimized amount of air and fuel is delivered to the working chambers during a majority of the active working cycles when the engine is in a first state of a continuously variable displacement operational mode.

13. A method as recited in claim 10 wherein fuel is not delivered to the working chambers during skipped working cycles.

14. A method as recited in claim 10 wherein the actual amount of air and fuel delivered to the working chambers during active working cycles varies as a function of at least the rotational speed of the engine.

15. A method as recited in claim 14 wherein the actual amount of air and fuel delivered to the working chamber also varies as a function of at least one additional factor selected from the group consisting of:
- manifold pressure, inlet air temperature, valve timing, spark timing and exhaust system conditions.

16. A method as recited in claim 10 wherein:
- the firing pattern is determined at least in part using feedback control to provide a desired engine output; and
- the feedback utilized in the feedback control includes information indicative of at least one of requested and actual working cycle firings.

17. A method as recited in claim 10 wherein the firing pattern is dynamically calculated during operation of the engine on a working cycle by working cycle basis to provide a desired engine output.

18. A method as recited in claim 10 wherein:
- the engine is operated in a skip fire variable displacement mode when selected working cycles are skipped, the engine having a plurality of distinct operational levels in the skip fire variable displacement operational mode;
- the operational levels vary in their relative settings of a throttle;
- at a first operational level, the substantially optimized amount of air and fuel is delivered during the first set of active working cycles; and
- at a second operational level reduced amounts of air and fuel are delivered during fired working cycles relative to the air and fuel delivered during the first set of active working cycles fired such that less power is generated by firings at the second operational level relative to the first operational level.

19. A method as recited in claim 10 wherein the engine includes a throttle and the throttle is set at a first substantially fixed throttle position during operation at a first operational level in a skip fire variable displacement mode such that requests for changes in the desired output of the engine are generally met without substantially altering the throttle position.

20. A method as recited in claim 19 wherein the precise position of the throttle in the first substantially fixed throttle position is varied slightly during operation of the engine in the variable displacement mode.

21. A method as recited in claim 10 wherein:
- the firing pattern is determined at least in part using predictive adaptive control to provide the desired engine output; and
- the selection of working cycles to be skipped is determined dynamically during operation of the engine without the use of predefined firing patterns.

22. A method as recited in claim 10 wherein the engine is operable in the variable displacement mode and a second operating mode, the method further comprising:
- automatically determining whether to operate in the variable displacement mode or the second operating mode based at least in part upon the current operational state of the engine; and
- wherein in the second operating mode, the amount of air introduced to the working chambers is modulated by an air supply throttle, and fuel is delivered to the working chambers during every working cycle of the engine such that none of the working cycles are skipped.

23. A method as recited in claim 10 wherein the amount of fuel delivered to the at least one working chamber during a second set of the active working cycles that are interspersed with the first set of working cycles is reduced relative to the amount of fuel delivered during the first set of active working cycles, wherein the selection of the working cycles in the second set of active working cycles is arranged to accomplish at least one of (a) smoothing the output of the engine, (b) helping reduce vibrations of the engine, (c) more precisely matching a desired engine output, and (d) reducing emissions from the engine.

* * * * *